US005584004A

United States Patent [19]
Aimoto et al.

[11] Patent Number: 5,584,004
[45] Date of Patent: Dec. 10, 1996

[54] DATA PROCESSING SYSTEM HAVING SUBSYSTEMS CONNECTED BY BUSSES

[75] Inventors: Takeshi Aimoto, Sagamihara; Akira Ishiyama; Hidenori Kosugi, both of Hadano; Masabumi Shibata, Kawasaki, all of Japan

[73] Assignee: Hitachi, Ltd., Tokyo, Japan

[21] Appl. No.: 855,091

[22] Filed: Mar. 20, 1992

[30] Foreign Application Priority Data

Mar. 20, 1991 [JP] Japan ................................. 3-081555
Jan. 9, 1992 [JP] Japan ................................. 4-020460

[51] Int. Cl.⁶ ..................................................... G06F 12/02
[52] U.S. Cl. ...................... 395/405; 395/444; 395/468; 395/470; 395/475; 395/480; 395/497.04; 395/490; 395/411; 395/448
[58] Field of Search ...................... 395/400, 444, 395/445, 446, 447, 448, 468, 470, 474, 475, 480, 497.04, 411, 405, 490, 425

[56] References Cited

U.S. PATENT DOCUMENTS

| | | | |
|---|---|---|---|
| 4,755,930 | 7/1988 | Wilson, Jr. et al. | 395/449 |
| 4,928,225 | 5/1990 | McCarthy et al. | 395/472 |
| 4,992,930 | 2/1991 | Gilfeather et al. | 395/448 |
| 5,117,350 | 5/1992 | Parrish et al. | 395/401 |
| 5,146,607 | 9/1992 | Sood et al. | 395/800 |
| 5,148,533 | 9/1992 | Joyce et al. | 395/471 |
| 5,197,146 | 3/1993 | LeFetra | 395/471 |
| 5,214,776 | 5/1993 | Bagnoli et al. | 395/800 |
| 5,218,688 | 6/1993 | Nishiola | 395/478 |
| 5,226,144 | 7/1993 | Moriwaki et al. | 395/448 |
| 5,247,673 | 9/1993 | Costa et al. | 395/650 |
| 5,263,144 | 11/1993 | Zurawski et al. | 395/448 |
| 5,265,235 | 11/1993 | Sindhu et al. | 395/447 |
| 5,276,828 | 1/1994 | Dion | 395/200.14 |
| 5,276,851 | 1/1994 | Thacker et al. | 395/447 |

FOREIGN PATENT DOCUMENTS 61-26169  2/1986  Japan.
61-49706  10/1986  Japan.

OTHER PUBLICATIONS

Digest of Technical Papers of COMPCON, Spring, 1991 pp. 46–50.

*Primary Examiner*—Matthew M. Kim
*Assistant Examiner*—Hiep T. Nguyen
*Attorney, Agent, or Firm*—Antonelli, Terry, Stout & Kraus

[57] ABSTRACT

A data processing system is provided which includes a plurality of subsystems each including at least one instruction processor, at least one input/output device and at least one main storage device connected by local bus. The subsystems are connected to one another through bus extenders and inter-subsystem transfer lines. Each of the main storage devices is assigned for a partial address space as a part of the system address space. When an instruction processor or an input/output processor on each of the subsystems makes access to a main storage device, the operation of the system is as follows. If the address of access is in the address space limit of a main storage device on an inner subsystem, access to the main storage device on the inner subsystem is made. If the address of access is out of the address space limit of the main storage device on the inner subsystem and in the system address space assigned to the system, access to a main storage device on one of outer subsystems is made through a bus extender on the inner subsystem, inter-subsystem transfer lines and another bus extender on the one outer subsystems.

30 Claims, 42 Drawing Sheets

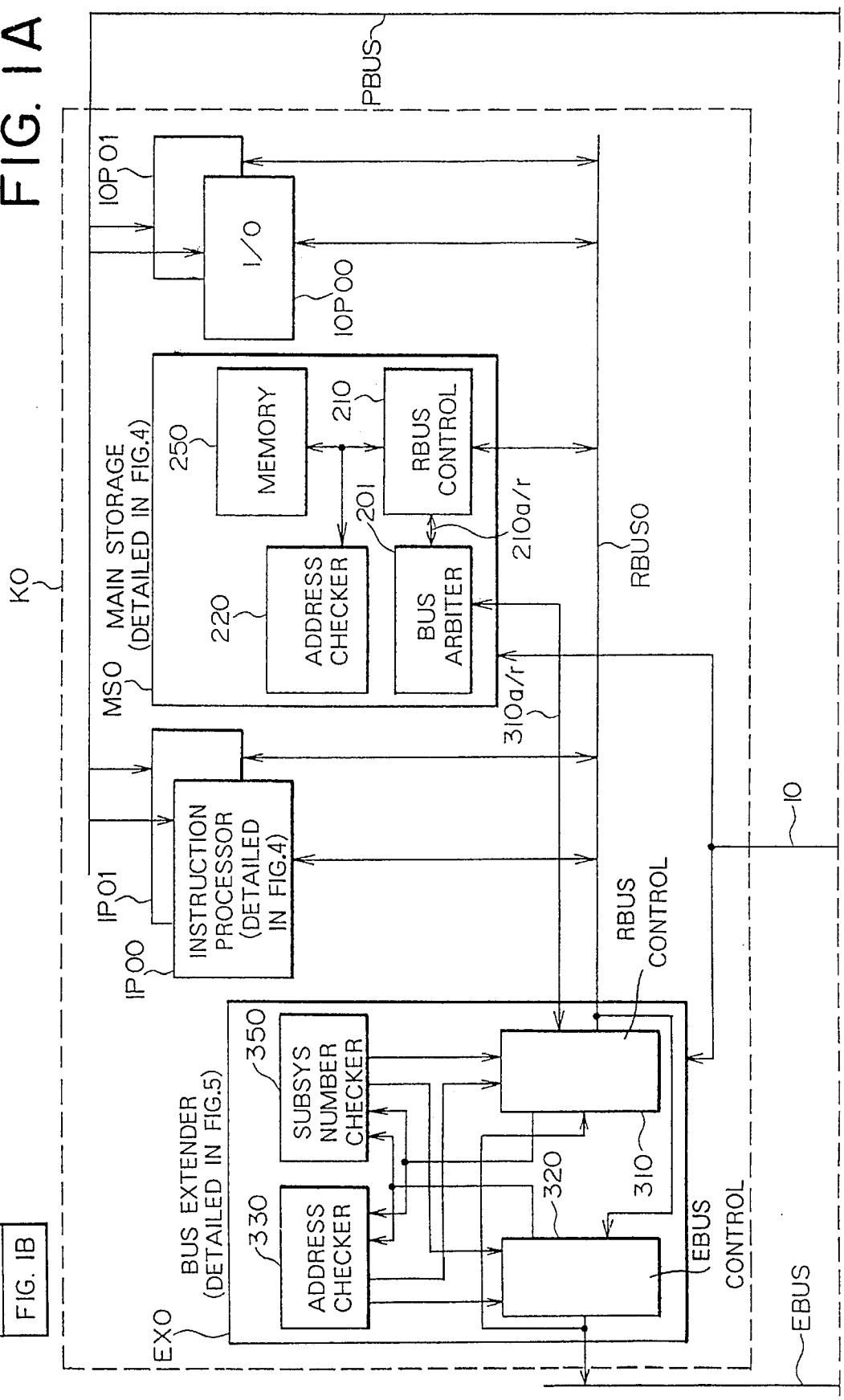

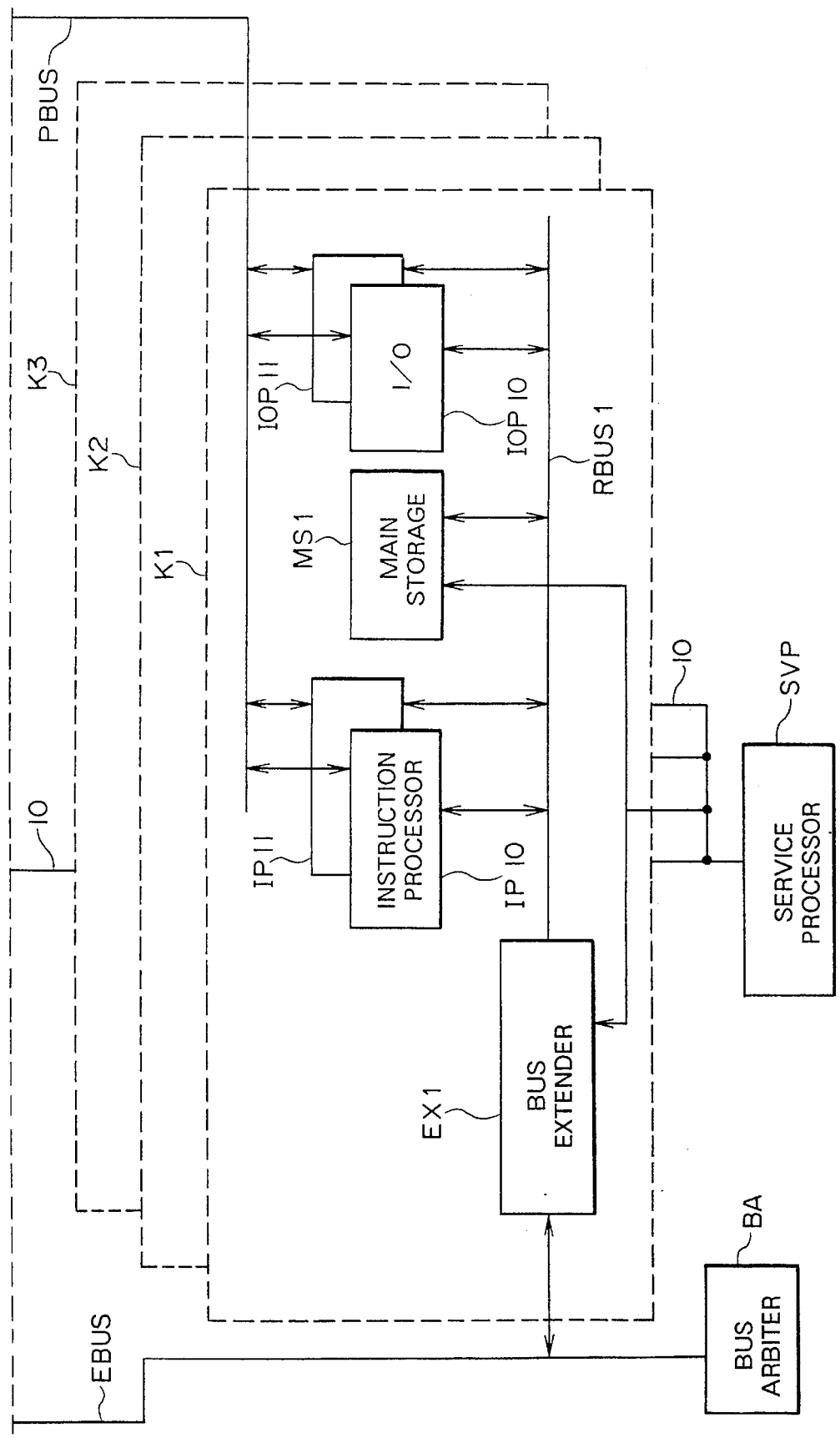

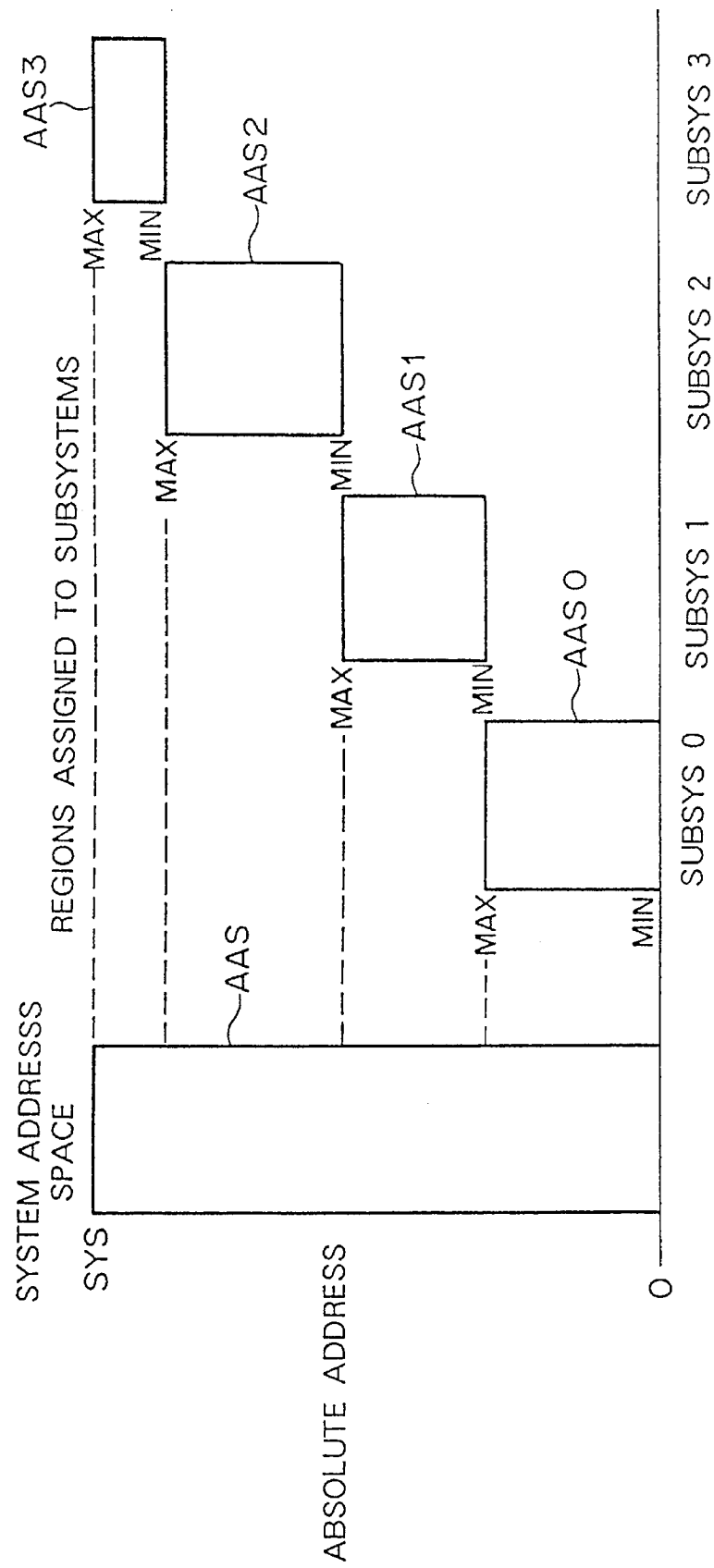

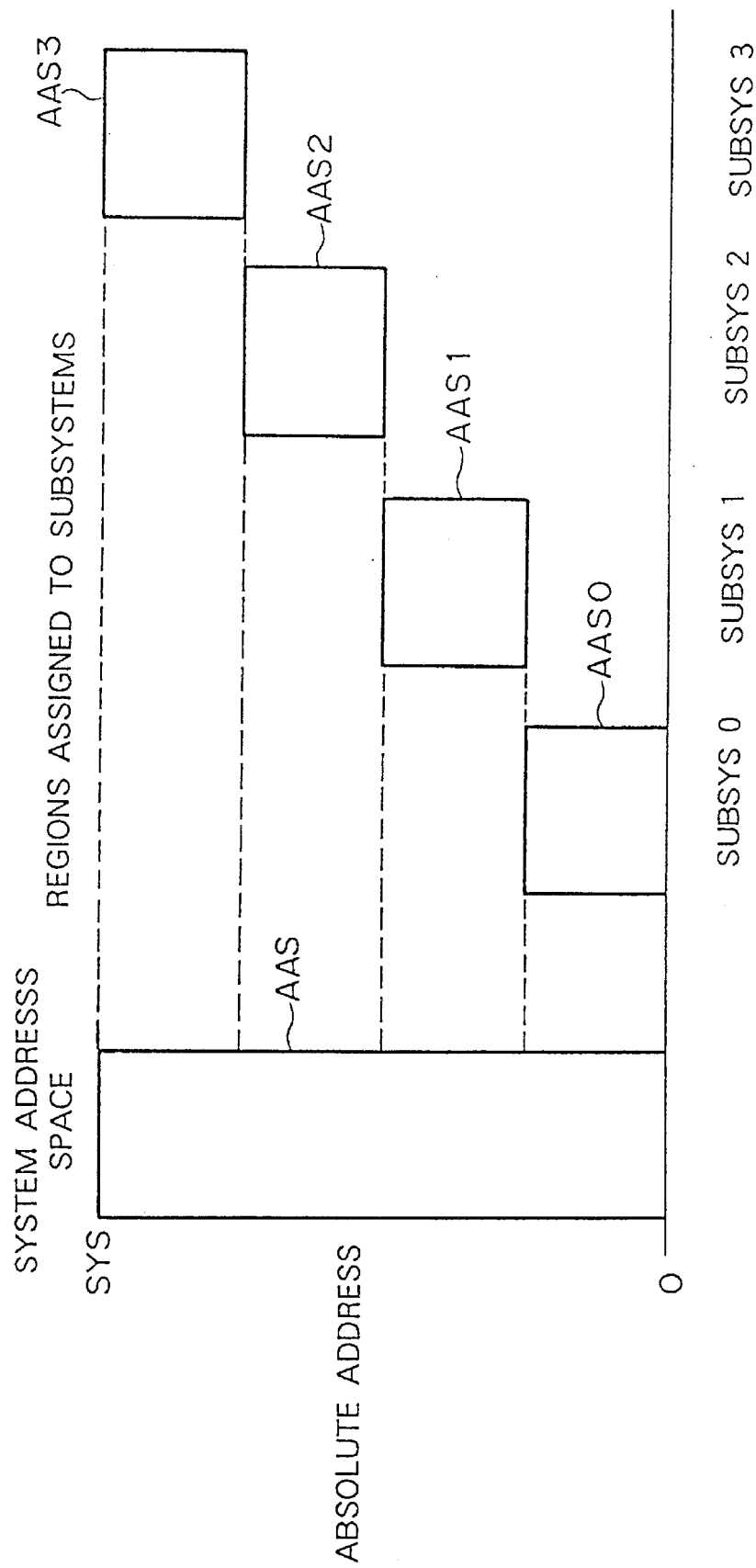

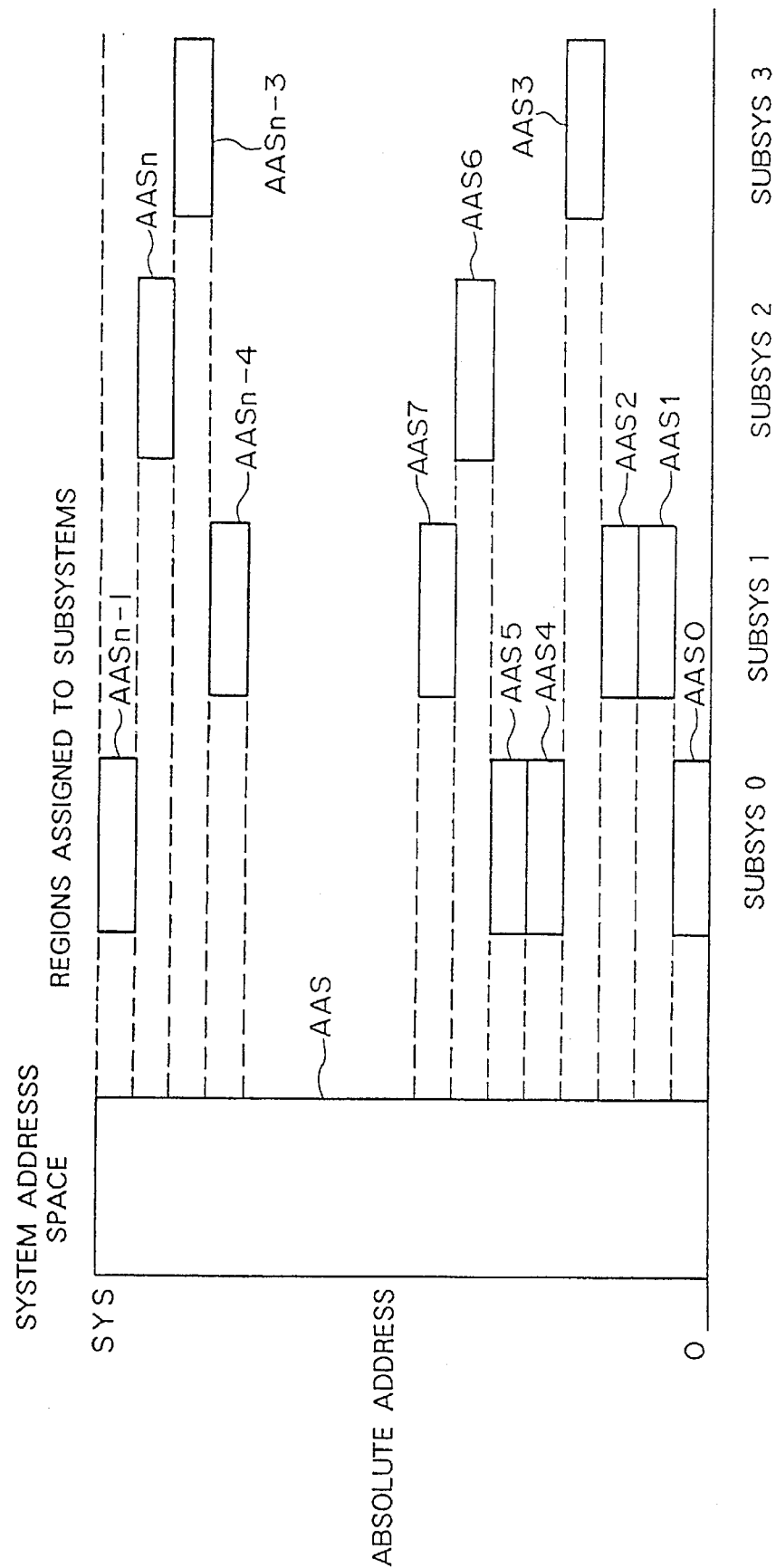

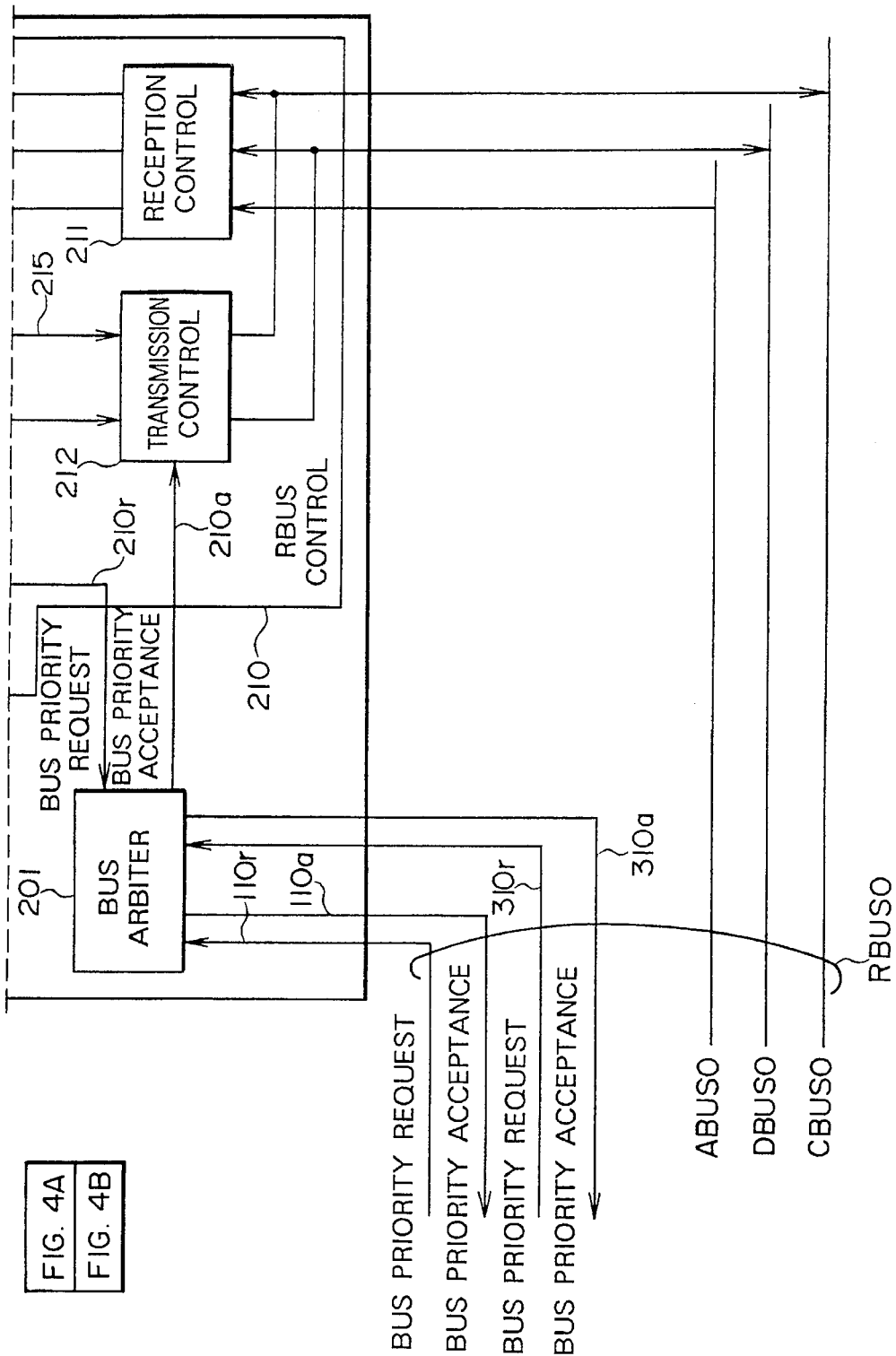

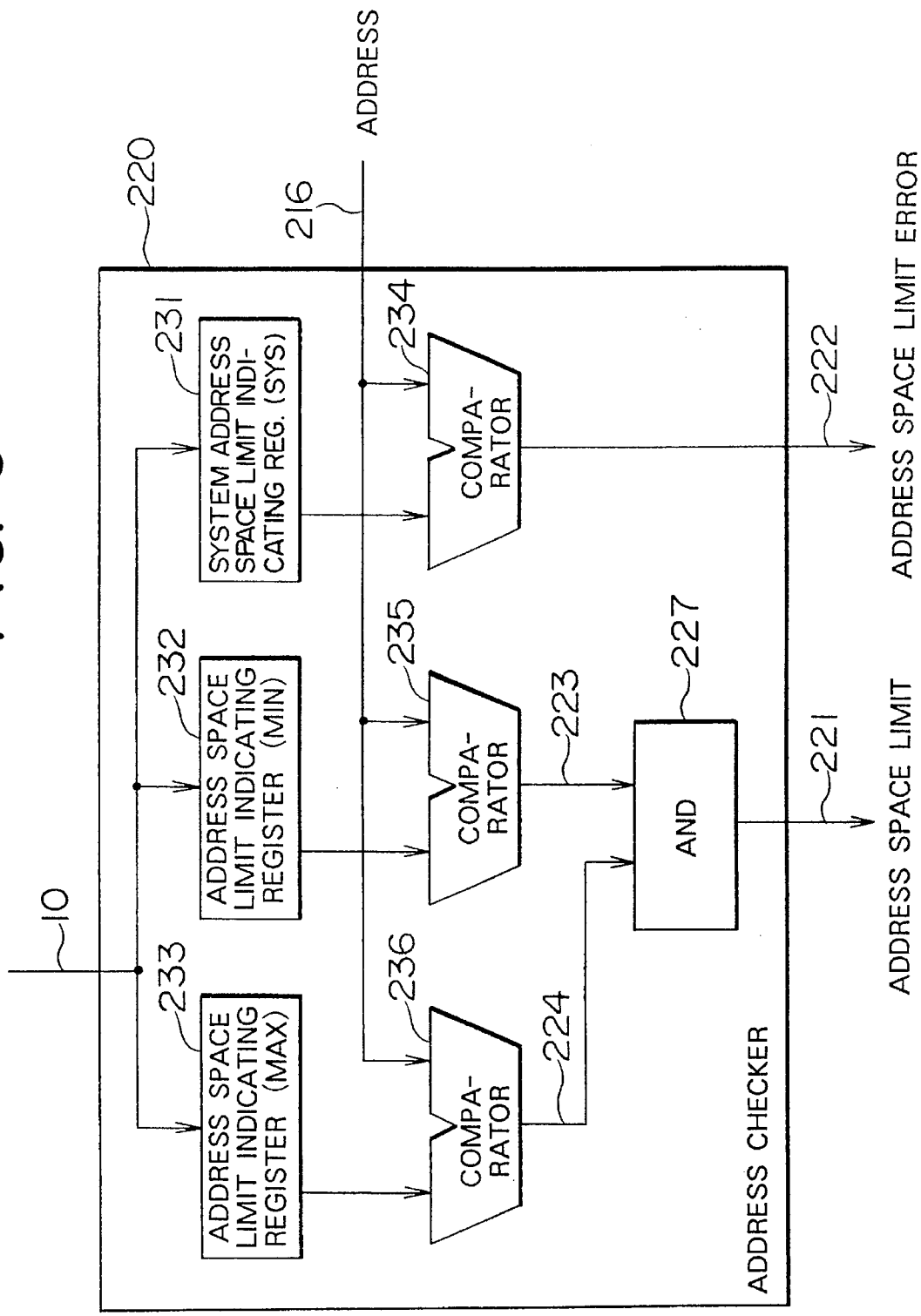

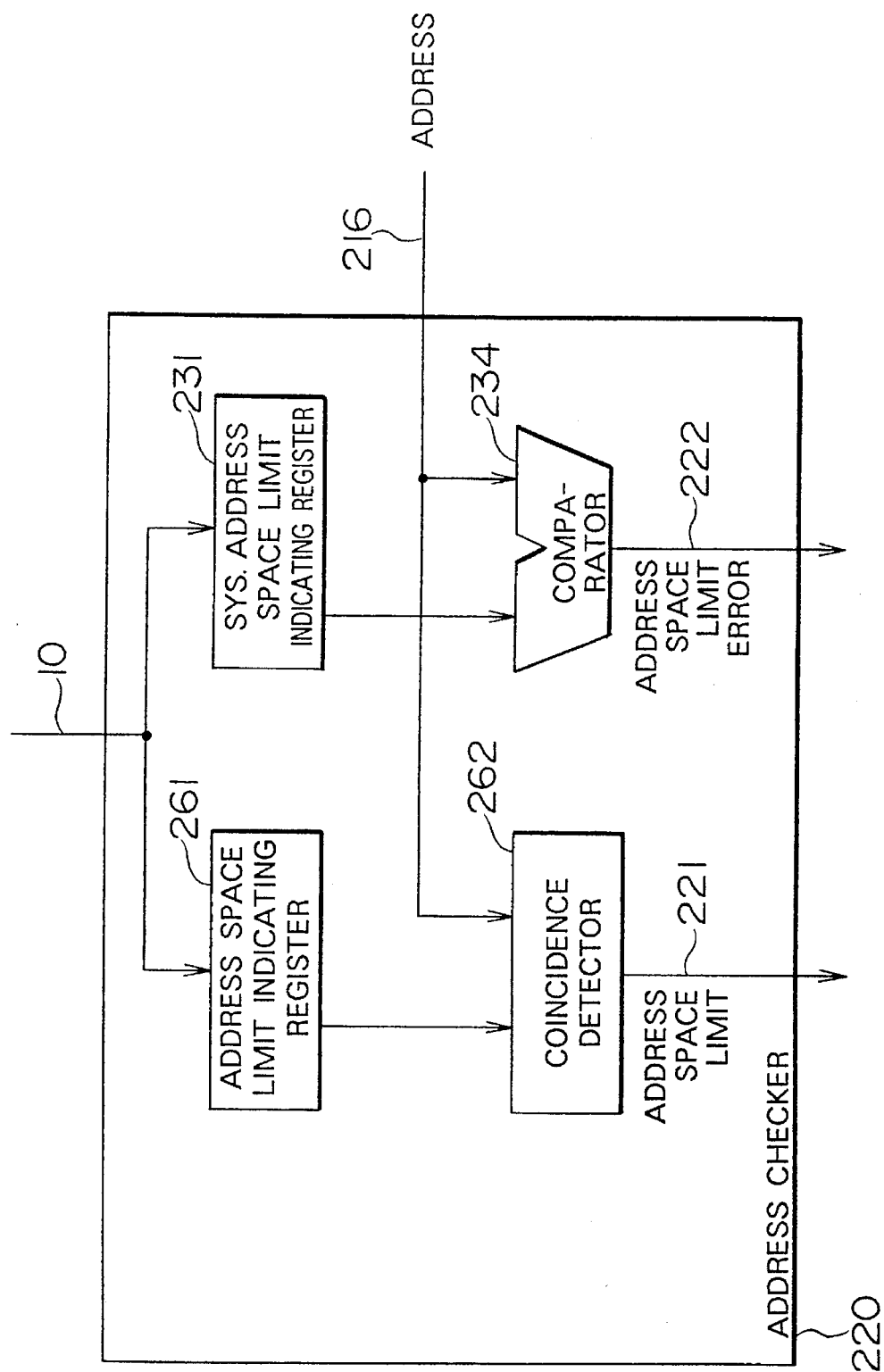

CONTENTS OF ADDRESS SPACE LIMIT INDICATING REGISTER 261, 361

DATA PROCESSING SYSTEM HAVING SUBSYSTEMS CONNECTED BY BUSSES

BACKGROUND OF THE INVENTION

The present invention relates to access control to main storage devices on a plurality of subsystems which constitutes a a data processing system and each of which has at least one instruction processor, at least one input/output device and at least one main storage device.

For example, a conventional data processing system is constituted by connecting 1–2 instruction processors (IP), a main storage device (MS device) and 1–4 input/output processors (IOP) through a system bus. Bus connection is used in this type data processing system because the number of interface lines between devices can be reduced greatly compared with the style in which local pass lines are provided between devices. In general, LSI improved in the degree of integration more greatly in recent years is used in this type data processing system, but the increase of the number of interface pins in LSI is relatively small compared with the remarkable improvement in the degree of integration. Accordingly, it is considered that importance of using such interface pins effectively, that is, importance of bus connecting means, will become larger in the field of this type data processing system hereafter.

On the other hand, a method of covering a performance range (inclusive of storage capacity range) beyond a conventional limit by connecting a plurality of data processing systems (called "subsystems") has appeared recently to answer the needs of improvement in system performance.

A method for facilitating the flexible change of system configuration by connecting a plurality system controllers (SC) described in Japanese Patent Publication JP-B-61-49706 which corresponds to U.S. patent application Ser. No. 973,466 filed Dec. 26, 1978 is known as this type prior art. In this method, table information that indicates the configuration of main storage devices with respect to the partial address space divided from absolute address space into the some unit is provided, so that not only the assignment of storage devices as to whether there is any storage device assigned for the address or as to what is a storage device assigned for the address can be known by reference to the table information at the time of reference of main storage device but data on a corresponding storage device can be referred to by using the assignment information. The data processing system using this method is a data processing system having buss lines provided between IP and SC and between SC and storage device with respect to the IP and the storage devices (Prior Art Example 1).

As another conventional technique, a distributed processing system multiplexed by connecting a plurality of subsystems through bus extender and extension bus has been disclosed in Japanese Patent Application Laid-Open No. JP-A-61-26169. Each of the subsystems constitutes a closed data processing system, so that ordinarily processing is made within the subsystem per se but reliability of the system can be improved through shifting the processing to another subsystem of the multiplexed system by using a method for communication between subsystems at extraordinary time of accidents or the like. Information such as transmission-side subsystem identification number/device number and reception-side subsystem identification number/device number is set in bus transfer information to coherently supporting communication between devices (such as IP, IOP and MS device) on the plurality of subsystems operating concurrently, so that access can reach the target device on the target subsystem on the basis of the information. Access to an MS device and communication between subsystems are made by one interface. In the case of access to a common MS device or in the case of access to an MS device on one of the subsystems, each of the data processing subsystems sets the subsystem identification number (subsystem identification number X of a common subsystem or subsystem identification number of an inner subsystem) in the REN portion of address pass format A on the basis of an address capacity decomposing instruction prepared in the data processing subsystem. In the Japanese Patent Application Laid-Open No. JP-A-61-26169, there is no description of access to outer subsystems (Prior Art Example 2).

As a further conventional technique, there is a parallel processing system improved in processing capacity by connecting a plurality of subsystems through switching interface circuits and butterfly switching circuits in TC2000 released on market by BBN Advanced Computer Inc. The scale of the data processing system is extended by using devices such as IP, IOP and MS devices on a plurality (8–504) of subsystems through a common OS, to thereby answer the needs of improvement in processing capacity, see Digest of Technical Papers of COMPCON, Spring, 1991, pp. 46–50. In TC2000, the system is formed so as to be suitable for parallel processing, so that address space formed by connecting memories on the plurality of subsystems is divided into local address space peculiar to each subsystem and common address space on the whole of the system (Prior Art Example 3).

Some conventional system has a work memory. For example, the system using the method described in Prior Art Example 1 can have a work memory provided in SC.

SUMMARY OF THE INVENTION

In the field of the bus connection type data processing system, there is no system known as a system covering a performance range beyond the conventional limit by connecting a plurality of subsystems.

In the Prior Art Example 1, there is no consideration with respect to the method of connection of a plurality of subsystems in the data processing system connected through buses.

The Prior Art Example 2 is a conventional technique with respect to the method of connection of a plurality of subsystems in the data processing system connected through buses. Although there is no description with respect to the access to an MS device on outer subsystems, the program is provided as an interface through consciousness of the outer subsystem identification number and the memory address. In the Prior Art Example 2, one address space cannot be constituted by the MS devices on the plurality of subsystems in total. Accordingly, the system cannot be used for the purpose (for example, tight coupling multiprocessor) of using devices such as IP, IOP and MS devices on the plurality of subsystems through a common OS.

To extend the scale of the data processing system by using devices such as IP, IOP and MS devices on a plurality of subsystems connected to one another through a common OS to thereby answer the needs of improvement in response of processing as made by a single system, it is necessary that the program can operate without consciousness of hardware configuration information (that indicates the correspondence between system address space and subsystem identification number).

An object of the present invention is therefore to provide one address space constituted by MS devices on a plurality of subsystems in total.

Frequent communication between subsystems is not required in the field of the multiplex processing system in the Prior Art Example 2, so that both access to an MS device and communication between subsystems which are mixed are supported by a standardized interface. For the purpose of using devices such as IP, IOP and MS devices on a plurality of subsystems connected to one another through a common OS, however, the performance of the system is however determined by the throughput of access to MS and the response time required for access from IOP.

Another object of the invention is therefore to provide separate interfaces for performing access to an MS device and communication between subsystems individually to eliminate the bad influence of communication between subsystems to thereby bring out the best in throughput of access to the MS device.

In the field of the parallel processing system in the Prior Art Example 3, the system is provided on the premise that a plurality (8 to 504) subsystems are connected. For example, two kinds of address spaces, namely, local address space peculiar to each subsystem to suppress the access struggle between processors and common address space constituted by areas used in common to processors as system address space, are formed by connecting a plurality of intra-subsystem memories. Because the connection of the plurality of subsystems are achieved by connecting switching interface circuits to butterfly switching circuits, the scale of the system becomes large in the physical quantity of hardware.

A further object of the invention is therefore to improve the performance of the data processing system (in the field of small-sized machine or workstation) (which has been heretofore formed by connecting one or two IP/IOP processors and one MS device by bus) without any change of the conventional program by connecting a plurality of subsystems by connection means, such as bus, provided so as to be small in the physical quantity of hardware and by operating the data processing system in one absolute address space in the same manner as in the conventional system.

Further, when IP or IOP in the data processing system operating in one absolute address space has a buffer storage (BS), it is necessary to prevent the non-coincidence between data in BS and data in MS by hardware. In the case where only one system is used, all IP processors on the system can check the write access to all MS devices on local bus as to whether the data in MS coincides with the data in BS. In the case where a plurality of subsystems (local busses) are used, however, IP on a subsystem 1 cannot check the write access from IP on a subsystem 0 to MS on the subsystem 0 on local bus as to whether the data in MS coincides with the data in BS. Accordingly, in the case of write access to MS closed in the subsystem 0, it is necessary to check the write access through transfer the write access between subsystems as to whether the data in MS coincides with the data in BS. If the write access is checked through successively transferring the write access between all subsystems, the frequency of access on both local bus and extension bus is increased because of the write access to thereby bring a throughput neck.

A further object of the invention is therefore to prevent the occurrence of an unnecessary throughput neck by checking the write access through transferring the write access between subsystems only in the case where a copy of MS on the inner subsystem exists in BS on one of outer subsystems, to thereby bring out the best in throughput of access to MS. In the parallel processing system in the Prior Art 3, nothing but the local address space peculiar to each subsystem is used as a subject of BS, so that ordinarily the common address space is not fetched in BS. Accordingly, it is unnecessary to check the write access through transferring the write access between subsystems.

Further, when IP or IOP issues locked memory access to MS in the field of the bus connection type data processing system, a method in which access from subsystems except the lock source is suppressed to forbid the right of using bus from being given to outer subsystems is used. In the data processing system having a plurality of busses connected hierarchically, a dead lock state may occur. For example, the case where the instruction processor IP00 on the subsystem 0 issues locked memory access to the main storage device MS1 on the subsystem 1 and, at the same time, the instruction processor IP10 on the subsystem 1 issues locked memory access to the main storage device MS0 on the subsystem 0 will be described hereunder with reference to FIG. 23.

When the IP10 on the subsystem 1 issues locked memory access to the main storage device MS0 on the subsystem 0, both local bus RBUS1 and extension bus EBUS are locked so that the right of using the busses is not given to other devices. On the other hand, when the IP10 on the subsystem 1 issues locked memory access to the main storage device MS0 on the subsystem 0, the local bus RBUS is locked so that the right of using the bus is not given to other devices. In the conventional method, in this case, both access from the IP00 and access from the IP10 cannot be completed, so that a dead lock state occurs.

A further object of the invention is to therefore provide a system in Which such a dead lock state is avoided.

Further, in the case where an attempt to improve the performance of the system on the whole is made by connecting a plurality of subsystems and increasing the number of processors, the attempt may result in failure because of the access time as a neck as long as the time required for read access to a main storage device on one of outer subsystems in the case of mishitting on buffer cannot be shortened. In this respect, there is no description in the Prior Art Example 2 and Prior Art Example 3. In the conventional system having work memory described above in the Prior Art Example 1, there is no consideration about the work memory in the data processing system of the type having a plurality of subsystems connected through buses.

A further object of the invention is therefore to provide a method for configuration of a specific processing system in which the time required for read access to a main storage device on one of outer subsystems is improved in the bus connection type data processing system having a plurality of subsystems connected by connection signals between subsystems.

To achieve the foregoing objects, according to the present invention, a plurality of subsystems each having at least one instruction processor (IP), at least one main storage device (MS device) and at least one input/output device (IOP) connected by local bus are connected by bus extenders (EX), extension busses or inter-subsystem transfer lines; an absolute address is used as address information on either local bus or transfer line; each of the main storage devices and bus extenders has an address check circuit for checking whether access on local bus is access to a main storage device on an inner subsystem or whether it is access to a main storage device on one of outer subsystems or whether the address of access is out of the system address space limit; when it is determined that the access is access to the main storage device on the inner subsystem or when it is determined that the address of access is out of the system address space limit, the main storage device in the inner subsystem receives the access; when a decision is made that the access is access to a main storage device on one of the outer subsystems, the bus extender EX receives the access to transfer the access to the main storage device on the outer subsystem.

Further, in the case where two or more subsystems are connected by extension bus, each of the bus extenders EX has an address check circuit for access on extension bus.

In a preferred embodiment of the invention, the address check circuit in each of the main storage devices comprises a system address space register that indicates the system address space limit, an intra-subsystem address space register that indicates the inner subsystem address space limit, comparator circuits for comparing the address on local bus with the contents of the system address space register and the contents of the intra-subsystem address space register.

As another example of the structure of the address check circuit in each of the main storage devices, the address check circuit comprises table information (information as to whether the address is in the system address and information indicating the subsystem assigned for the address) that indicates the configuration of the system address space, and a check circuit for reading the table information on the basis of the address on local bus to check the address on the basis on the output therefrom.

Further, each of the instruction processors IP has a buffer storage (BS) for holding a partial copy of the address space; and each of the bus extenders EX has a tag storage for holding information that indicates the address space with respect to the partial copy held by the respective BS.

Further, in a data processing system having a locked memory access function, lock state bits are provided to classifying the lock state of the local bus into an intra-subsystem lock state, an extra-subsystem lock state and a double lock state, for the purpose of avoiding a dead lock state. Further, when locked memory access on local bus from the instruction processor or input/output device on the inner subsystem is access to a main storage device on the inner subsystem, the lock state bits are set to an intra-subsystem lock state to suppress the local bus using requests except the lock source; and when locked memory access on local bus from the instruction processor or input/output device on the inner subsystem is access to a main storage device on one of outer subsystems, the lock state bits are set to an extra-subsystem lock state to suppress the local bus using requests except the bus extenders and the lock source.

Further, to achieve the purpose of improving the time required for read access to a main storage device on one of outer subsystems, there is provided a system having a plurality of subsystems each having at least one instruction processor, at least one input/output device and at least one main storage device connected by local bus, the plurality of subsystems connected to one another through transfer lines between subsystems, in which there are further provided a work storage that holds a part of main storage device on outer subsystems, an address array that holds an address on main storage device on outer subsystems, a means for making access to the work memory when it is determined that access on local bus is read access to a main storage device on one of outer subsystems.

The features of the present invention are summarized as follows.

According to the present invention, an instruction processor (IP) or an input/output device (IOP) in each of the subsystems can access to any address in the address space assigned to the system without consideration of the address space limit of the main storage device (MS) on the inner subsystem.

When the address of access is in the address space limit of the main storage device on the inner subsystem, access to the main storage device on the inner subsystem is made and then access results are returned to the access source.

When the address of access is out of the address space limit of the main storage device on the inner subsystem and in the system address space assigned to the system, access to a main storage device on one of outer subsystems is made through a bus extender (EX) on the inner subsystem and another extender (EX) on the outer subsystem and then access results are returned to the access source through the bus extender on the outer bus extender (EX) and the bus extender (EX) on the inner subsystem.

According to one feature of the present invention, when a determination that a BS in an IP outside the inner subsystems holds the copy is made by searching tag storage in EX with respect to write access from an IP on an inner subsystem to a main storage device MS on the inner subsystem, the write access is transferred to transfer line between subsystems to keep the coherency of the copy; and each EX receiving the access searches the tag storage in the EX; and when a determination that a BS in the IP in the inner subsystem holds the copy is made by the searching, the write access is transferred onto local bus, so that the IP can check the BS. When, on the contrary, there is no copy, the transfer of the write access can be aborted because the EX need not check the BS through transferring the write access to the outside of the subsystems.

According to another feature of the invention, when locked memory access is struggled on extension bus, that is, when for example an IP on the subsystem 0 issues locked memory access to a main storage device MS on the subsystem 1 and at the same time another IP on the subsystem 1 issues locked memory access to a main storage device MS on the subsystem 0, the subsystem having the right of using the extension bus can take the right of using the local bus through the bus extender. As a result, a dead lock state can be avoided.

In an embodiment of the invention which will be described later, when the bus extender in the inner subsystem sends locked memory access onto local bus in an extra-subsystem lock state, the lock state bits are set to a double lock state to suppress the local bus using requests except the bus extender in the inner subsystem. The double lock state is not always essential. A state produced by overlapping the extra-subsystem lock state and the intra-subsystem lock state is merely called "double lock state". It can be considered that the double lock state is a state in which the use of busses is locked except the bus extender as the lock source on the inner subsystem before the locked memory access issued on local bus from the bus extender is canceled, and that the double lock state is turned to an extra-subsystem lock state after the canceling of the intra-subsystem lock state. Under this consideration, a state substantially the same as the double lock state may be provided by another means.

Further, according to another feature of the invention, in the case where an instruction processor (IP) or an input/output device (IOP) issues a read request to a main storage device on an outer subsystem, data can be read from a memory work if the address exists in the address array on the outer subsystem. Accordingly, access to a main storage device on an outer subsystem can be made speedily compared with the case of access to a main storage device on an outer subsystem through transfer lines between subsystems.

The reason why data in main storage devices on outer subsystems are set to the work memory is as follows. Because access to a main storage device on an outer subsystem requires high frequency in use of local and extension busses, the access time is increased remarkably compared with the case where access to a main storage device on the inner subsystem is completed by using the bus once. Accordingly, the effect of improvement in performance can be enlarged by limiting the use of the work memory to the aforementioned condition. The difference between the time required for the read access to a main storage device on the inner subsystem and the time required for the read access to a main storage device on one of outer subsystems can be shortened by using the work memory.

In the case where a write request is issued, the issue (re-writing while leaving the write request behind) of the next write request is made without checking whether the write request is terminated or not. Accordingly, there is no influence on the response time of the request.

The following two methods are used in the case where a write request is issued.

(1) A method in which data are written in both work memory and main storage device on one of outer subsystems.

(2) A method in which data are not written in the main storage device but are written in the work memory.

(1) In the method in which data are written in both work memory and main storage device on one of outer subsystems, data may be written in both the work memory and the main storage device without any problem.

(2) In the method in which data are not written in the main storage device but are written in the work memory, coincidence control between work memory and main storage device is required but a well-known method used for coincidence control of cache memory may be used without any influence on the present invention.

BRIEF DESCRIPTION OF THE DRAWINGS

FIG. 1A is a block diagram showing a half of the data processing system as an embodiment of the present invention;

FIG. 1B is a block diagram showing the other half of the data processing system as the embodiment of the invention;

FIG. 2A is a view showing an example of the relation between the address space of the data processing system and the address space of each subsystem;

FIG. 2C is a view showing another example of the relation between the address space of the data processing system and the address space of each subsystem;

FIG. 2D is a view showing another example of the relation between the address space of the data processing system and the address space of each subsystem;

FIG. 4B is a block diagram showing the other half of the main storage device depicted in FIGS. 1A and 1B;

FIG. 6 is a block diagram of the address check circuit depicted in FIG. 4A;

FIG. 8A is a block diagram showing another example of the address space circuit depicted in FIG. 4A;

DESCRIPTION OF THE PREFERRED EMBODIMENTS

Figure 2B:
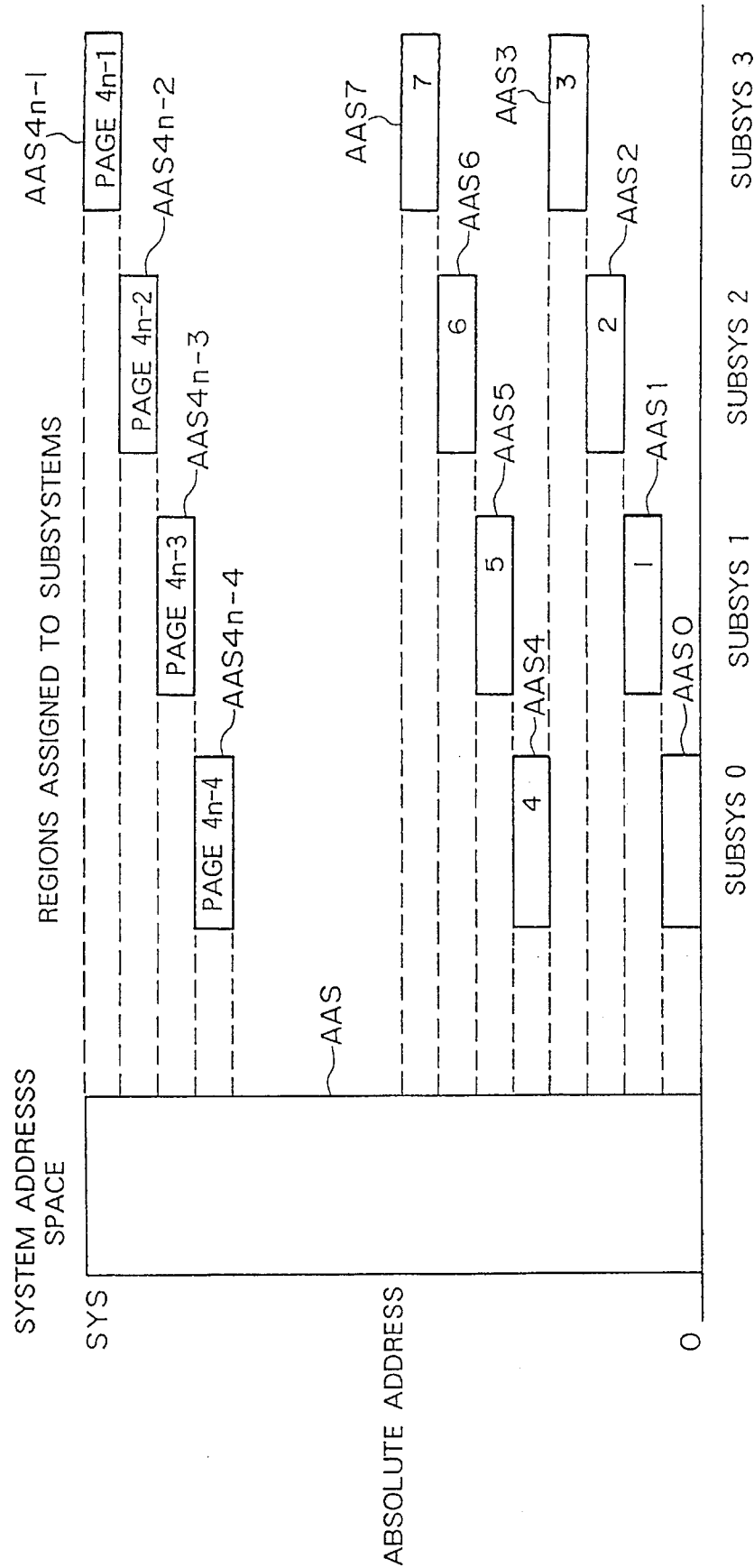
FIG. 2B is a view showing another example of the relation between the address space of the data processing system and the address space of each subsystem.

Embodiments of the present invention will be described hereunder with reference to the drawings.

EMBODIMENT 1

FIGS. 1A and 1B are block diagrams showing a first embodiment of the present invention. This data processing system is constituted by a plurality of data processor subsystems each of which has at least one instruction processor (IP), at least one input-output device (IOP), and at least one main storage device (MS). This data processing system further has at least one service processor (SVP).

In this embodiment, the data processing system is constituted by four data processor subsystems (K0, K1, K2 and K3). One data processor subsystem K0 includes instruction processors IP00 and IP01, a main storage device MS0, input-output devices IOP00 and IOP01 and a bus extender EX0 for connecting those parts by a local bus RBUS0. Another data processor subsystem K1 includes instruction processors IP10 and IP11, a main storage device MS1, input-output devices IOP10 and IOP11 and a bus extender EX1 for connecting those parts by a local bus RBUS1. The subsystems K0 to K3 are connected by an extension bus EBUS. The service processor SVP is provided with busses leading to the four subsystems (K0, K1, K2 and K3). The instruction processors IP and the input-output devices IOP are connected by processor busses PBUS to perform communication between devices such as IP and IOP. The main storage device MS0 includes a bus arbiter 201 of the local bus RBUS0, an RBUS control circuit 210, an address checking circuit 220 and a memory circuit 250. The bus extender EX0 includes an RBUS control circuit 310, an EBUS control circuit 320, an address checking circuit 330 and a subsystem identification number checking circuit 350.

FIGS. 2A through 2D are views showing the relation between address space in the data processing system and address space assigned to the respective subsystems. The address of the data processing system is provided in the form of an absolute address, so that the main storage device in each of the subsystems forms an assigned area. The terminology "absolute address" means a processor address after necessary dynamic address conversion and pre-fixing. An embodiment of the present invention will be first described with reference to FIG. 2A before the other examples as to FIGS. 2B, 2C and 2D will be described.

The address space of the data processing system has addresses of from memory address 0 to memory address SYS which are assigned to the subsystems 0 to 3 and respectively supported by the subsystems 0 to 3. In this drawing, MAX and MIN are absolute addresses for limiting address space ranges in the respective subsystems, so that each of the subsystems supports an address space range of from MIN (inclusive) to MAX (not inclusive). MAX in the subsystem 0 is continuous to MIN in the subsystem 1; MAX in the subsystem 1 is continuous to MIN in the subsystem 2; MAX in the subsystem 2 is continuous to MIN in the subsystem 3; and MAX in the subsystem 3 is equal to SYS. Hereby, the address space of the data processing system is assigned to the subsystems and supported by the subsystems. Information related to MAX and MIN is stored in an address space limit indicating register in the address checking circuit in each of the subsystems.

Figure 3A:
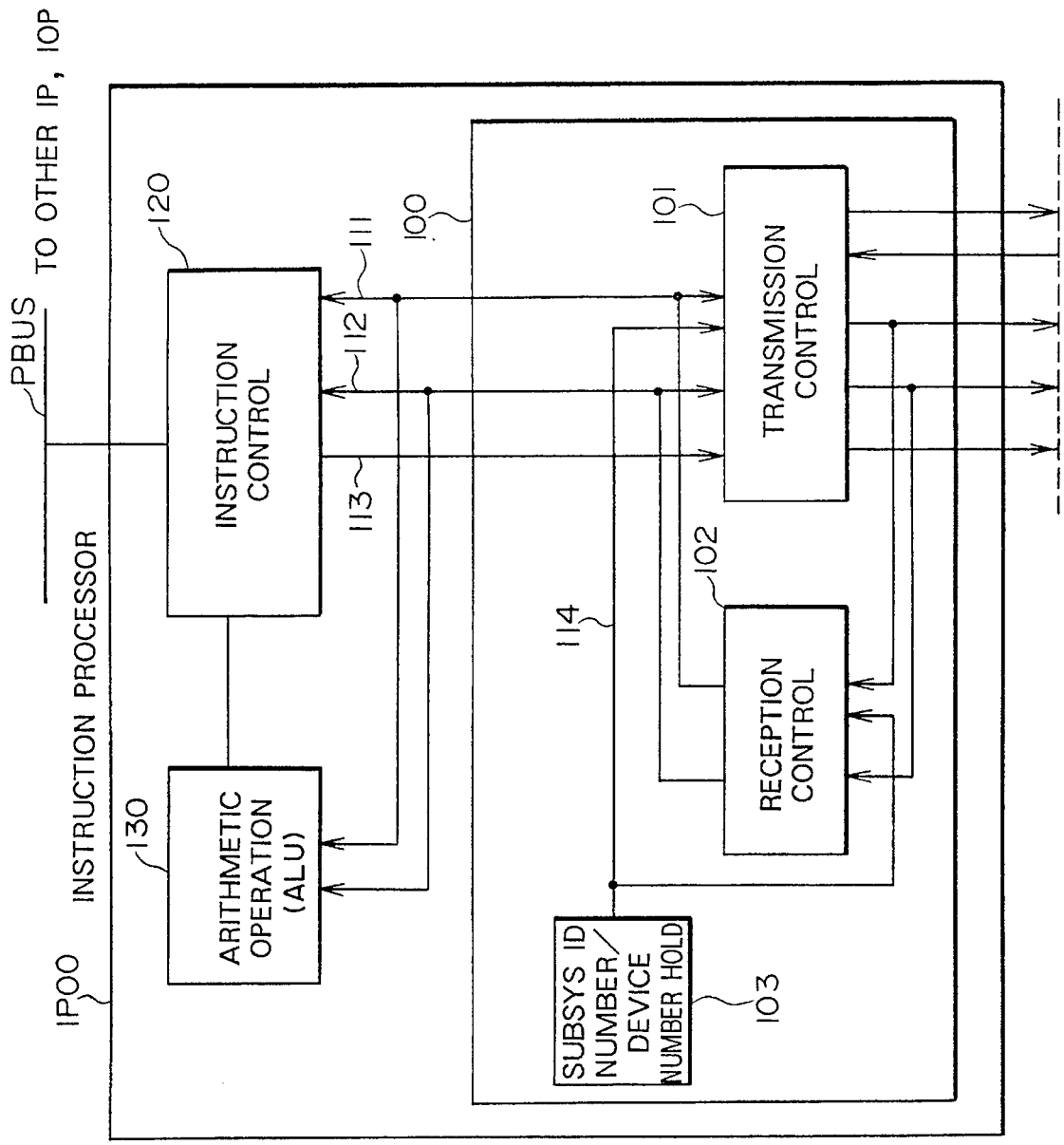
FIG. 3A is a block diagram showing a half of the local bus in the data processing system depicted in FIGS. 1A and 1B.
Figure 3B:
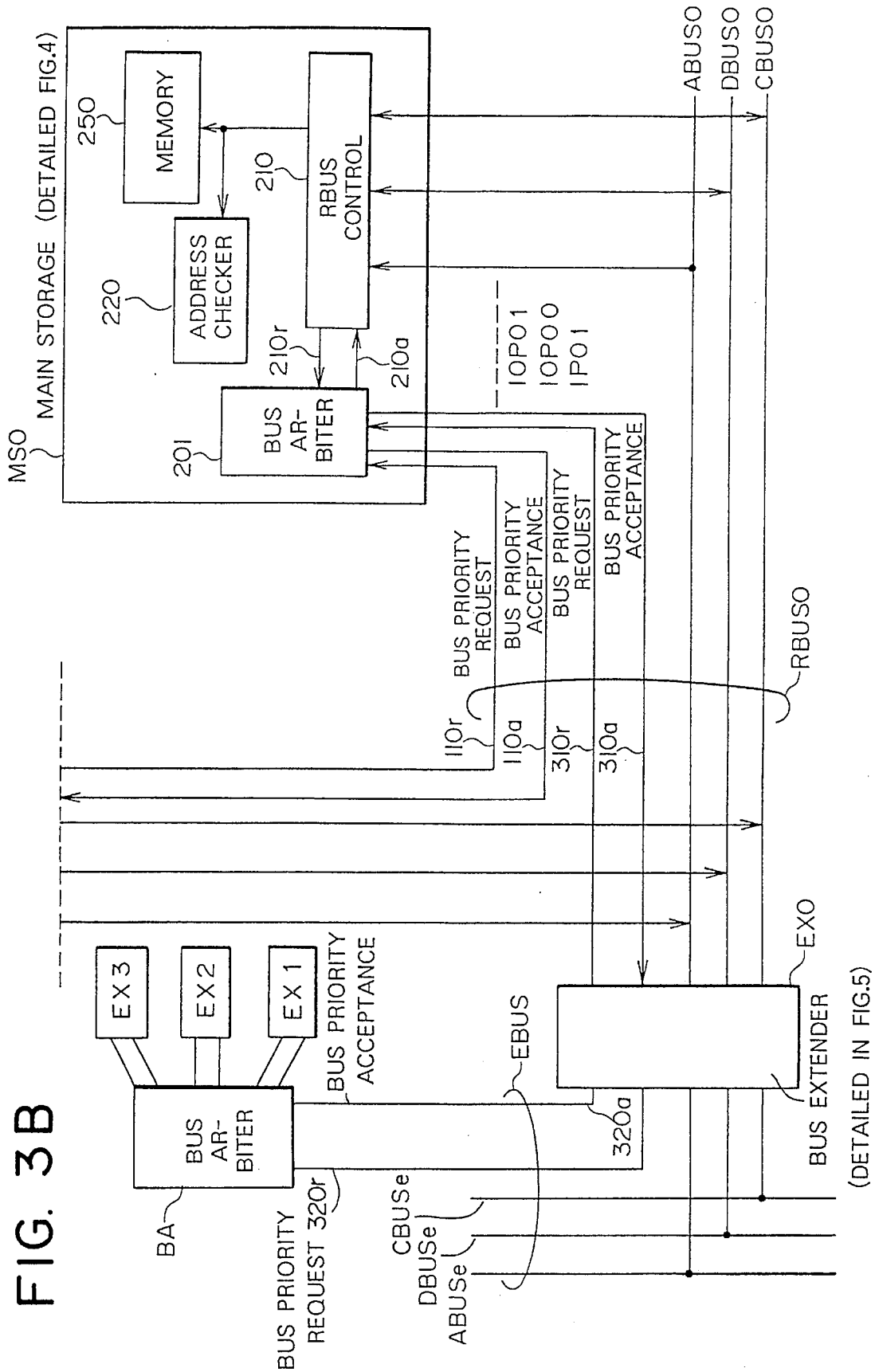
FIG. 3B is a block diagram showing the other half of the local bus in the data processing system depicted in FIGS. 1A and 1B.
Figure 3C:
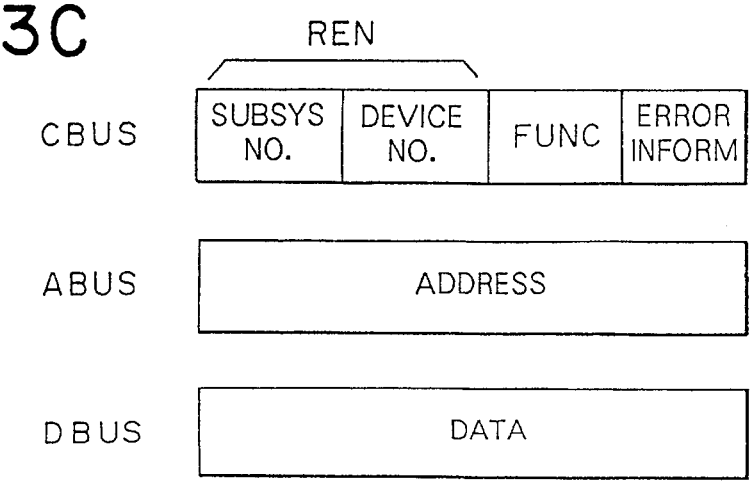
FIG. 3C is a view showing a command format for the address bus, data bus and control bus in the local bus.

FIGS. 3A and 3B are structural diagrams of local busses in the data processing system forming the subsystems shown in FIGS. 1A and 1B; and FIG. 3C shows a command format.

FIGS. 3A and 3B show the relations of the local bus RBUS0 with the instruction processor IP00, bus extender EX0 and main storage device MS0. The instruction processor IP00, bus extender EX0 and main storage device MS0 are connected to one another by the local bus RBUS0. The local bus RBUS0 is composed of an address bus ABUS, a data bus DBUS, and a control bus CBUS for expressing control information such as access assortment, so that bus priority is transferred by the bus arbiter 201 in the main storage device MS0. The instruction processor IP00 has an instruction control circuit 120, an arithmetic operation control circuit 130 and an RBUS control circuit 100. The instruction control circuit 120 also controls the processor bus PBUS which supports communication between another IP and another IOP. This processor bus PBUS has been described in Journal of Technical Disclosure, Vol. 12–39, No. 87-11162, Japan Institute of Invention and Innovation (JIII). The RBUS control circuit 100 has a transmission control circuit 101, a reception control circuit 102 and a subsystem identification number/device number hold circuit 103.

FIG. 3C shows a command format in the case where access to a main storage device MS in one and the same subsystem in the data processing system shown in FIGS. 1A and 1B is performed or in the case where access to an inter-subsystem main storage device MS which covers a plurality of subsystems is performed.

The command format is used in common to the local bus and the extension bus. The command format is composed of an address bus ABUS, a data bus DBUS and a control bus CBUS. An MS address is placed on the address bus ABUS; read/write data are placed on the data bus DBUS; and access control information is placed on the control bus CBUS. The control bus CBUS is composed of an REN portion for expressing the subsystem identification number and device number of the request source, an FUNC portion for expressing transmission of a write request or return of results, and an error information portion for expressing the presence or absence of error at the time of the returning of the results. The MS address placed on the address bus ABUS is used in the form of an absolute address which is a unique address in the whole data processing system. The operation of the local bus will be described hereunder in the case where the instruction processor IP0 makes access to memories in the main storage device MS0 to perform reading/writing. First it will be described in the case of memory reading.

When an instruction fetch request is generated in the instruction control circuit 120, the instruction control circuit 120 transfers both an address signal 113 and an access assortment signal 111 (FUNC field) to the transmission control circuit 101. The transmission control circuit 101 generates a command format for CBUS through merging the access assortment signal 111 into a subsystem identification number/device number signal 114 generated from the subsystem identification number/device number hold circuit 103 and, at the same time, the transmission control circuit 101 sends a bus priority request signal 110r to the bus arbiter 201. The bus arbiter 201 judges whether the bus priority request is acceptable or not. When the bus priority request is accepted, the bus arbiter 201 sends a bus priority acceptance signal 110a to the transmission control circuit 101. The transmission control circuit 101 receiving the bus priority acceptance signal 110a sends access information to the address bus ABUS and the control bus CBUS. The RBUS control circuit 210 in the main storage device MS0 receives the access information and operates the memory circuit 250 if the address is in an address space limit assigned to the main storage device MS0 on the basis of the checking in the address checking circuit 220.

In the following, the operation of the local bus is described in the case of the returning of the results. When the memory access is completed, the access results are stored in the RBUS control circuit 210 in the main storage device MS0. The RBUS control circuit 210 sends a bus priority request signal 210r to the bus arbiter 201. The bus arbiter 201 judges whether the bus priority request is acceptable or not. When the bus priority request is accepted, the bus arbiter 201 sends a bus priority acceptance signal 210a to the RBUS control circuit 210. The RBUS control circuit 210 receiving the bus priority acceptance signal 210a sends read data to the data bus DBUS and sends FUNC field expressing the result transferring operation, information expressing the presence or absence of error and REN field expressing the subsystem identification number/device number of the access source to the control bus CBUS. In response to this, the reception control circuit 102 in the instruction processor IP0 performs a receiving operation after confirming the coincidence between the subsystem identification number/ device number signal 114 (REN field) obtained from the subsystem identification number/device number hold circuit 103 and the REN field on the control bus CBUS. That is, the reception control circuit 102 sends both an access assortment signal 111 (FUNC field) and a data signal 112 (fetch instruction) to the instruction control circuit 120, so that the instruction control circuit 120 receives these signals.

In the following, the operation of the local bus is described in the case of memory writing. The operation of the local bus in the case of memory writing is substantially the same as the operation thereof in the case of memory reading. In the case of memory writing, write data are sent from the arithmetic operation control circuit 130 in the instruction processor IP0 to a data signal 112. In response to this, the transmission control circuit 101 sends access information to the data bus DBUS, address bus ABUS and control bus CBUS. The returning of the accessing results is performed through the control bus CBUS. The RBUS control circuit 210 sends FUNC field expressing the result transferring operation, information expressing the presence or absence of error and REN field received from the access source to the control bus CBUS. The operation of the local bus except the aforementioned operation is the same as the operation in the case of memory reading.

Thus, the operation of the local bus has been made, and the operation of the extension bus is performed in the same manner.

Access request/result propagates individually on each of the local busses and the extension busses. When, for example, IP00 makes access to MS1, bus priority is successively given to RBUS0, EBUS and RBUS1 before MS1 is reached. In this case, the bus priority of RBUS0 is released while EBUS takes bus priority, so that RBUS0 can be used for another access.

Access of an IP or IOP to a main storage device MS is classified into (1) access to a main storage device MS on the inner subsystem, (2) access to a main storage device MS one one of outer subsystems and (3) access to a main storage device MS not belonging to any subsystem (access in program error).

(1) Access to Main Storage Device on Inner Subsystem

Access of the instruction processor IP00 to the main storage device MS0 will be described hereunder.

The instruction processor IP00 sends an access request to the bus arbiter 201. When the access request is accepted, access is sent to the local bus RBUS0. With respect to the access, the main storage device MS0 and the bus extender EX0 respectively make a checking.

The operation of the main storage device MS0 will be described hereunder.

Figure 4A:
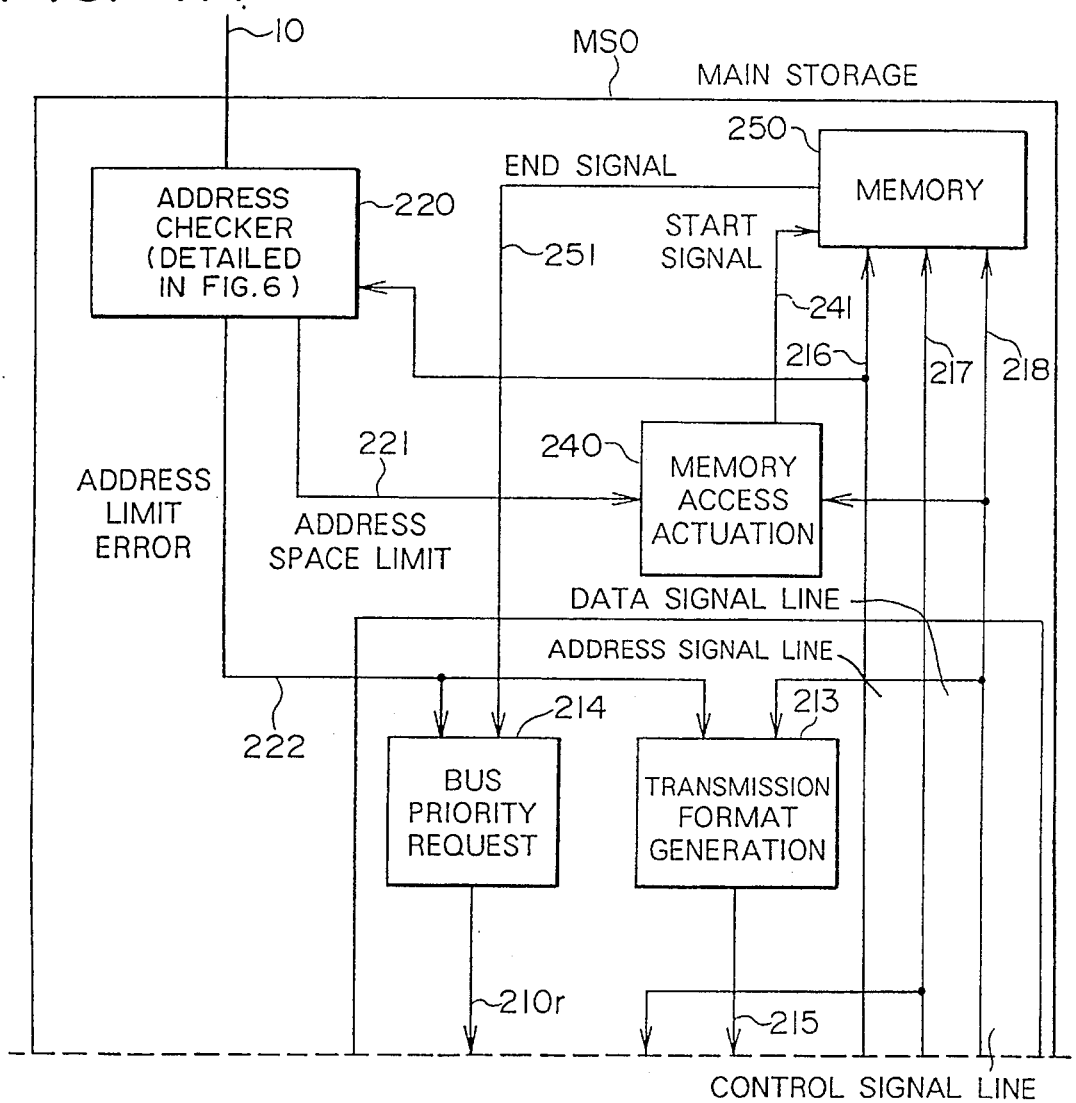
FIG. 4A is a block diagram showing a half of the main storage device depicted in FIGS. 1A and 1B.

The structure of the main storage device MS0 is shown in FIGS. 4A and 4B. The main storage device MS0 comprises a bus arbiter 201, an RBUS control circuit 210, an address checking circuit 220, a memory access actuating circuit 240 and a memory circuit 250. The RBUS control circuit 210 comprises a reception control circuit 211, a transmission control circuit 212, a bus priority request circuit 214 and a transmission format generating circuit 213.

When the reception control circuit 211 receives access on the respective RBUS0, the address checking circuit 220 judges whether the absolute address on the address signal line 216 is in a range assigned to the inner subsystem and whether the absolute address is in the address space of the system. Because access to a main storage device MS on the inner subsystem is described now, the address space limit signal 221 becomes "1" and the address space limit error signal 222 (which takes "1" when the address is out of the address space of the system and which takes "0" when the address is in the address space of the system) becomes "0". The memory access actuating circuit 240 receives both the FUNC field and the address space limit signal on the control signal line 218 and sends a start signal 241 to the memory circuit 250. The memory circuit 250 receiving the start signal 241 performs memory reading/writing on the basis of information on the address signal line 216, the data signal line 217 and the control signal line 218.

The transmission format generating circuit 213 generates a command format for CBUS on the basis of the FUNC field information, the REN field information and the address space limit error signal 222 and sends the command format to the transmission control circuit 212 by the signal line 215. Here, the FUNC field information is converted into a code expressing the transfer of the results.

When reading/writing is completed, an end signal 251 is transmitted. The bus priority request circuit 214 receiving the end signal sends a bus priority request signal 210r to the bus arbiter 201. The bus arbiter 201 judges whether the bus right is acceptable or not. When the bus right is accepted, the bus arbiter 201 sends a bus priority acceptance signal 210a to the transmission control circuit 212. The transmission control circuit 212 receiving the bus priority acceptance signal 210a sends information related to the operation of transferring the results to the control bus CBUS0. In the case of reading, the transmission control circuit 212 further sends read data to the data bus DBUS0.

The operation of the bus extender EX0 will be described hereunder.

Figure 5A:
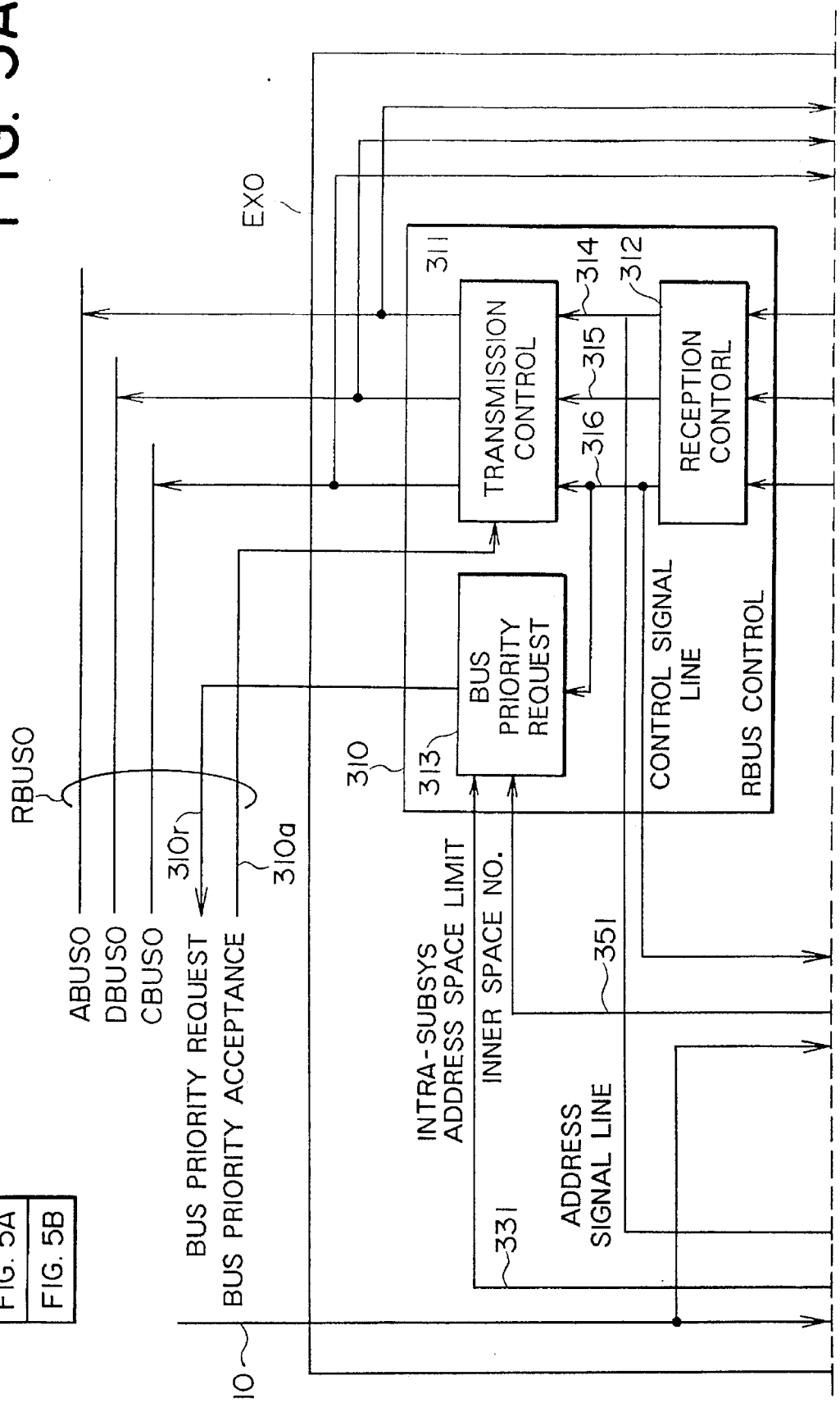
FIG. 5A is a block diagram showing a half of the bus extender depicted in FIGS. 1A and 1B.
Figure 5B:
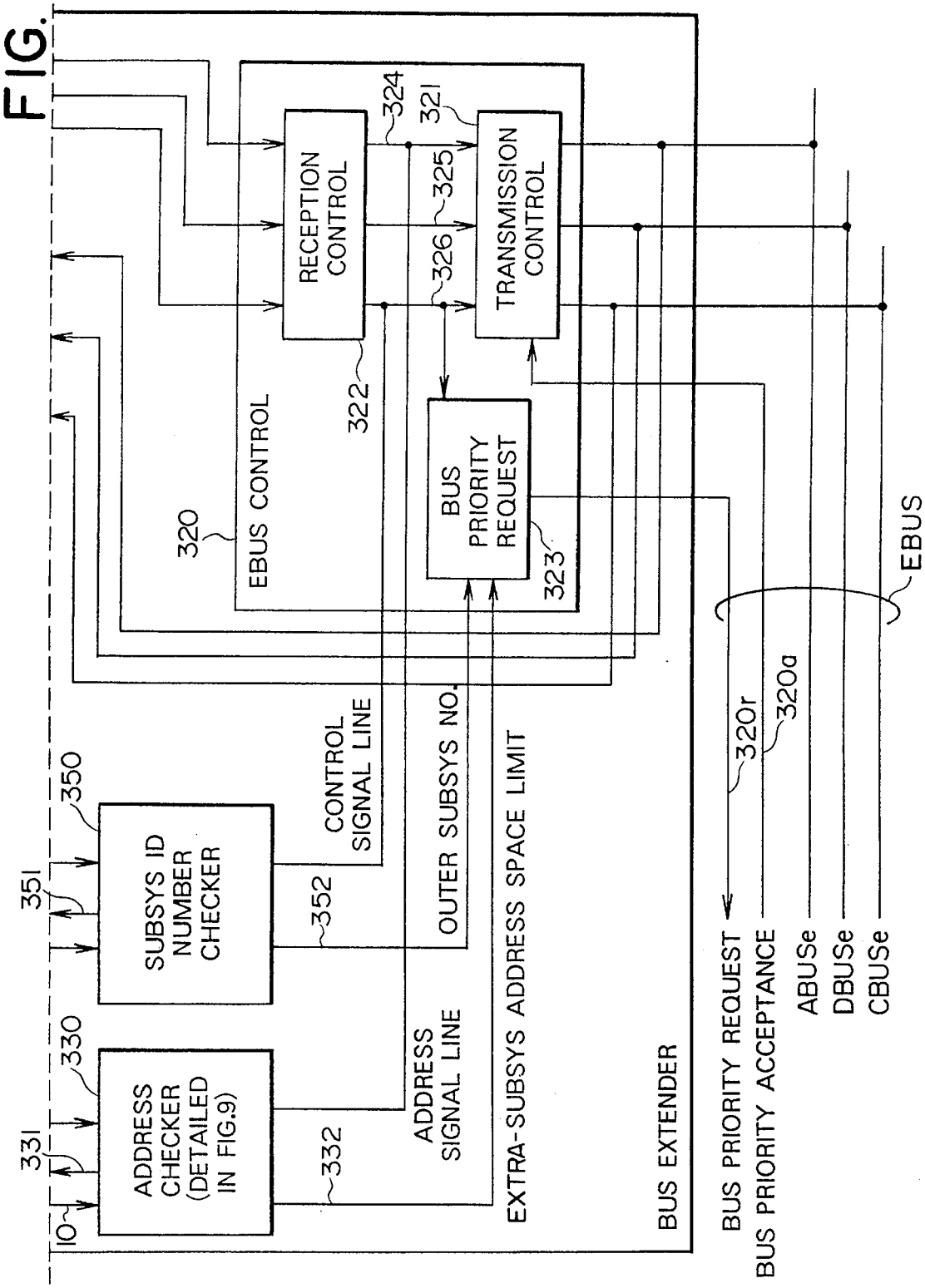
FIG. 5B is a block diagram showing the other half of the bus extender depicted in FIGS. 1A and 1B.

The structure of the bus extender EX0 is shown in FIGS. 5A and 5B. The bus extender EX0 comprises an RBUS control circuit 310, an EBUS control circuit 320, an address checking circuit 330 and a subsystem identification number checking circuit 350. The RBUS control circuit 310 comprises a reception control circuit 312, a transmission control circuit 311 and a bus priority request circuit 313. The EBUS control circuit 320 comprises a reception control circuit 322, a transmission control circuit 321 and a bus priority request circuit 323.

When the reception control circuit 322 receives an access request on the local bus RBUS0, the address checking circuit 330 makes a checking as to whether the absolute address on the address signal line 324 is in a range assigned to the inner subsystem. At the same time, the transmission control circuit 321 receives access information from the reception control circuit 322. Because access to a main storage device MS on the inner subsystem is described now, the extra-subsystem address space limit signal 332 becomes "0". Accordingly, the bus priority request circuit 323 does not send the bus priority request signal 320r to the bus arbiter BA, so that the access in the transmission control circuit 321 is aborted.

The transfer of the accessing results has been described with the description of the operation of the local bus.

(2) Access to Main Storage Device on One of Other Subsystems

Access of an instruction processor IP00 to a main storage device MS1 will be described hereunder.

First the instruction processor IP00 sends an access request to the local bus RBUS0. With respect to this access, the main storage device MS0 and the bus extender EX0 make a checking individually.

When the reception control circuit 211 receives the access request on the local bus RBUS0, the address checking circuit 220 in the MS0 makes a checking as to whether the absolute address on the address signal line 216 is in a range assigned to the inner subsystem and whether the absolute address is in the address space of the system. Because access to a main storage device MS on one of outer subsystems is described now, the address space limit signal 221 becomes "0" and the address space limit error signal 222 also becomes "0". Accordingly, the memory access actuating circuit 240 does not send the start signal 241 to the memory circuit 250, so that the access in the reception control circuit 211 is aborted.

The operation of the bus extender EX0 will be described hereunder. When the reception control circuit 322 in the EBUS control circuit 320 receives an access signal on the local bus RBUS0, the address checking circuit 330 makes a checking as to whether the absolute address on the address signal line 324 is in a range assigned to the inner subsystem. At the same time, the transmission control circuit 321 receives transmission information for a common bus EBUS from the reception control circuit 322. Because access to a main storage device MS on one of outer subsystems is described now, the extra-subsystem address space limit signal 332 becomes "1". Accordingly, the bus priority request circuit 323 sends a bus priority request signal 320r to the bus arbiter BA, so that the bus arbiter BA makes a checking as to whether the bus priority is acceptable or not. When the bus priority is accepted, the bus arbiter BA sends a bus priority acceptance signal 320a to the transmission control circuit 321. The transmission control circuit 321 receiving this signal sends access information to the control bus CBUSe. In the case of writing, the transmission control circuit 321 further sends write data to the data bus DBUSe.

With respect to the access on the extension bus EBUS, local bus extenders EX1 to EX3 in the subsystems K1 to K3 make a checking individually. In the case of the access request to the main storage device MS1, the bus extender EX1 receives the access and the bus extenders EX2 and EX3 abort the access. The bus extender EX1 replaced by a bus extender EX0 will be described with reference to FIGS. 5A and 5B.

When the reception control circuit 312 in the RBUS control circuit 310 receives the access on the extension bus EBUS, the address checking circuit 330 makes a checking as to whether the absolute address on the address signal line 314 is in a range assigned to the inner subsystem. At the same time, the transmission control circuit 311 receives access information from the reception control circuit 312. Because here is the case of access to a main storage device MS on the inner subsystem, the intra-subsystem address space limit signal 331 becomes "1". Accordingly, the bus priority request circuit 313 sends a bus priority request signal 310r to the bus arbiter 201, so that the bus arbiter 201 makes a checking as to whether the bus priority is acceptable or not. When the bus priority is accepted, the bus arbiter 201 sends a bus priority acceptance signal 310a to the transmission control circuit 321. The transmission control circuit 321 receiving this signal sends access information to the address bus ABUS0 and the control bus CBUS0. In the case of writing, the transmission control circuit 321 further sends write data to the data bus DBUS0.

The operation of the bus extender EX1 replaced by the bus extender EX0 has been described with reference to FIGS. 5A and 5B. The access aborting operations of the bus extenders EX2 and EX3 can be also described with reference to the same drawings. In this case, the intra-subsystem address space limit signal 331 becomes "0". Accordingly, the bus priority request circuit 313 does not send the bus priority request signal 310r to the bus arbiter 201, so that the access is aborted. The procedure that the bus extender EX1 receiving the access transfers the access to the main storage device MS1 is the same as in the case of (1). Description of the case where the instruction processor IP00 makes access to the main storage device MS1 is completed.

The case where the accessing results are transferred to the instruction processor IP00 (through the bus extenders EX1 and EX0 on the basis of information in the REN portion of the control bus CBUS) after the access in the main storage device MS1 is completed will be described hereunder.

Like the case of (1), first the main storage device MS1 sends accessing result transferring operation control information to the control bus CBUS1. In the case of reading, the main storage device MS1 further sends read data to the data bus DBUS1. As described above, the instruction processors IP10 and IP11, the input-output processors IOP10 and IOP11 and the reception control circuit of the bus extender EX1 on the local bus RBUS1 receive this information and perform the receiving operation after the coincidence between the REN field on the control bus CBUS and the subsystem identification number/device number signal (REN field) obtained from the subsystem identification number/device number hold circuit is confirmed. In this case, the bus extender EX1 receives accessing results.

The operation of the bus extender EX1 receiving accessing results on the local bus RBUS1 and transmitting the accessing results to the extension bus EBUS will be described hereunder with reference to FIGS. 5A and 5B while replacing the bus extender EX1 by the bus extender EX0.

When the reception control circuit 322 in the EBUS control circuit 320 receives the accessing results on the local bus RBUS1 (as RBUS0 in the drawings), the reception control circuit 322 sends the accessing results given through the address bus ABUS1, the data bus DBUS1 and the control bus CBUS1 (as ABUS0, DBUS0 and CBUS0 in the drawings), respectively to signal lines 324, 325 and 326.

The subsystem identification number checking circuit 350 receives the signal line 326 having the FUNC field expressing the access result transferring operation and the REN field expressing the subsystem identification number 0, compares this with information (expressing the subsystem identification number 1) in the subsystem identification number hold circuit in the subsystem identification number checking circuit 350 and transmits comparing results to an outer subsystem identification number signal 352 (in the case where access results are transferred, the address checking circuit does not operate because the memory address is not given). In this case, the outer subsystem identification number signal 352 becomes "1". The bus priority request circuit 323 receives the outer subsystem identification number signal 352 and the FUNC field on the signal line 326 and sends a bus priority request signal 320r to the extension bus EBUS to transmit information related to the result transferring operation. When a corresponding bus priority acceptance signal 320a is received, the transmission control circuit 321 transmits access results to the extension bus EBUS.

Then, the bus extenders EX0, EX2 and EX3 make a checking individually with respect to the transferring of the access results on the extension bus EBUS. In the case of access issued by the instruction processor IP00, the subsystem identification number in the REN field expresses the subsystem 0. Accordingly, the bus extender EX0 receives the transferring of the access results and the bus extenders EX2 and EX3 abort it. The operation of the bus extender EX0 will be described hereunder with reference to FIGS. 5A and 5B.

When the reception control circuit 312 in the RBUS control circuit 310 receives the access on the extension bus EBUS, the subsystem identification number checking circuit 350 sets the inner subsystem identification number signal 351 to "1" because the FUNC field on the signal line 316 expresses the result transferring operation and the subsystem identification number in the REN field expresses expresses the subsystem 0. At the same time, the transmission control circuit 311 receives access results from the reception control circuit 312. The bus priority request circuit 313 receives the inner subsystem identification number signal 351 and the FUNC field on the signal line 316 and sends a bus priority request signal 310r to the bus arbiter 201. The bus arbiter 201 judges whether the bus priority is acceptable. When the bus priority is accepted, the bus arbiter 201 sends a bus priority acceptance signal 310a to the transmission control circuit 311. The transmission control circuit 311 receiving this signal sends access results to the local bus RBUS0.

The information related to the result transferring operation on the local bus RBUS is received by the instruction processor IP00 after coincidence in subsystem identification number is confirmed. The case where the main storage device MS1 transfers access results to the instruction processor IP00 has been described.

(3) Access to Main Storage Device not Belonging to any Subsystem

The operation of the main storage device MS0 will be described hereunder. When the reception control circuit 211 receives an access request on the local bus RBUS0, the address checking circuit 220 judges whether the absolute address on the address signal line 216 is in a range assigned to the inner subsystem or whether this is in the address space of the system. Because here is access to a main storage device MS not included in any subsystem, the address space limit signal 221 becomes "0" and the address space limit error signal 222 becomes "1". The memory access actuating circuit 240 receives the FUNC field on the control signal line 218 but does not send the start signal 241 to the memory circuit 250 because the address space limit signal 221 is "0". Accordingly, the memory circuit 250 does not perform any memory reading/writing operation.

The transmission format generating circuit 213 generates a command format for CBUS on the basis of the information in the FUNC and REN fields and the address space limit error signal 222 and sends the command format to the transmission control circuit 101 through the signal line 215. The information in the FUNC field is converted into a code expressing the transferring of the results, and the information in the error information field is converted into a code expressing address space limit error. The bus priority request circuit 214 receiving the address space limit error signal 222 sends a bus priority request signal 210r to the bus arbiter 201. The bus arbiter 201 judges whether the bus priority is acceptable. When the bus priority is accepted, the bus arbiter 201 sends a bus priority acceptance signal 210a to the transmission control circuit 212. The transmission control circuit 212 receiving this signal sends access results to the control bus CBUS0. The access source receives the access results, so that the occurrence of address space limit error in the program is detected.

The operation of the bus extender EX0 will be described hereunder. When the reception control circuit 322 in the EBUS control circuit 320 receives an access request on the local bus RBUS0, the address checking circuit 330 judges whether the absolute address on the address signal line 324 is in a range assigned to the inner subsystem. At the same time, the transmission control circuit 321 receives transmission information for a common bus EBUS from the reception control circuit 322.

Because here is access to a main storage device MS not included in any subsystem, the extra-subsystem address space limit signal 332 becomes "1". Accordingly, the bus priority request circuit sends a bus priority request signal 320r to the bus arbiter BA, so that the bus arbiter BA judges whether the bus priority is acceptable. When the bus priority is accepted, the bus arbiter BA sends a bus priority acceptance signal 320*a* to the transmission control circuit 321. The transmission control circuit 321 receiving this signal sends access information to the extension bus EBUS. The bus-extenders EX1 to EX3 make a checking individually with respect to the access request on the extension bus EBUS. In the case of access to a main storage device MS not included in any subsystem, the bus extenders EX1 to EX3 abort the access request.

The case where a checking circuit for judging whether the address is in an address space limit of the system is also provided in the address checking circuit 330 in the local bus extender EX is considered as another structure. In this case, the address checking circuit 330 judges by the absolute address on the address signal line 324 whether there is occurrence of address space limit error. When there is occurrence of address space limit error, the bus priority request circuit 323 does not send the bus priority request signal 310*r* to the bus arbiter BA so that the access request in the transmission control circuit 321 is aborted.

The operation of an instruction processor IP or input-output processor IOP accessing an main storage device MS has been described.

Figure 7:
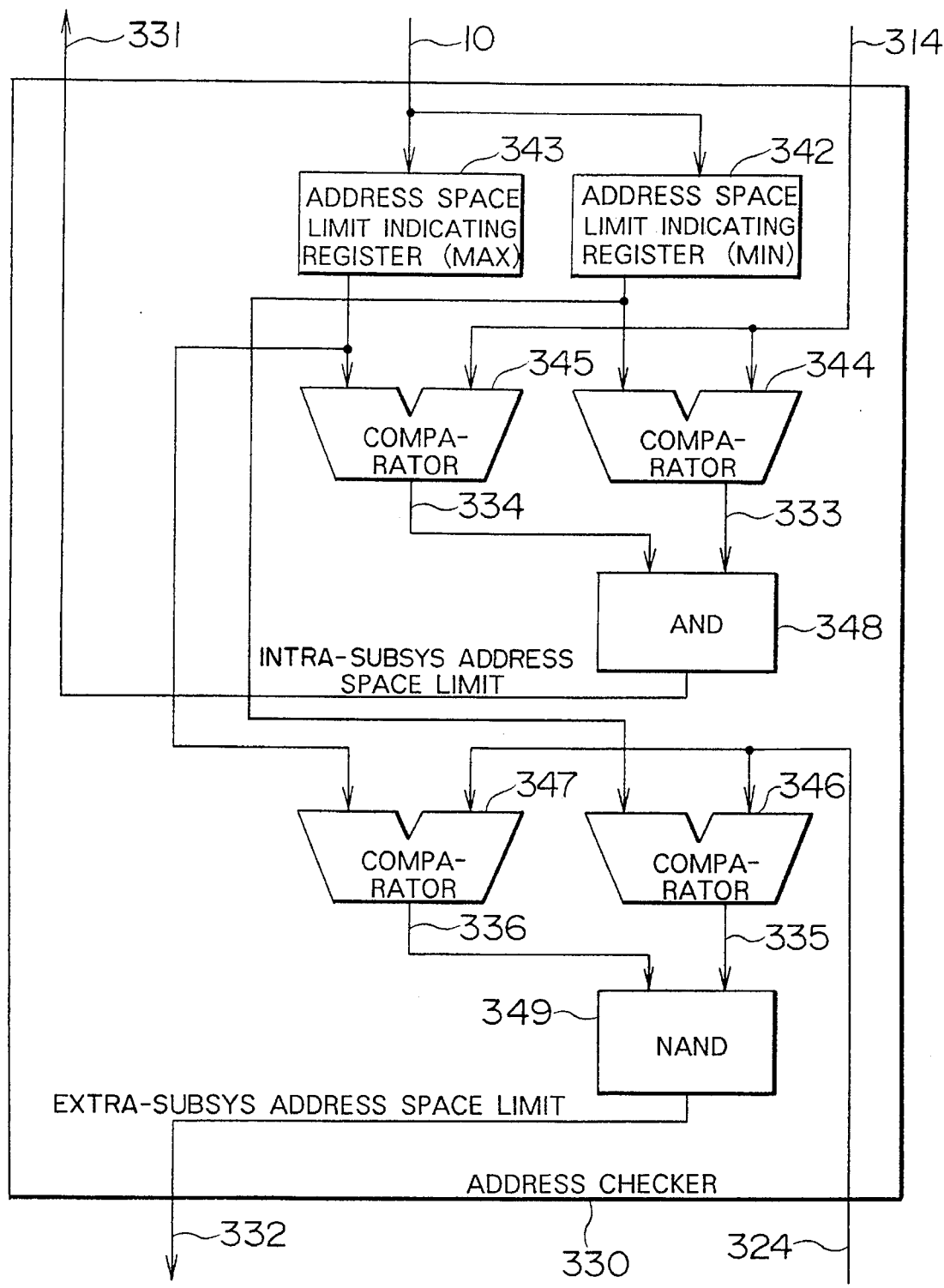
FIG. 7 is a block diagram of the address check circuit depicted in FIG. 5B.

The address checking circuit 220 in the main storage device MS0 and the address checking circuit 330 in the bus extender EX0 will be described hereunder with reference to FIGS. 6 and 7.

The address checking circuit 220 (FIG. 6) in the main storage device MS0 has an address space limit indicating register (MAX) 233, an address space limit indicating register (MIN) 232, a system address space limit indicating register (SYS) 231, comparators 234, 235 and 236 and an AND circuit 227. The values in the address space limit indicating registers (MAX) 233 and (MIN) 232 are values MAX and MIN in the subsystem 0 as shown in FIG. 2A, and the value in the system address space limit indicating register (SYS) 231 is a value SYS in the system address space as shown in FIG. 2A.

The address checking circuit 220 judges whether the absolute address on the address signal line 216 is in a range assigned to the inner subsystem or whether this is in the system address space. The comparators 235 and 236 send 1 to the signal line 223 when the absolute address on the address signal line 216 is not smaller than the value of the address space limit indicating register (MIN) 232 and send 1 to the signal line 224 when this absolute address is smaller than the value of the address space limit indicating register (MAX) 233, respectively. In the case where the signal lines 223 and 224 are all "1" (in the case where the address is in the address space limit of the subsystem 0), the AND circuit 227 sends "1" to the address space limit signal 221. In the case where one of the signal lines 223 and 224 is "0" (in the case where the address is out of the address space limit of the subsystem 0), the AND circuit 227 sends 0 to the address space limit signal 221. When the absolute address on the address signal line 216 is not larger than the value of the system address space limit indicating register (SYS) 231 (when the address is in the system address space limit), the comparator 234 sends 0 to the address space limit error signal 222. When, on the contrary, the absolute signal is larger than the value of the system address space limit indicating register (SYS) 231 (when the address is out of the system address space limit), the comparator 234 sends 1 to the address space limit error signal 222.

The address checking circuit 330 in the bus extender EX0 will be described hereunder with reference to FIG. 7.

The address checking circuit 330 in the bus extender EX0 has an address space limit indicating register (MAX) 343, an address space limit indicating register (MIN) 342, comparators 344, 345, 346 and 347, an AND circuit 348 and an NAND circuit 349. The values in the address space limit indicating registers (MAX) 343 and (MIN) 342 are values MAX and MIN in the subsystem 0 as shown in FIG. 2A.

The address checking circuit 330 judges whether the absolute address on each of the address signal lines 314 and 324 is in a range assigned to the inner subsystem. When the absolute address sent from the reception control circuit 312 in the RBUS control circuit 310 to the address signal line 314 is not smaller than the value of the address space limit indicating register (MIN) 342, the comparator 344 sends 1 to the signal line 333. When the absolute address is smaller than the value of the address space limit indicating register (MAX) 343, the comparator 345 sends 1 to the signal line 334. In the case where the signal lines 333 and 334 are all 1 (in the case where the address is in the address space limit of the subsystem 0), the AND circuit 348 sends 1 to the intra-subsystem address space limit indicating signal 331. In the case where one of the signal lines 333 and 334 is "0" (in the case where the address is out of the address space limit of the subsystem 0), the AND circuit 348 sends "0" to the intra-subsystem address space limit indicating signal 331.

In the same manner as described above, when the absolute address sent from the reception control circuit 322 in the EBUS control circuit 320 to the address signal line 324 is not smaller than the value of the address space limit indicating register (MIN) 342, the comparator 346 sends 1 to the signal line 335. When the absolute address is smaller than the value of the address space limit indicating register (MAX) 343, the comparator 347 sends 1 to the signal line 336. In the case where the signal lines 335 and 336 are all 1 (in the case where the address is in the address space limit of the subsystem 0), the NAND circuit 349 sends "0" to the extra-subsystem address space limit signal 332. In the case where one of the signal lines 335 and 336 is "0" (in the case where the address is out of the address space limit of the subsystem 0), the NAND circuit 349 sends 1 to the extra-subsystem address space limit signal 332. By the provision of two series of checking circuits, the transferring operation from the local bus RBUS to the extension bus EBUS and the transferring operation from the extension bus EBUS to the local bus RBUS can be performed in parallel.

The structures and operations of the address checking circuit 220 in the main storage device MS0 and the address checking circuit 330 in the bus extender EX0 have been described with reference to FIGS. 6 and 7.

If each of the address checking circuit 220 in the main storage device MS0 and the address checking circuit 330 in the bus extender EX0 in this invention is provided as another structure, the relation between the system address space and the range assigned to each subsystem is changed. In the following two examples, other structures are described.

With respect to the first example of the different structure, the relation between the system address space and the range assigned to each subsystem is shown in FIG. 2A. The system address space is provided as an interleaving structure in which subsystems are switched for each page (for example, 4 kbytes) in the main storage device MS. By the provision of the system address space as an interleaving structure, the memory access load on each subsystem is averaged. Accordingly, there is an advantage in that occurrence of memory necking is prevented. Also in this example, address space limit indicating registers are used.

Figure 8B:
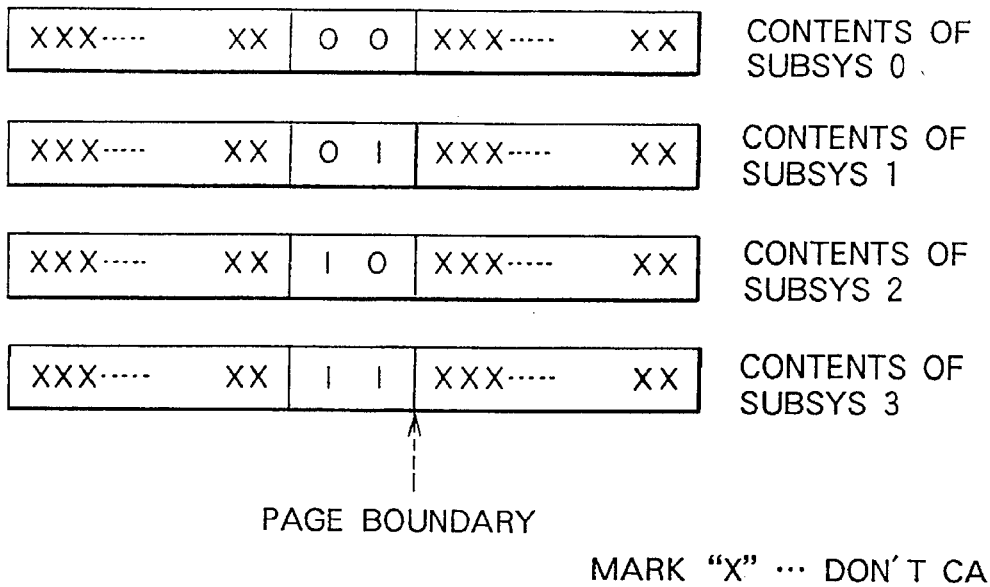
FIG. 8B is a view showing an example of information held by the address space limit indicating register in the address check circuit.
Figure 9:
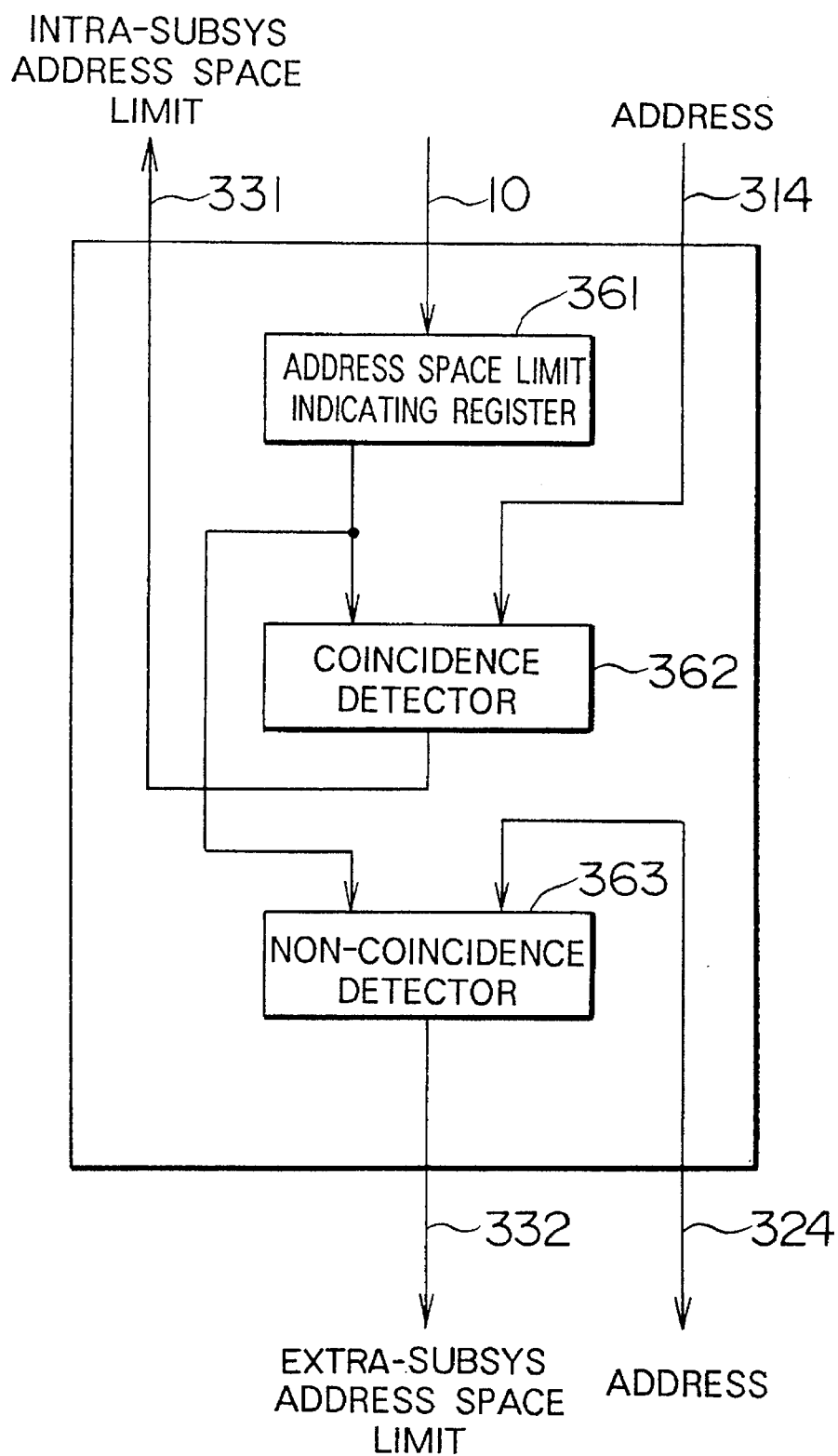
FIG. 9 is a block diagram showing another example of the address check circuit depicted in FIG. 5B.

FIG. 8A is a block diagram corresponding to FIG. 2B, of the address checking circuit 220 in the main storage device MS0 in FIG. 4, and FIG. 9 is a block diagram corresponding to FIG. 2B, of the address checking circuit 330 in the bus extender EX0 in FIG. 5.

The address checking circuit 220 in FIG. 8A comprises an address space limit indicating register 261, a system address space limit indicating register 231, a comparing circuit 234 and a coincidence detecting circuit 262.

The address checking circuit 330 in FIG. 9 comprises an intra-subsystem address space limit indicating register 361, a coincidence detecting circuit 362 and a non-coincidence detecting circuit 363.

Information as shown in FIG. 8B is registered in the address space limit indicating registers 261 and 361. The system address space is supported while divided by the respective subsystems on the basis of this information.

In the case of FIG. 8B, the system address space is supported while divided by the respective subsystems on the basis of the upper two-bit values of the page boundaries. The subsystem 0 supports a portion having the upper two bits expressing 00, among the system address space. The subsystems 1, 2 and 3 respectively support portions of 01, 10 and 11, among the system address space. The bit data xxx in each of the less significant address side and the most significant address side expressing information in the address space limit indicating registers expresses "Don't Care". The coincidence detecting circuit 262 compares the address 216 with the value of the address space limit indicating register 261 to detect the coincidence between portions except the bit data xxx. When the coincidence is detected, the coincidence detecting circuit 262 sets the address space limit signal 221 to "1".

The coincidence detecting circuit 362 and the non-coincidence detecting circuit 363 detect the coincidence and non-coincidence between portions except the bit data xxx on the basis of the address space limit indicating register 361 in the same manner as described above. When the coincidence is detected, the intra-subsystem address space limit indicating register 331 is set to "1". When the non-coincidence is detected, the extra-subsystem address space limit signal 332 is set to "1".

This method in which subsystems are selected on the basis of the address space limit indicating register has an advantage in that this method can be provided by a simple hardware structure.

FIG. 2C is a view showing the relation between the system address space and the range assigned to each subsystem in the case where larger interleaved units are provided in the interleaving structure depicted in FIG. 2B.

Figure 8C:
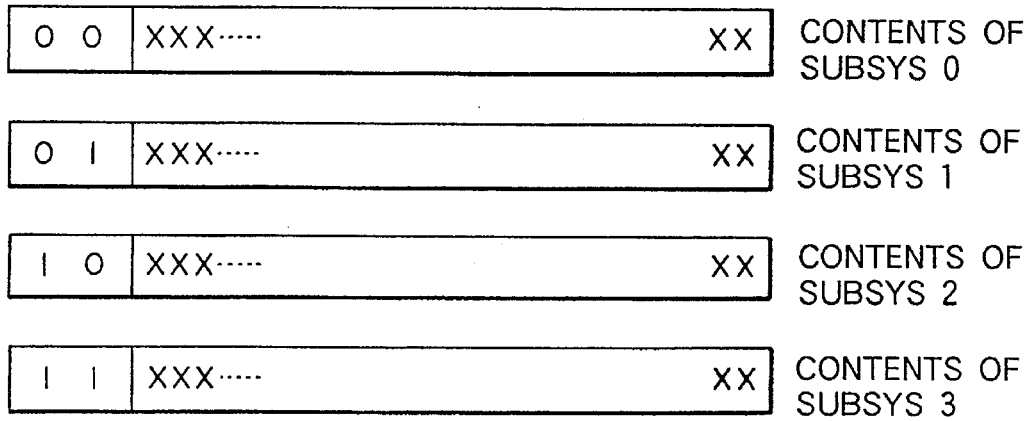
FIG. 8C is a view showing another example of information held by the address space limit indicating register in the address check circuit.

In FIG. 2C, the system address space is divided into four units, so that there is provided an interleaving structure in which subsystems are switched for each unit which is one-fourth as much as the main storage device MS (when, for example, the system address space has 256 Mbytes, each unit has 64 Mbytes). FIG. 8C shows information in the case of FIG. 2C. The subsystem 0 supports a portion having the most significant two bits expressing 00, among the system address space. The subsystems 1, 2 and 3 respectively support portions of 01, 10 and 11, among the system address space.

Figure 10:
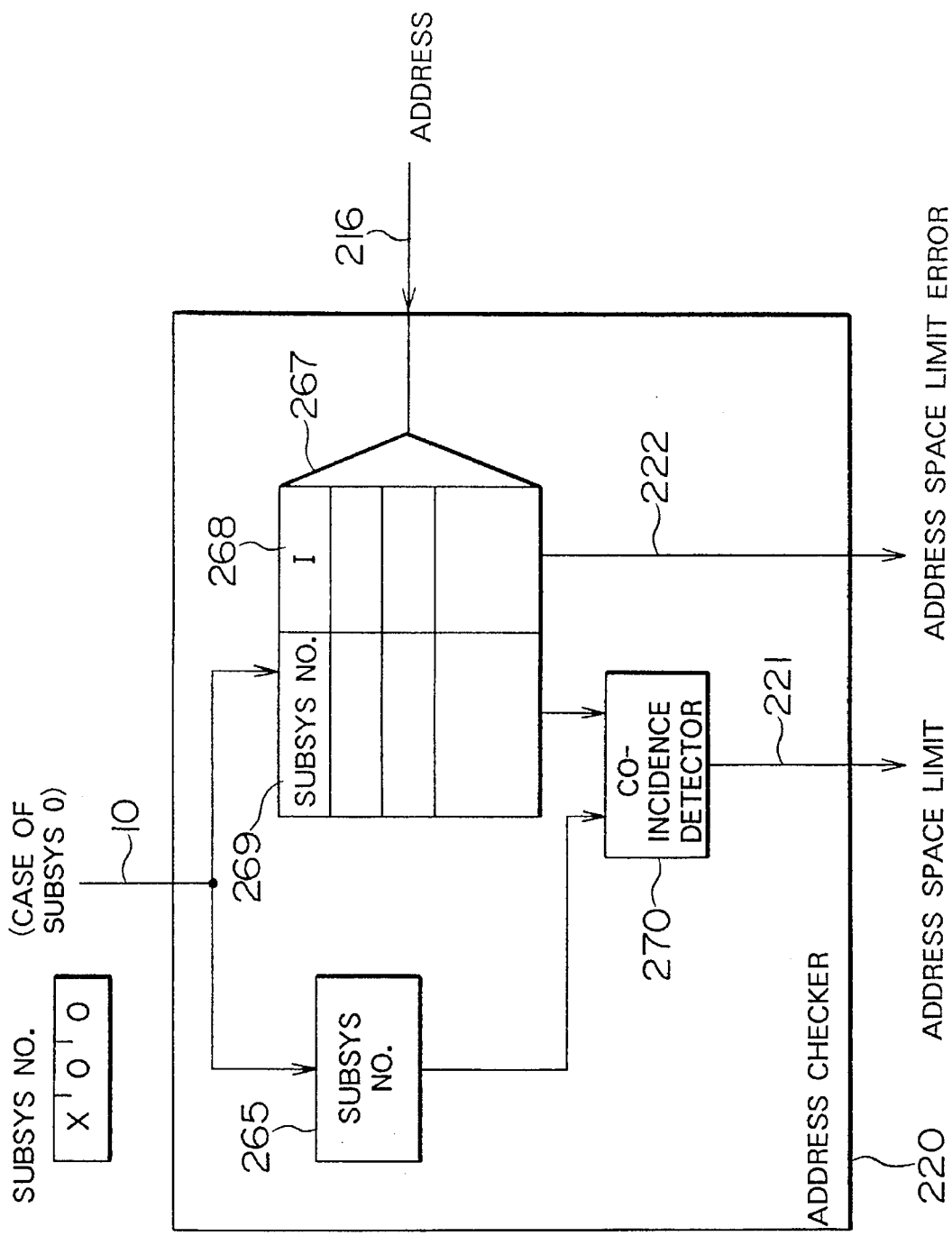
FIG. 10 is a block diagram showing a further example of the address check circuit depicted in FIG. 4A.

The second example of the different structure will be described hereunder. FIG. 2D is a view showing the relation between the system address space and the range assigned to each subsystem in the second example of the different structure. The system address space can be assigned to respective subsystems for each specific unit (for example, 4 kbyte page) in the main storage device MS by using a main storage structure table. FIG. 10 is a block diagram corresponding to FIG. 2D, of the address checking circuit 220 in the main storage device MS0 in FIG. 4, and FIG. 11 is a block diagram corresponding to FIG. 2D, of the address checking circuit 330 in the bus extender EX in FIG. 5.

The address checking circuit 220 in FIG. 10 comprises a main storage structure table 267, a subsystem identification number register 265 and a coincidence detecting circuit 270. Information 269 expressing the correspondence between the address and the number of the subsystem assigned for the address and system address bit information 268 expressing whether the address is in the system address space are registered in the main storage structure table 267. The system address space is supported while divided by the respective subsystems as shown in FIG. 2D on the basis of the information. The coincidence detecting circuit 270 compares the value of the subsystem identification number register 265 with the value of the main storage structure table 267 corresponding to the address 216. When the coincidence is detected, the coincidence detecting circuit 270 sets the address space limit signal 221 to "1". Further, the value corresponding to the address 216, of the system address bit 268 in the main storage structure table 267 is provided as the address space limit error signal 222.

Figure 11:
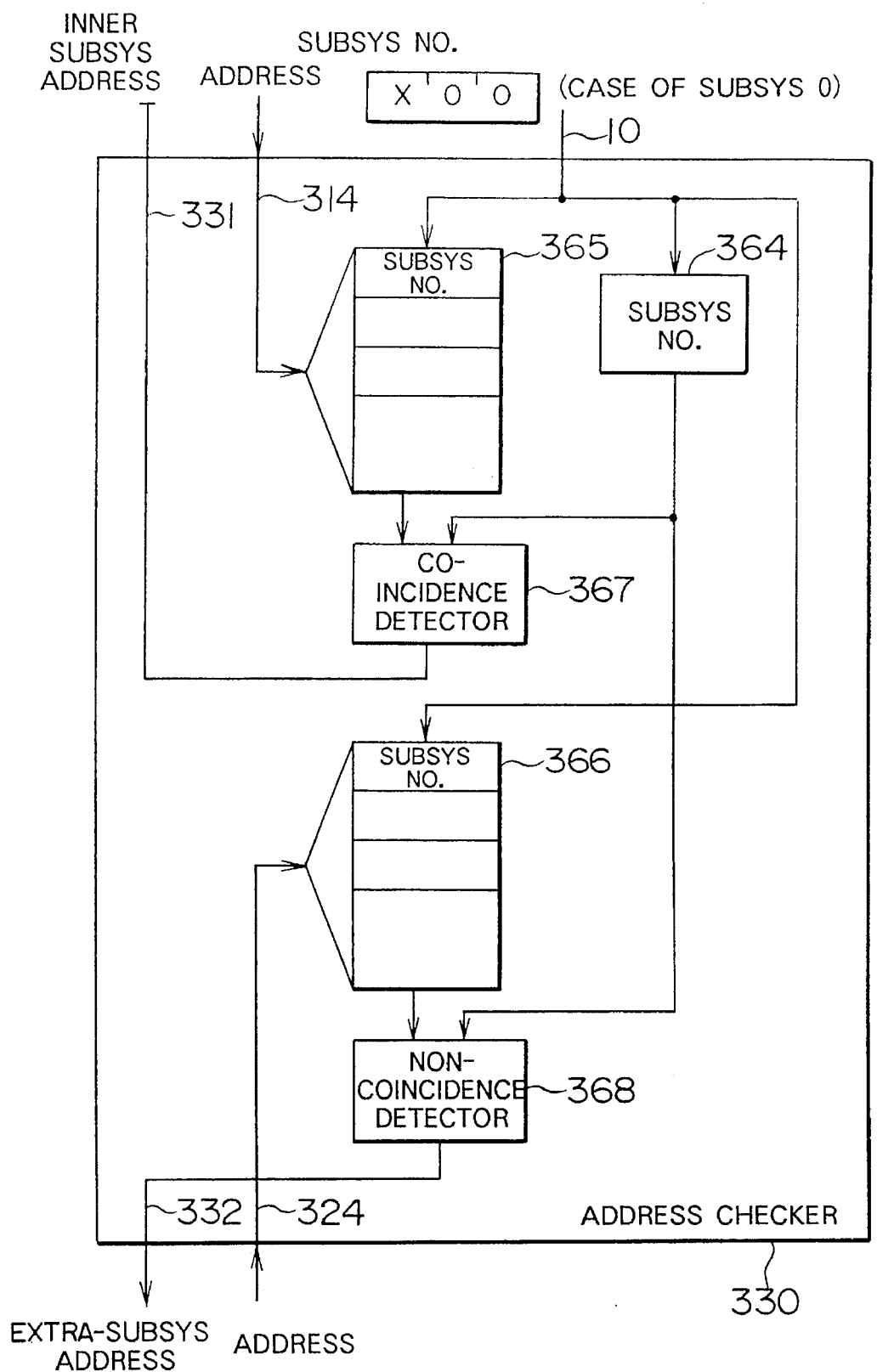
FIG. 11 is a block diagram showing a further example of the address check circuit depicted in FIG. 5B.

Like this, the address checking circuit 330 in FIG. 11 comprises a subsystem identification number register 364, main storage structure tables 365 and 366, a coincidence detecting circuit 367 and a non-coincidence detecting circuit 368. The same data as the information 269 is registered both in the main storage structure table 365 and in the main storage structure table 366. The coincidence detecting circuit 367 compares the value of the subsystem identification number register 364 with the value of the main storage structure table 365 corresponding to the address 314. When the coincidence is detected, the intra-subsystem address space limit signal 331 is set to "1". The non-coincidence detecting circuit 368 compares the value of the subsystem identification number register 364 with the value of the main storage structure table 366 corresponding to the address 324. When the non-coincidence is detected, the extra-subsystem address space limit signal 332 is set to "1".

An example of structure of the address checking circuit 220 in the main storage device MS0 and the address checking circuit 330 in the bus extender EX0 in the present invention has been described with reference to FIGS. 6 and 7 and other examples thereof have been described with reference to FIGS. 8A, 8B, 8C, 9, 10 and 11.

In the case where two subsystems are used in the data processing system as shown in FIGS. 1A and 1B, another example of structure is effective. This example of structure will be described hereunder. When two groups of signal lines opposite to each other in a single direction, instead of the extension bus EBUS, are used for access transfer between two bus extenders in the case where transfer of access requests/results between the two subsystems is performed between the two bus extenders, the following advantage can be obtained.

Figure 12A:
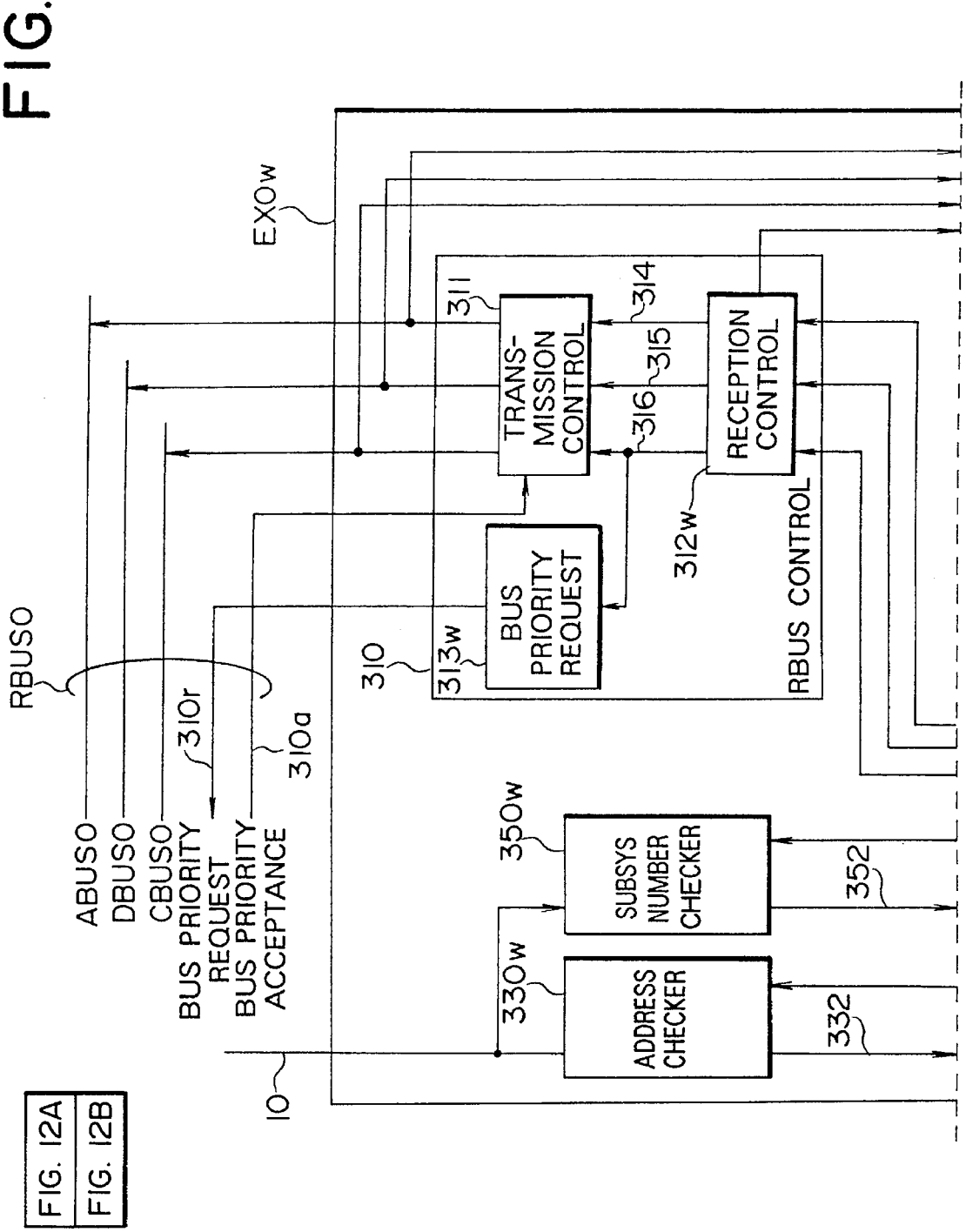
FIG. 12A is a block diagram showing a half of another example of the bus extender in the case where the data processing system depicted in FIGS. 1A and 1B has two subsystems.
Figure 12B:
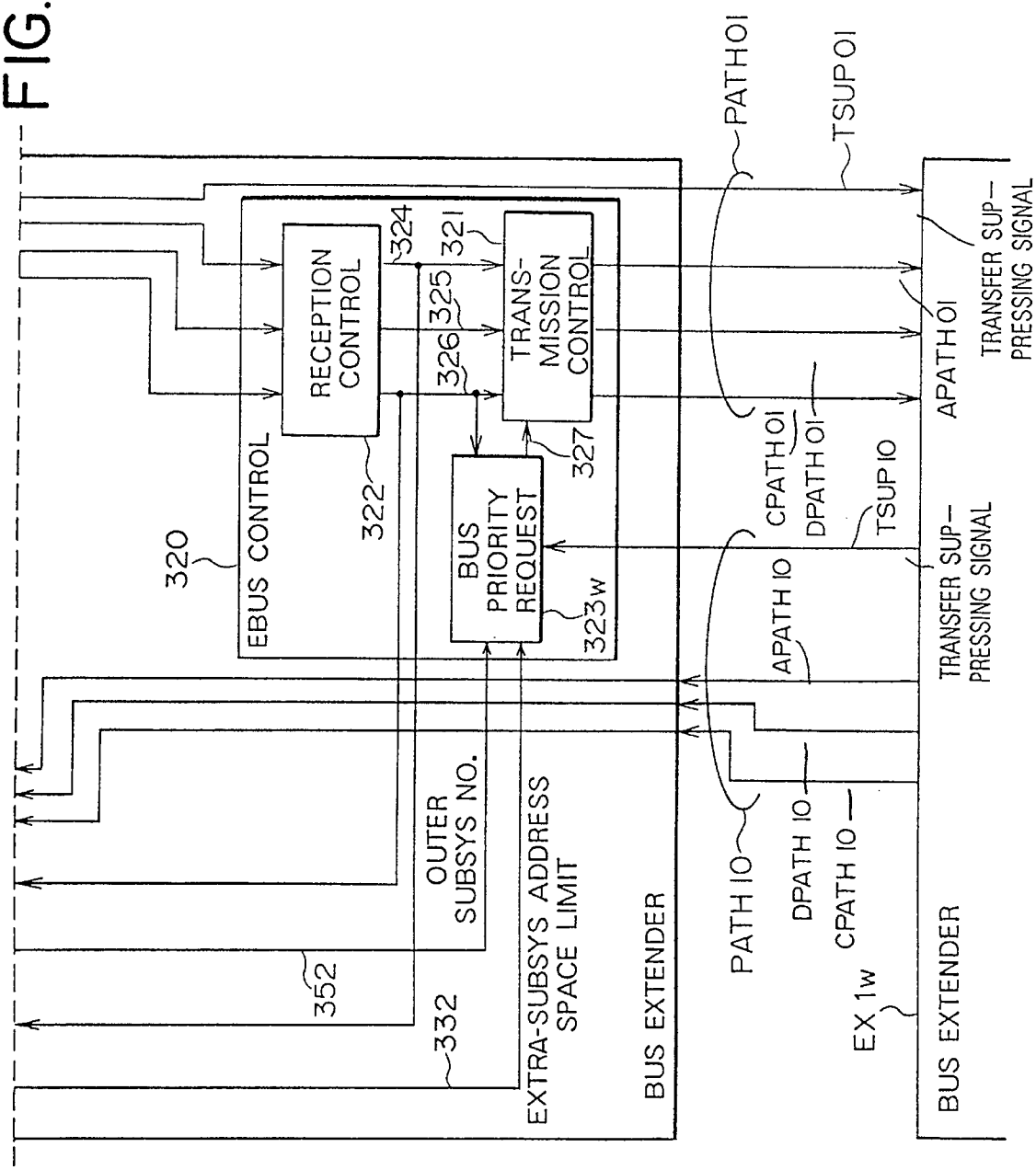
FIG. 12B is a block diagram showing the other half of the example of the bus extender in the case where the data processing system depicted in FIGS. 1A and 1B has two subsystems.
Figure 13:
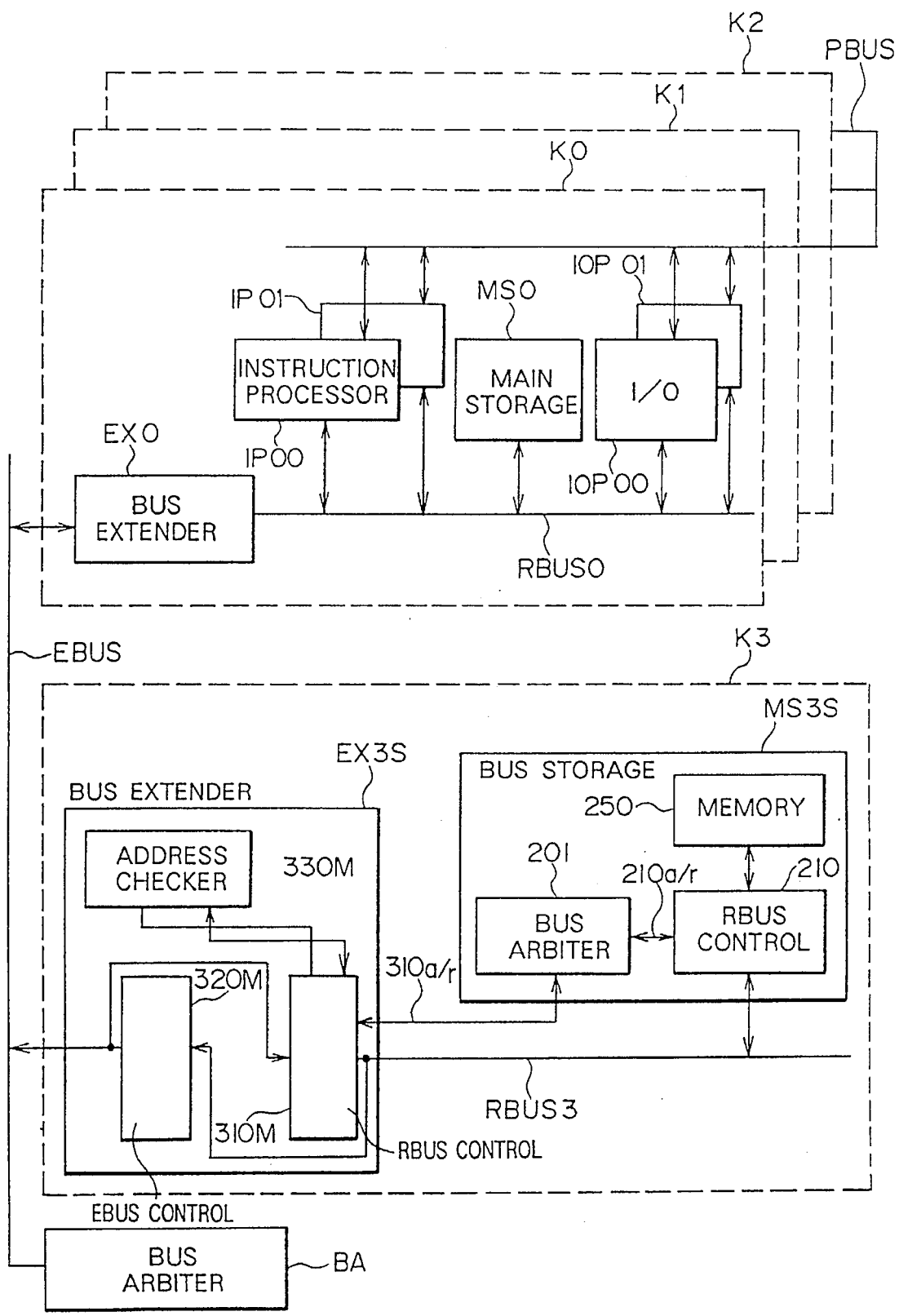
FIG. 13 is a block diagram of the data processing system including a subsystem in which nothing but a main storage device is disconnected by local bus, as an embodiment of the invention.

The data width in each of the signal lines is halved but there is no lowering of throughput because the bidirectional signal lines are activated if two-way communication is used frequently. Because the cycle for performing bus arbitration can be omitted, there arises a large effect in that the access time in access between the subsystems can be shortened. An example of structure of this type bus extender is shown in FIGS. 12A and 12B. The basic function and structure in FIGS. 5A and 5B are substantially the same as those in FIGS. 5a and 5b. The bus extenders operate as follows. In the case of access on the local bus RBUS to the outside of the subsystem, one bus extender transfers an access request to the other bus extender in the outer subsystem. In the case of access to the inner subsystem, the bus extender aborts the access request. Because two subsystems are provided, an access request from the bus extender in the outer subsystem is necessarily used as an access request given to the inner subsystem. Accordingly, address checking and subsystem checking are not required with respect to the access request from the bus extender in the outer subsystem. The case of FIGS. 8A and 8B is different from the case of FIGS. 5A and 5B in this point.

In FIGS. 12A and 12B, the bus extender EX0w is shown so as to include an interface between the bus extender EX1w and the local bus RBUS0. The bus extender EX0w comprises an RBUS control circuit 310, an EBUS control circuit 320, an address checking circuit 330w and a subsystem identification number checking circuit 350w. The RBUS circuit 310 comprises a reception control circuit 312w, a transmission control circuit 311 and a bus priority request circuit 313w. The EBUS control circuit 320 comprises a reception control circuit 322, a transmission control circuit 321 and a bus transmission directing circuit 323w.

The interface to the bus extender EX1w comprises signal lines PATH01 (that is, address signal line APATH01, data signal line DPATH01, control signal line CPATH01 and transfer suppressing signal TSUP01) from the bus extender EX0w to the bus extender EX1w, and signal lines PATH10 (that is, address signal line APATH10, data signal line DPATH10, control signal line CPATH10 and transfer suppressing signal TSUP10) from the bus extender EX1w to the bus extender EX0w. The operation of the bus extender EX0w is as follows.

The operation that the bus extender EX0w receiving access on the local bus RBUS0 transfers an access request to the other bus extender EX1w in the outer subsystem will be described hereunder.

When the reception control circuit 322 receives an access request on the local bus RBUS0, the address checking circuit 330w judges whether the absolute address on the address signal line 324 is in a range assigned to the inner subsystem. At the same time, the transmission control circuit 321 receives transmission information for the signal line PATH01 from the reception control circuit 322.

In the case of access to a main storage device MS on the inner subsystem, the extra-subsystem address space limit signal 332 becomes "0". In response to this signal, the bus transmission directing circuit 323w does not send the transmission directing signal 327 to the transmission control circuit 321, so that the access request in the transmission control circuit 321 is aborted.

In the case of access to a main storage device MS on one of outer subsystems, the extra-subsystem address space limit signal 332 becomes "1". In response to this signal, the bus transmission directing circuit 323w sends the transmission directing signal 327 to the transmission control circuit 321, so that the access request in the transmission control circuit 321 is transmitted to the signal line PATH01. The bus extender EX1w in the outer subsystem receives the access request.

In the case of transfer of access results, the subsystem identification number checking circuit 350w judges from the REN field on the control signal line 326 whether the transfer of results is for the inner subsystem, in the same manner as the address checking circuit 330w judges from the absolute address on the address signal line 324 whether the address is in a range assigned to the inner subsystem in the case of transfer of the access request. Other operations are the same as those in the case of transfer of the access request.

When the access request/result previously received in the reception control circuit 312w remains without transferring, the transfer suppressing signal TSUP01 becomes "1"to suppress the bus extender EX1w in the outer subsystem from transferring the access request/result to the b extender EX0w. Accordingly, the access previously received can be prevented from disappearing. The transfer suppressing signal TSUP10 operates in the same manner as the transfer suppressing signal TSUP01.

FIGS. 12A and 12B are block diagrams of a data processing system including a special subsystem for providing a main storage device (or main storage devices) as an embodiment of the present invention. This data processing system is constituted by a plurality of subsystems. Each of the subsystems has at least one instruction processor (IP) (or at least one input-output processor (IOP)), and at least one main storage device (MS). The data processing system has at least one IP, at least one MS, and at least one input-output processor (IOP). The embodiment in FIGS. 12A and 12B is different from the embodiment in FIGS. 1a and 1b in that the system in FIGS. 12a and 12b includes a special subsystem for providing a main storage device (or main storage devices). Accordingly, the number of main storage devices can be increased with respect to the data processing system short of main storage capacity, so that there arises an advantage in that this system can be extended flexibly.

In this embodiment, the data processing system is constituted by four subsystems (K0, K1, K2 and K3). The subsystem K0 has instruction processors IP00 and IP01, a main storage device MS0, input-output processors (devices) IOP00 and IOP01, and a bus extender EX0, which are connected by local bus RBUS0. The subsystems K0 to K3 are connected to one another by extension bus EBUS. For communication between devices such as IP and IOP, the IP and the IOP are connected to each other by processor bus PBUS. The main storage device MS0 and the bus extender EX0 have the same structure as in FIGS. 1A and 1B.

The main storage device MS3s in the special subsystem 3 for providing main storage device has a bus arbiter 201 for the local bus RBUS0, an RBUS control circuit 210 and a memory circuit 250. The main storage MS3s does not require the address checking circuit 220 which is included in the main storage MS0 in FIGS. 1A and 1B. This is because there is no access source except the bus extender EX3s in the subsystem 3, so that the access request from the bus extender EX3s is necessarily considered as the access request to the main storage MS3s.

The bus extender EX3s has an RBUS control circuit 310, an EBUS control circuit 320 and an address checking circuit 330 but does not require the subsystem identification number checking circuit 350 which is included in the bus extender EX0 in FIGS. 1A and 1B. This is because there is no recipient in transfer of access results from the main storage MS3s, except the bus extender EX3s in the subsystem 3, so that the transfer of access results from the main storage MS3s is necessarily considered as the transfer of access results to the bus extender EX3s.

Although description has been made upon the case where this system can be operated even when the main storage MS3s and the bus extender EX3s respectively have no address checking circuit 220 and no subsystem identification number checking circuit 350, it is a matter of course that this system can be operated when the main storage MS3s and the subsystem identification number checking circuit 350 respectively have such circuits 220 and 350.

The operation of the service processor SVP will be described hereunder. The service processor SVP calculates the set values of the intra-subsystem address space limit indicating registers in the main storage MS and the bus extender EX in each of the subsystems on the basis of address space limit information (MS capacity information) inputted into a memory area in the service processor SVP correspondingly to the main storage MS in each of the subsystems. Then, the service processor SVP sets the calculated values, as well as the set value of the system address space limit indicating register, in the respective address space limit indicating registers as a part of the initializing procedure at the time of the starting-up of the system. The case where the calculated values are set in the address space limit indicating registers as shown in FIGS. 6 and 7 will be described hereunder.

It is now assumed that the information that the main storage in each of subsystems 0 to 3 has a range of 1024 addresses is stored in the memory area in the service processor SVP as address space limit information in the main storage in each of the subsystems. The service processor SVP calculates the set values (MIN and MAX) of the system address space limit indicating registers in the main storage MS or the bus extender EX on the basis of this information to thereby assign a range of address number 0 to address number 1023 to the subsystem 0, assign a range of address number 1024 to address number 2047 to the subsystem 1, assign a range of address number 2048 to address number 3071 to the subsystem 2 and assign a range of address number 3072 to address number 4095 to the subsystem 3. At the same time, the service processor SVP calculates the set value 4095 of the system address space limit indicating register. Then, the service processor SVP sets the calculated values in the respective range registers as a part of the initializing procedure at the time of the starting-up of the system.

As another example, it is now assumed that the information that the MS storage in each of subsystems 0 to 2 has a range of 1024 addresses but a subsystem 3 has no main storage (no address) is stored. In this case, the service processor SVP calculates the set values (MIN and MAX) of the system address space limit indicating registers in the main storage MS or the bus extender EX in each of the subsystems, to thereby assign address space limits to the subsystems 0 to 2 in the same manner as described above and assign a range of address number 3071 to address number 3071 to the subsystem 3. At the same time, the service processor SVP calculates the set value 3071 of the system address space limit indicating register. Then, the service processor SVP sets the calculated values in the respective range registers as a part of the initializing procedure at the time of the starting-up of the system. Even in the case where some subsystem has no main storage, the system can be extended flexibly while keeping the continuity in the bus specification in the same procedure as described above.

SECOND EMBODIMENT

In this embodiment, a buffer storage device (BS) for storing a partial copy of the address space and a buffer control circuit are additionally provided in the IP in the first embodiment and, at the same time, a storage device (hereinafter called "BCC storage device") for storing information expressing the correspondence between the BS and the partial copy of the address space, that is, for storing buffer coherency check information (hereinafter called "BCC information"), is provided in the EX.

Figure 14A:
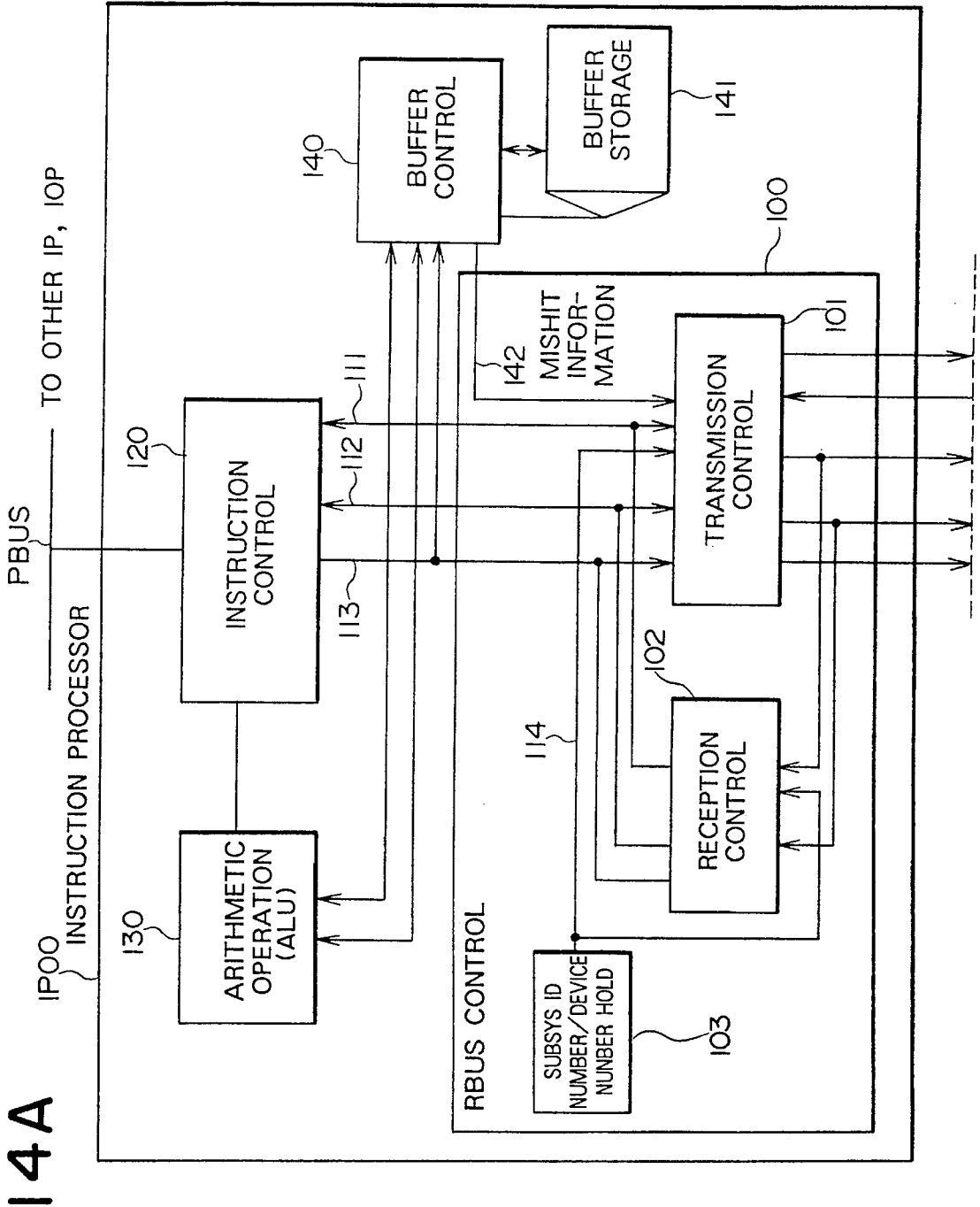
FIG. 14A is a block diagram showing a half of the local bus in the case where buffer storage devices are provided in the data processing system depicted in FIGS. 1A and 1B.
Figure 14B:
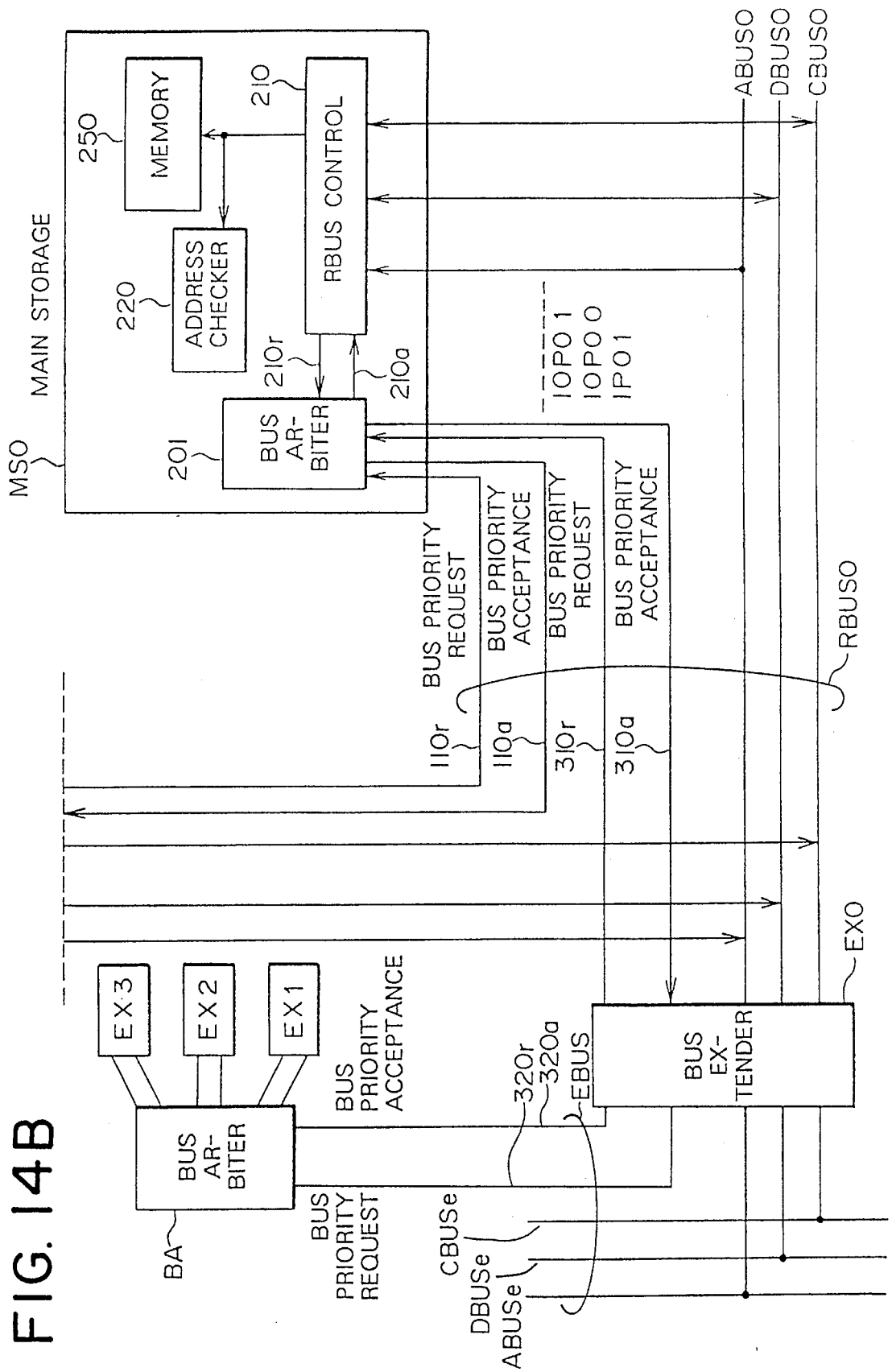
FIG. 14B is a block diagram showing the other half of the local bus in the case where buffer storage devices are provided in the data processing system depicted in FIGS. 1A and 1B.

FIGS. 14A and 14B are views corresponding to FIGS. 3A and 3B which are structural views of the local bus in the data processing system forming subsystems as shown in FIGS. 1A and 1B. The command format shown in FIG. 3C can be applied to this embodiment, so that description is made with reference to FIG. 3C.

The operation of the local bus will be described hereunder in the case where the instruction processor IP00 reads data from the main storage device MS0 or writes data in the main storage device MS0. First, the case of memory reading is described.

Taking as an example the case where an instruction fetch request is generated in the instruction control circuit 120, the instruction control circuit 120 transfers an address signal 113 and an access assortment signal 111 (FUNC field) both to the buffer control circuit 140 and to the transmission control circuit 101.

In the case where there is no target instruction in the buffer storage device, the buffer control circuit 140 sends a misfit information signal 141 to the transmission control circuit 101. The algorithm in the buffer control circuit 140 is based on the store-through operation.

The transmission control circuit 101 generates a command format for CBUS by merging the access assortment signal 111 with a subsystem identification number/device number signal 114 (REN field) from the subsystem identification number/device number hold circuit 103 and, at the same time, sends a bus priority request signal 110r to the bus arbiter 201. The bus arbiter 201 judges whether the bus priority request is acceptable or not. When the bus priority request is accepted, the bus arbiter 201 sends a bus priority acceptance signal 110a to the transmission control circuit 101. The transmission control circuit 101 receiving this signal sends access information to the address bus ABUS and the control bus CBUS. The RBUS control circuit 210 in the main storage device MS0 receives this signal and operates the memory circuit 250 if the address is in an address space limit assigned to the main storage device MS0 on the basis of the checking in the address checking circuit 220.

In the following, transfer of results is described. When the memory access is completed, the access results are stored in the RBUS control circuit 210 in the main storage device MS0. The RBUS control circuit 210 sends a bus priority request signal 210r to the bus arbiter 201. The bus arbiter 201 judges whether the bus priority request is acceptable or not. When the bus priority request is accepted, the bus arbiter 201 sends a bus priority acceptance signal 210a to the RBUS control circuit 210. The RBUS control circuit 210 receiving this signal sends read data to the data bus DBUS and sends the FUNC field expressing the result transferring operation, information expressing the presence or absence of error and the REN field expressing the subsystem identification number/device number of the access source to the control bus CBUS. The reception control circuit 102 in the instruction processor IP00 receives this information and performs the receiving operation after confirming the coincidence between the subsystem identification number/device number signal 114 (REN field) from the subsystem identification number/device number hold circuit 103 and the REN field on the control bus CBUS. This is, the access assortment signal 111 (FUNC field) and the data signal 112

(fetch instruction) are sent to the instruction control circuit 120, so that the instruction control circuit 120 receives these signals.

In the case where there is any target instruction in the buffer storage device, access to the buffer storage device is made but access to the main storage device MS0 is not made.

In the following, the case of memory writing is described. The operation in the case of memory writing is substantially the same as the operation in the case of memory reading. In the case of memory writing, write data are sent from the arithmetic operation control circuit 130 in the instruction processor IP00 to the data signal 112, and an address is sent from the instruction control circuit 120 to the address signal 113. The buffer control circuit 140 receiving these signals checks data in the buffer storage device. When the data is hit, it is altered to the write data. The transmission control circuit 101 sends access information to the data bus DBUS, the address bus ABUS and the control bus CBUS. Transfer of access results is performed through the control bus CBUS. The RBUS control circuit 210 sends the FUNC field expressing the result transferring operation, information expressing the presence or absence of error and the REN field received from the access source to the control bus CBUS. Other operations are the same as those in the case of memory reading.

A memory canceling operation will be described hereunder in connection with memory writing though description may be deviated from the subject of the operation of the local bus. The memory canceling operation is an operation for keeping the coherency of the buffer storage device. When, for example, another processor such as an instruction processor IP01 makes a memory writing operation, the reception control circuit 102 in the instruction processor IP00 receives this data and transfers it to the buffer control circuit 140. The buffer control circuit 140 checks data in the buffer to keep coherency. When the data is hit, the address thereof is voided. In the data processing system constituted only by local busses, the coherency of the buffer storage device can be kept easily by the memory canceling operation of the buffer control circuit 140. A method for keeping the coherency of the data processing system constituted by a plurality of subsystems (local busses) will be described hereunder.

The operation of the local bus has been described. The operation of the extension bus is made in the same manner.

The access request/result propagates on each of the local busses and the extension busses individually. When, for example, IP00 makes access to MS1, bus priority is successively given to RBUS0, EBUS and RBUS1 before MS1 is reached. In this case, the bus priority of RBUS0 is released while EBUS takes bus priority, so that RBUS0 can be used for another access.

A method for keeping the coherency of the data processing system constituted by a plurality of subsystems (local busses) will be described hereunder.

Figure 15:
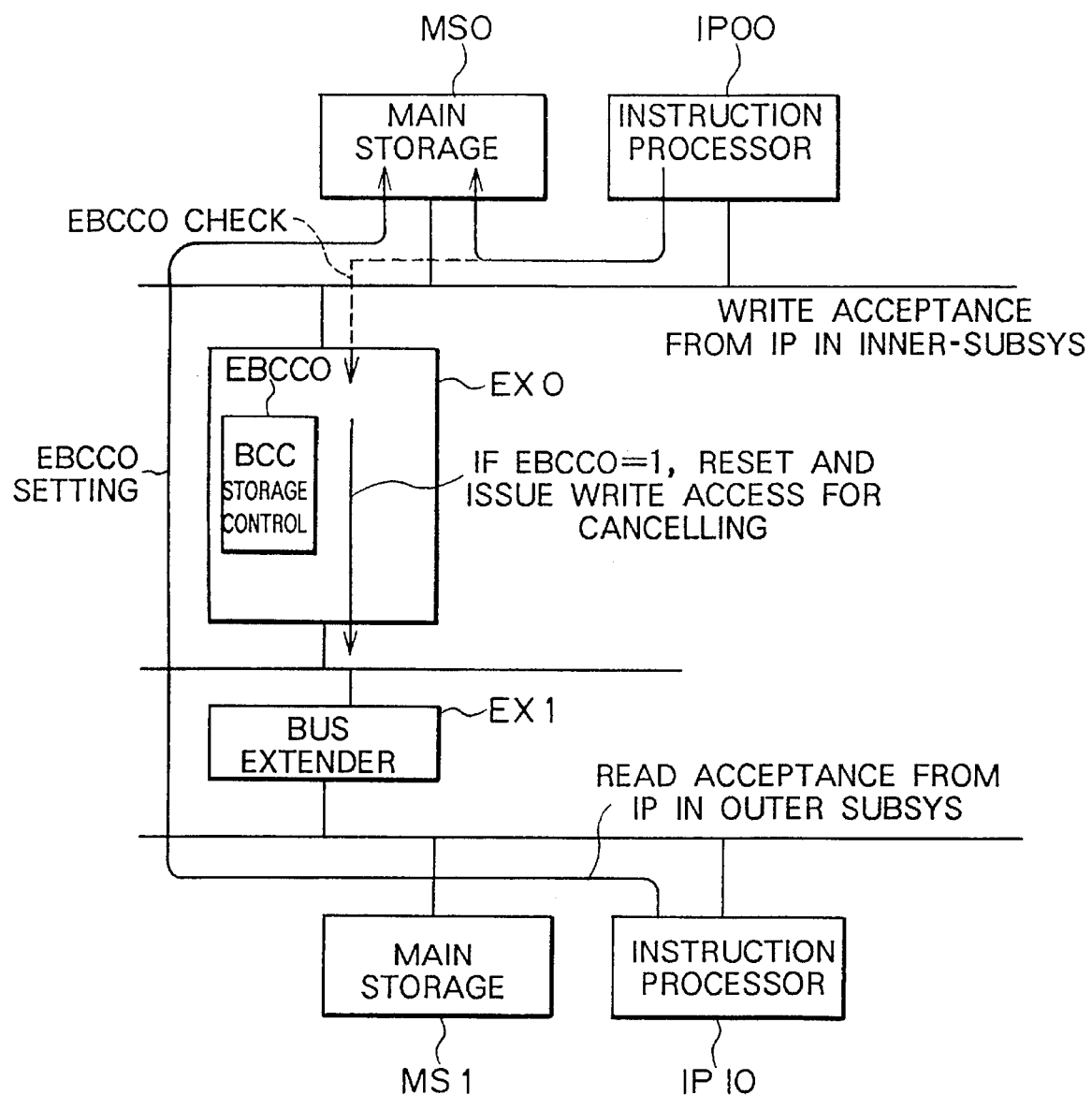
FIG. 15 is a block diagram showing the issue of write access for setting, resetting and canceling the BCC storage device with respect to the address space limit in the inner subsystem.
Figure 16:
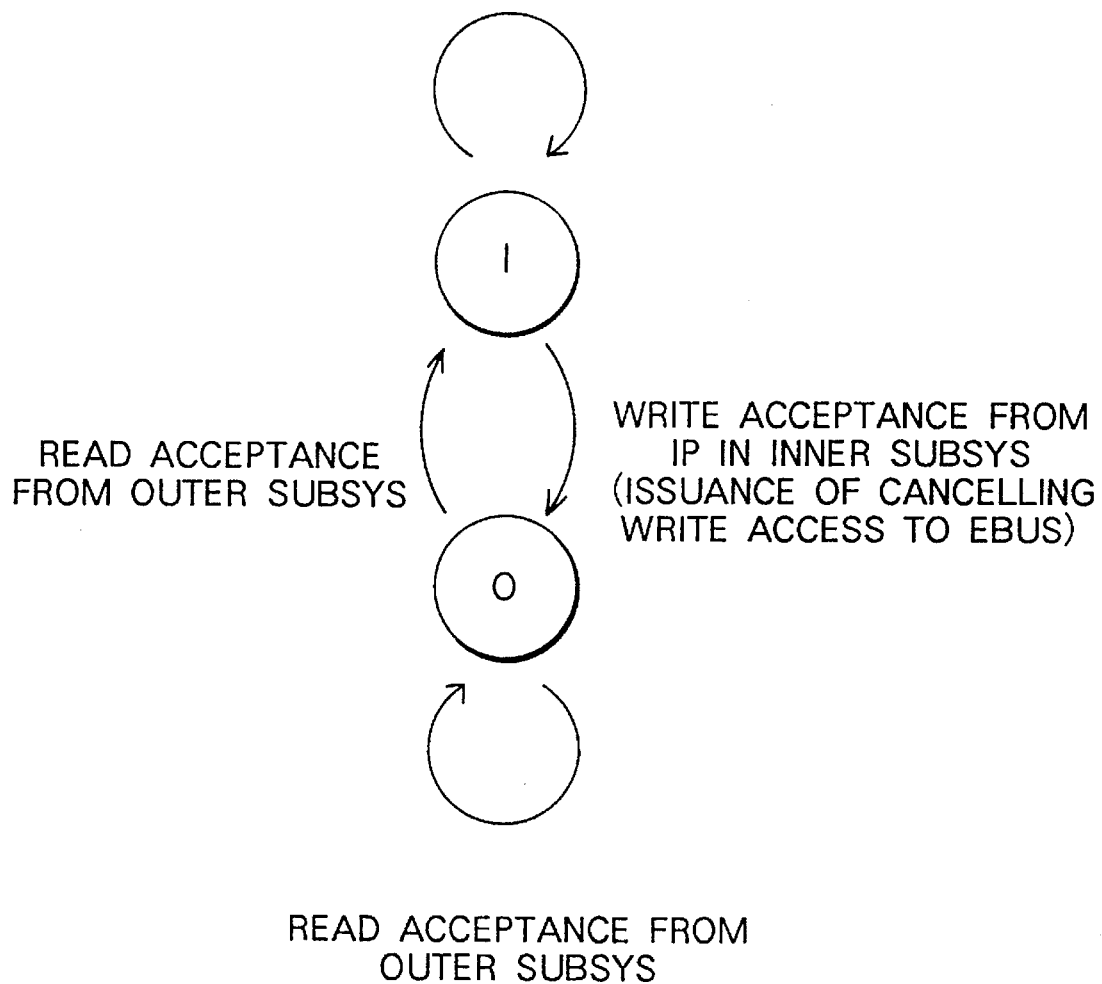
FIG. 16 is a view of state transition in the issue of write access for setting, resetting and canceling the BCC storage device with respect to the address space limit in the inner subsystem.

FIG. 15 is a block diagram for explaining the issue of write access for setting, resetting and canceling the BCC storage device (1 bit as a field for each address) with respect to the address space limit in the inner subsystem; and FIG. 16 is a view showing the state transition thereof.

In the case where the instruction processor IP10 makes read access to the main storage device MS0, the setting of the BCC storage device for the bus extender EX1 and the bus extender EX0 is performed (as will be described later). In the state of setting of the BCC storage device for the bus extender EX0, a copy of this address in the main storage device MS0 in the subsystem 0 is stored in the buffer storage device in an outer subsystem. Accordingly, when writing (closed in the subsystem 0 from the instruction processor IP00 to the main storage device MS0) on RBUS0 with respect to this address is made, it is indicated that write access for canceling need be transferred to EBUS.

In the case where the instruction processor IP00 makes write access to the main storage device MS0, a value is read from the BCC storage device of the access address. When the value is "0", it is indicated that a copy of this address is not stored in any buffer storage device outside the inner subsystem. Accordingly, there is no necessity of transferring the writing on RBUS with respect to this address to EBUS as write access for canceling. When the value is "1", it is indicated that a copy of this address is stored in a buffer storage device outside the inner subsystem. Accordingly, the writing on RBUS with respect to this address is transferred to EBUS as write access for canceling. On the other hand, the BCC storage device of the access address is set to "0". This is because not only the copy in the buffer of the outer subsystem with respect to this access address is voided but the information that there is no copy in the outer subsystem as a result of the voiding is reflected on the BCC storage device.

Figure 17:
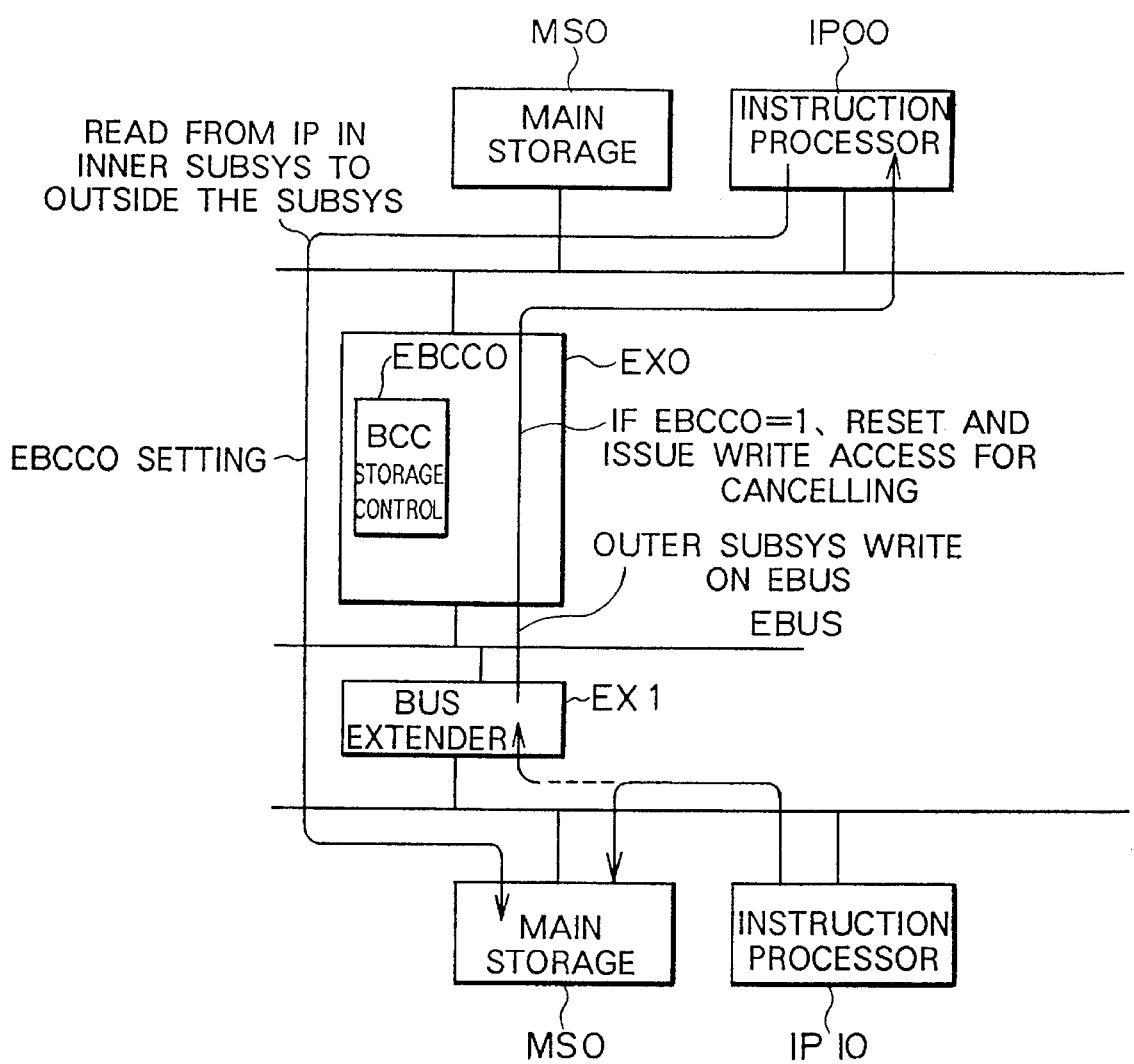
FIG. 17 is a block diagram showing the issue of write access for setting, resetting and canceling the BCC storage device with respect to the address space limit in an outer subsystem.
Figure 18:
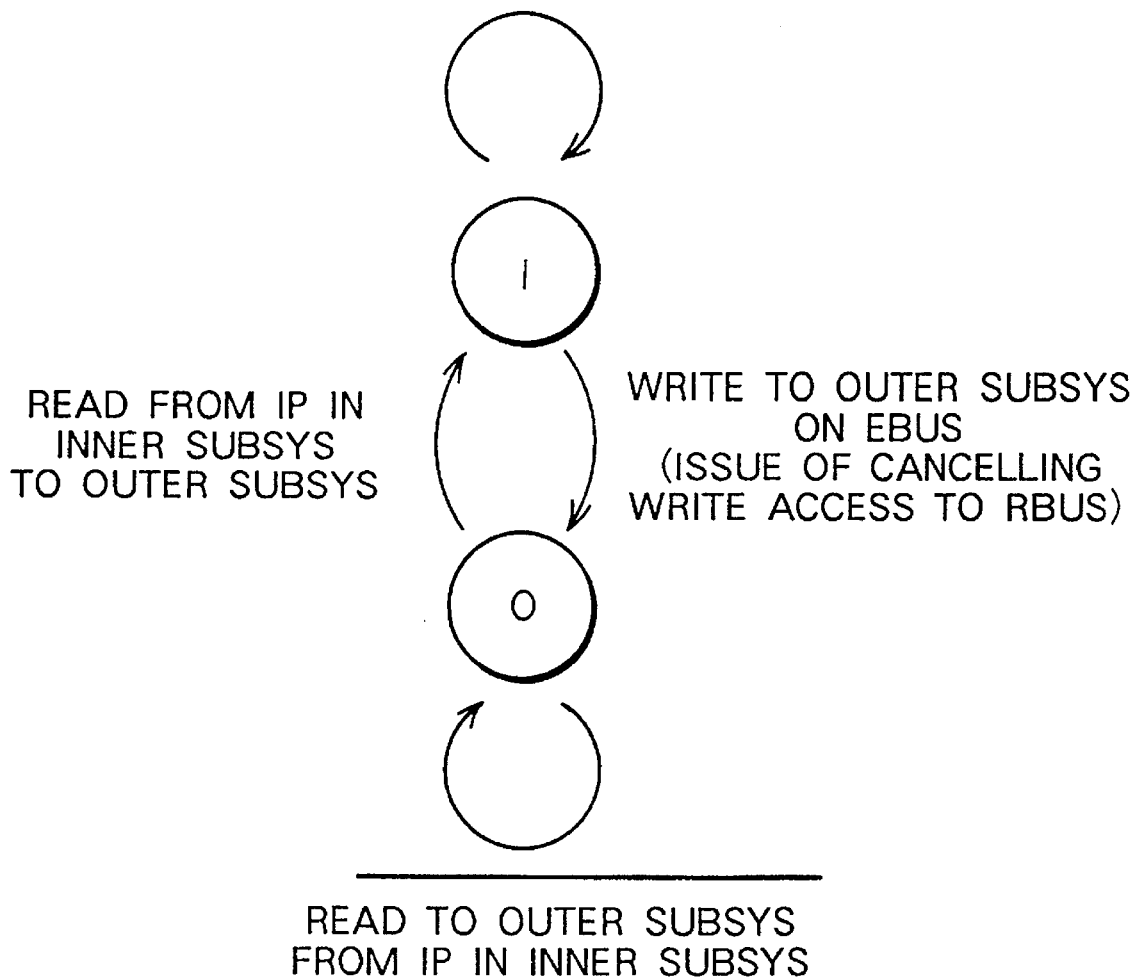
FIG. 18 is a view of state transition in the issue of write access for setting, resetting and canceling the BCC storage device with respect to the address space limit in an outer subsystem.

FIG. 17 is a block diagram for explaining the issue of write access for setting, resetting and canceling the BCC storage device (1 bit as a field for each address) with respect to the address space limit in the outer subsystem; and FIG. 18 is a view showing the state transition thereof. In the case where the instruction processor IP00 makes read access to the main storage device MS1, the setting of the BCC storage device for the bus extender EX0 and the bus extender EX1 is performed (as will be described later). In the state of setting of the BCC storage device for the bus extender EX0, a copy of this address (stored in the main storage device MS1 of the outer subsystem) is stored in the buffer storage device in the subsystem 0. Accordingly, when writing on EBUS with respect to this address is detected, it is indicated that write access for canceling need be transferred to RBUS0.

In the case where the instruction processor IP10 makes write access to the main storage device MS1, a value is read from the BCC storage device of the access address when write access for canceling on EBUS is detected. When the value is "0", it is indicated that a copy of this address is not stored in the buffer storage device in the inner subsystem. Accordingly, there is no necessity of transferring the writing on EBUS with respect to this address to RBUS0 as write access for canceling.

When the value is "1", it is indicated that a copy of this address is stored in the buffer storage device outside the inner subsystem. Accordingly, the writing on EBUS with respect to this address is transferred to RBUS0 as write access for canceling. On the other hand, the BCC storage device of the access address is set to "0". This is because not only the copy in the buffer of the inner subsystem with respect to this access address is voided but the information that there is no copy in the inner subsystem as a result of the voiding is reflected on the BCC storage device.

Access of an IP or IOP to a main storage device MS is classified into (1) read access to a main storage device MS on the inner subsystem, (2) read access to a main storage device MS on one of outer subsystems, (3) write access to a main storage device MS on the inner subsystem and (4) write access to a main storage device MS on one of outer subsystems.

(1) Read Access to Main Storage Device on Inner Subsystem

Read access of the instruction processor IP00 to the main storage device MS0 will be described hereunder.

The instruction processor IP00 sends an access request to the bus arbiter 201. When the access request is accepted, access is sent to the local bus RBUS0. With respect to the access, the main storage device MS0 and the bus extender EX0 respectively make a checking.

The operation of the main storage device MS0 is the same as the operation which has been described in the first embodiment with reference to FIGS. 4A and 4B. Detailed description thereof is omitted.

The operation of the bus extender EX0 will be described hereunder.

Figure 19A:
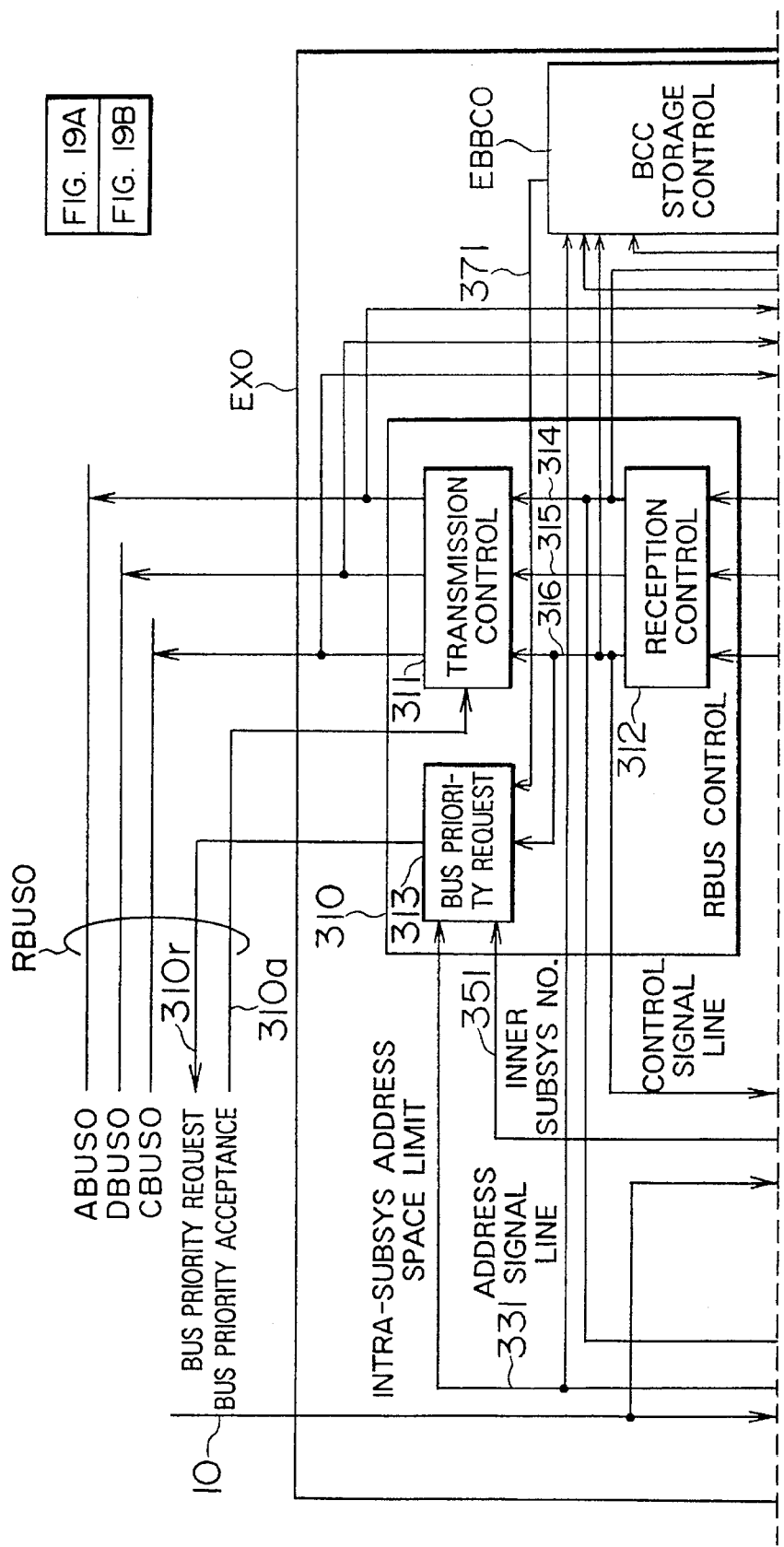
FIG. 19A is a block diagram showing a half of the bus extender having a BCC storage controller.
Figure 19B:
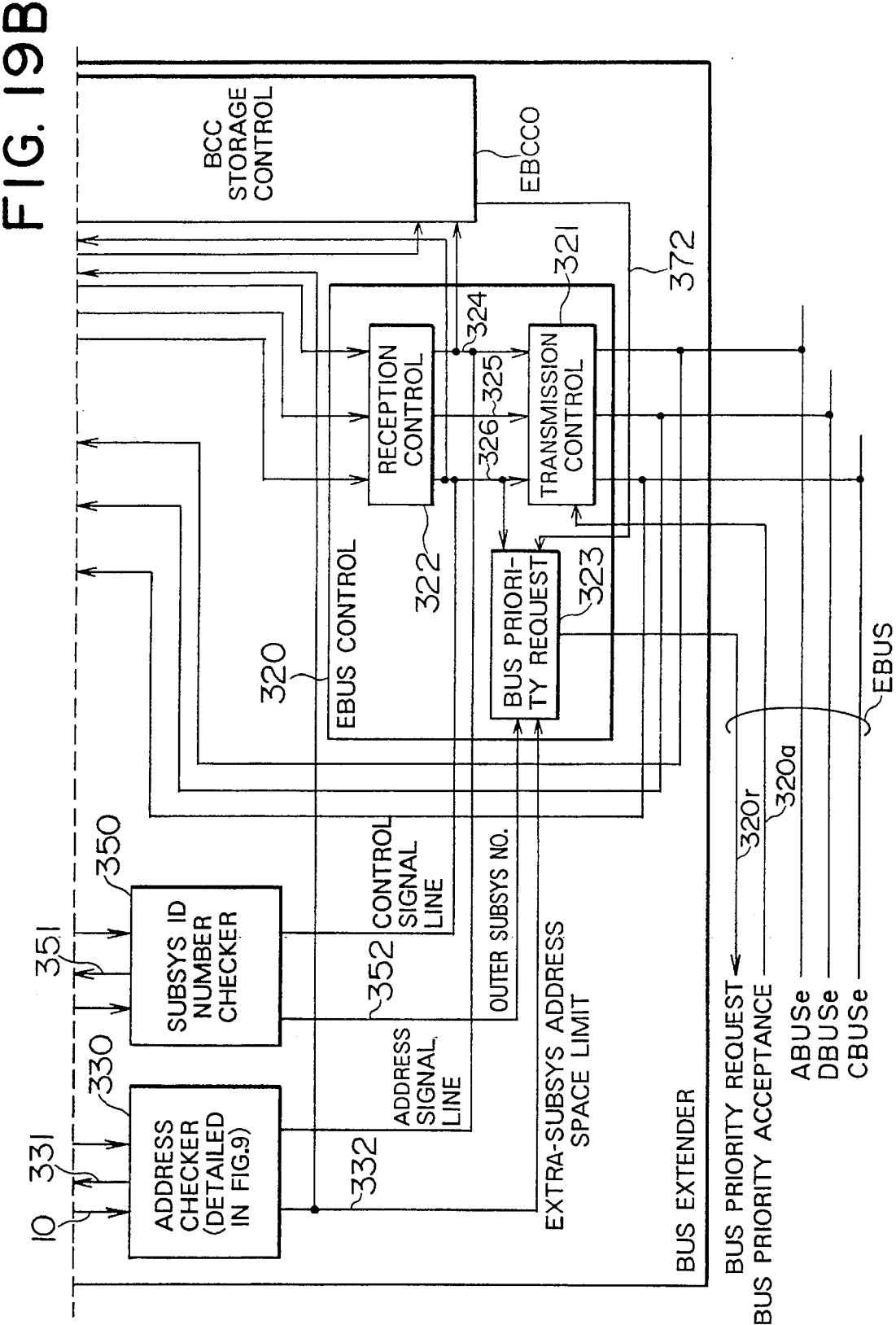
FIG. 19B is a block diagram showing the other half of the bus extender having a BCC storage controller.

The structure of the bus extender EX0 is shown in FIGS. 19A and 19B. The bus extender EX0 comprises an RBUS control circuit 310, an EBUS control circuit 320, an address checking circuit 330, a subsystem identification number checking circuit 350 and a BCC storage control circuit EBCC0. The RBUS control circuit 310 comprises a reception control circuit 312, a transmission control circuit 311 and a bus priority request circuit 313. The EBUS control circuit 320 comprises a reception control circuit 322, a transmission control circuit 321 and a bus priority request circuit 323.

Figure 20:
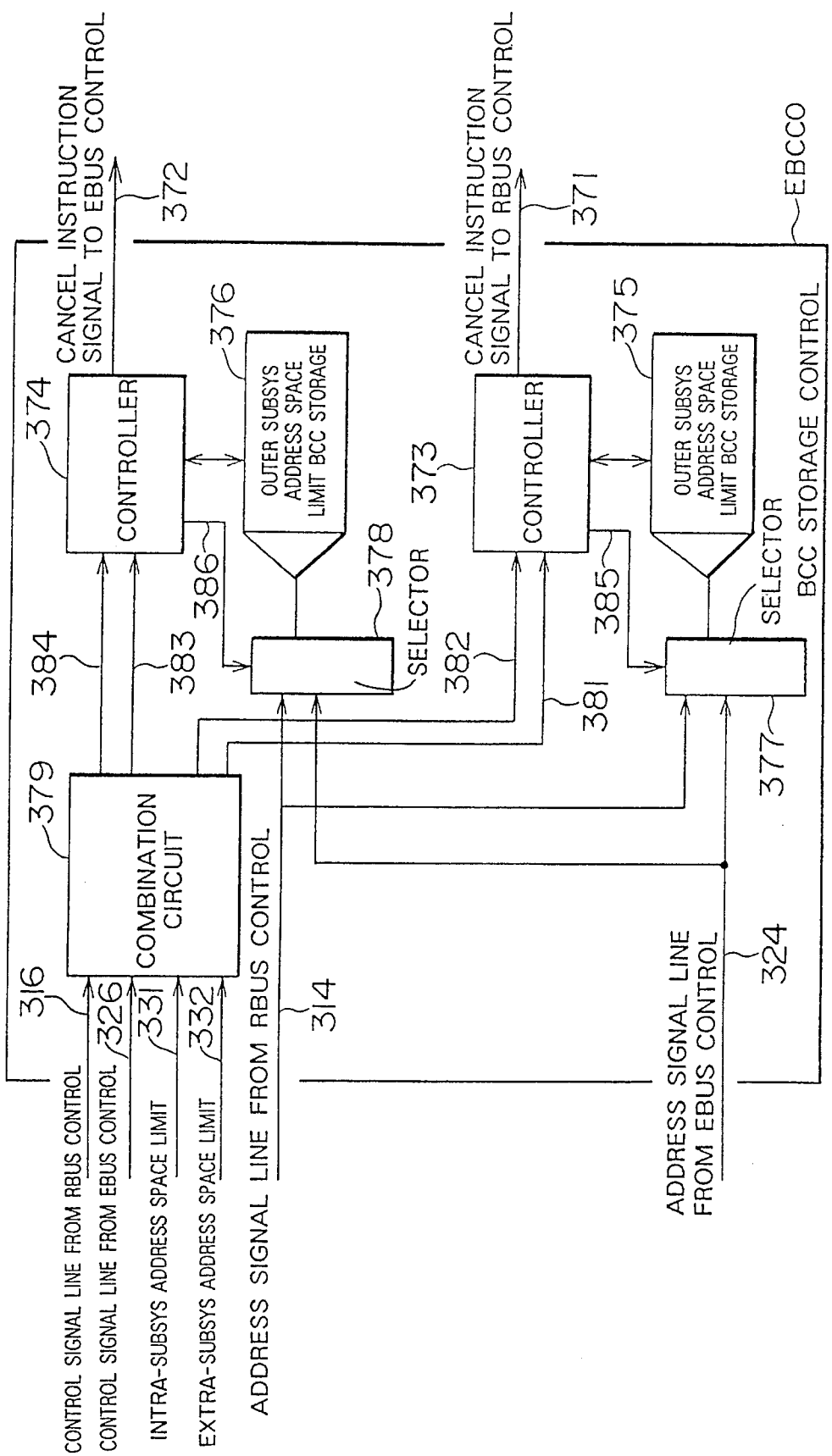
FIG. 20 is a block diagram of the BCC storage controller.

As shown in FIG. 20, the BCC storage control circuit EBCC0 comprises a combination circuit 379, selectors 377 and 378, an extra-subsystem address space limit BCC storage device 375, an intra-subsystem address space limit BCC storage device 376 and control circuits 373 and 374. Information as to whether the canceling operation is required with respect to each address in the system address space is stored in the extra-subsystem address space limit BCC storage device 375 and the intra-subsystem address space limit BCC storage device 376 (information as to whether a data in the main storage device of the outer subsystem exists in the buffer storage device in the inner subsystem is stored in the outer subsystem address space limit BCC storage device 375 and information as to whether a data in the main storage device of the inner subsystem exists in the buffer storage device in the outer subsystem is stored in the inner subsystem address space limit BCC storage device 376.

First, the issue of write access (which voids information in the accessed address in the buffer storage device of the instruction processor as an access object) for setting, resetting and canceling the BCC storage device with respect to the address space limit in the inner subsystem corresponding to FIGS. 15 and 16 will be described.

For example, the setting is made in the case where the instruction processor IP10 makes read access to the main storage device MS0. When access from EBUS is made, that is, when the control signal 316 from the RBUS control circuit 310 expresses reading and the intra-subsystem address space limit signal 331 is "1", the combination circuit 379 in the BCC storage control circuit EBCC0 in EX0 sets a signal 384 to "1". In response to this, the control circuit 374 sends a signal 386 to the selector 378 to select an address signal 314 from the RBUS control circuit 310 to thereby write 1 in the intra-subsystem address space limit BCC storage device 376. This "1" indicates that a data in the main storage device of the inner subsystem exists in the buffer storage device in the outer subsystem.

For example, write access for resetting and canceling is issued in the case where the instruction processor IP00 makes write access to the main storage device MS0. When the control signal 326 from the EBUS control circuit 320 expresses writing and the extra-subsystem address space limit signal 332 is "0", the combination circuit 379 in the BCC storage control circuit EBCC0 in EX0 sets a signal 383 to "1". In response to this, the control circuit 374 sends a signal 386 to the selector 378 to select an address signal 324 from the EBUS control circuit 320 and read a value from the intra-subsystem address space limit BCC storage device 376. If this value is "1", "0" is written here and the canceling instruction signal 372 to be given to the EBUS control circuit is set to "1" to operate write access for canceling (transfer the writing on RBUS to EBUS). The value "0" written here indicates that a data in the main storage device of the inner subsystem does not exist in the buffer storage device in the outer subsystem as a result of the write access for canceling.

In the following, the issue of write access for setting, resetting and canceling the BCC storage device with respect to the address space limit in the outer subsystem corresponding to FIGS. 17 and 18 will be described.

For example, the setting is made in the case where the instruction processor IP00 makes read access to the main storage device MS1. When the control signal 326 from the EBUS control circuit 320 expresses reading and the extra-subsystem address space limit signal 332 is "1", the combination circuit 379 in the BCC storage control circuit EBCC0 in EX0 sets a signal 382 to "1". In response to this, the control circuit 373 sends a signal 385 to the selector 377 to select an address signal 324 from the EBUS control circuit 320 to thereby write 1 in the extra-subsystem address space limit BCC storage device 375. This "1" indicates that a data in the main storage device of the outer subsystem exists in the buffer storage device in the inner subsystem.

For example, write access for resetting and canceling is issued in the case where the instruction processor IP10 makes write access to the main storage device MS1. As described above, write access is issued from EX1 onto EBUS.

When the control signal from the RBUS control circuit 310 expresses writing and the intra-subsystem address space limit signal 331 is "0", the combination circuit 379 (detecting this write access) in the BCC storage control circuit EBCC0 in EX0 sets a signal 381 to "1". In response to this, the control circuit 373 sends a signal 385 to the selector 377 to select an address signal 314 from the RBUS control circuit 310 and read a value from the extra-subsystem address space limit BCC storage device 375 If this value is "1", 0 is written here and the canceling instruction signal 371 to be given to the RBUS control circuit is set to "1" to operate write access for canceling (transfer the writing on EBUS to RBUS). The value "0" written here indicates that a data in the main storage device of the outer subsystem does not exist in the buffer storage device in the inner subsystem as a result of the write access for canceling.

When the reception control circuit 322 receives an access request on the local bus RBUS0, the address checking circuit 330 makes a checking as to whether the absolute address on the address signal line 324 is in a range assigned to the inner subsystem. At the same time, the transmission control circuit 321 receives access information from the reception control circuit 322. Because access to a main storage device MS on the inner subsystem is described now, the extra-subsystem address space limit signal 332 becomes "0". Accordingly, the bus priority request circuit 323 does not send the bus priority request signal 310r to the bus arbiter BA, so that the access in the transmission control circuit 321 is aborted.

When the control circuit 379 in the BCC storage control circuit 370 receives the control information signal line 326 among the access information received from the reception control signal 322 in the EBUS control circuit 320 and receives the information that the access assortment is read access and the extra-subsystem address signal line 332 is "0" (that is, when the input for informing that the access is read access with respect to the address space of the inner subsystem), none of the signal lines 381 to 384 becomes "1". Accordingly, there is no issue of write access for setting, resetting and canceling the BCC storage device (see FIGS. 15 and 16).

The transfer of accessing results has been described with the description of the operation of the local bus.

(2) Read Access to Main Storage Device on one of Outer Subsystems

Read access of an instruction processor IP00 to a main storage device MS1 will be described hereunder.

First the instruction processor IP00 sends read access to the local bus RBUS0. With respect to this access, the main storage device MS0 and the bus extender EX0 make a checking individually.

When the reception control circuit 211 receives the access request on the local bus RBUS0, the address checking circuit 220 in the main storage device MS0 makes a checking as to whether the absolute address on the address signal line 216 is in a range assigned to the inner subsystem and whether the absolute address is in the address space of the system, in the same manner as described in the first embodiment with reference to FIGS. 4A and 4B. Because access to a main storage device MS on one of outer subsystems is described now, the address space limit signal 221 becomes "0" and the address space limit error signal 222 also becomes "0". Accordingly, the memory access actuating circuit 240 does not send the start signal 241 to the memory circuit 250, so that the access in the reception control circuit 211 is aborted.

The operation of the bus extender EX0 will be described hereunder with reference to FIGS. 19A and 19B.

When the reception control circuit 322 in the EBUS control circuit 320 receives an access request on the local bus RBUS0, the address checking circuit 330 makes a checking as to whether the absolute address on the address signal line 324 is in a range assigned to the inner subsystem. At the same time, the transmission control circuit 321 receives transmission information for a common bus EBUS from the reception control circuit 322. Because access to a main storage device MS on one of outer subsystems is described now, the extra-subsystem address space limit signal 332 becomes "1". Accordingly, the bus priority request circuit 323 sends a bus priority request signal 320r to the bus arbiter BA, so that the bus arbiter BA makes a checking as to whether the bus priority is acceptable or not. When the bus priority is accepted, the bus arbiter BA sends a bus priority acceptance signal 320a to the transmission control circuit 321. The transmission control circuit 321 receiving this signal sends access information to the address bus ABUSe and the control bus CBUSe.

When, in parallel to this, the control circuit 379 in the BCC storage control circuit EBCC0 in the bus extender EX0 receives the control information signal line 326 among the access information received from the reception control signal 322 in the EBUS control circuit 320 and receives the information that the access assortment is read access and the extra-subsystem address signal line 332 is "1" (that is, when the input for informing that the access is read access with respect to the address space outside the subsystem), the signal 382 is set to "1".

The control circuit 373 receiving this signal sends a signal 385 to the selector 377 to select an address signal 314 from the RBUS control circuit 310 to thereby write 1 in the extra-subsystem address space limit BCC storage device 375. As a result, 1 is set in the BCC storage device 375 of the address expressed by the address signal line 324. This indicates that write access for canceling must be operated (with respect to RBUS) when writing is made (on EBUS) with respect to this address, because the buffer storage device in the inner subsystem has a copy of this address. Accordingly, there is no issue of write access for canceling (this corresponds to the reading from IP in the inner subsystem to MS in the outer subsystem as shown in FIGS. 17 and 18).

With respect to the access on the extension bus EBUS transmitted from the bus extender EX0, local bus extenders EX1 to EX3 in the subsystems K1 to K3 make a checking individually. In the case of the access request to the main storage device MS1, the bus extender EX1 receives the access and the bus extenders EX2 and EX3 abort the access. The bus extender EX1 replaced by a bus extender EX0 and the BCC storage control circuit EBCC1 replaced by a BCC storage control circuit EBCC0 will be described with reference to FIGS. 19A and 19B.

When the reception control circuit 312 in the RBUS control circuit 310 receives the access on the extension bus EBUS, the address checking circuit 330 makes a checking as to whether the absolute address on the address signal line 314 is in a range assigned to the inner subsystem. At the same time, the transmission control circuit 311 receives access information from the reception control circuit 312. Because here is the case of access to a main storage device MS on the inner subsystem, the intra-subsystem address space limit signal 331 becomes "1".

Accordingly, the bus priority request circuit 313 sends a bus priority request signal 310r to the bus arbiter 201, so that the bus arbiter 201 makes a checking as to whether the bus priority is acceptable or not. When the bus priority is accepted, the bus arbiter 201 sends a bus priority acceptance signal 310a to the transmission control circuit 321. The transmission control circuit 321 receiving this signal sends access information to the address bus ABUS0 and the control bus CBUS0. In the case of writing, the transmission control circuit 321 further sends write data to the data bus DBUS0.

When, in parallel to this, the control circuit 379 in the BCC storage control circuit EBCC0 in the bus extender EX0 receives the control information signal line 316 among the access information received from the reception control signal 312 in the RBUS control circuit 310 and receives the information that the access assortment is read access and the intra-subsystem address signal line 331 is "1" (that is, when the input for informing that the access is read access with respect to the address space of the inner subsystem), the signal 384 is set to "1".

The control circuit 374 receiving this signal sends a signal 386 to the selector 378 to select an address signal 314 from the RBUS control circuit 310 to thereby write 1 in the inner subsystem address space limit BCC storage device 376. As a result, "1" is set in the intra-subsystem address space BCC storage device 376 of the address expressed by the address signal line 314. This indicates that write access for canceling must be transferred to EBUS when writing is made on RBUS0 (in fact, on RBUS1) with respect to this address. Accordingly, there is no issue of write access for canceling (this corresponds to the read acceptance from the outer subsystem as shown in FIGS. 15 and 16).

The operation of the bus extender EX1 replaced by the bus extender EX0 has been described with reference to FIGS. 19A and 19B. The access aborting operations of the bus extenders EX2 and EX3 can be also described with reference to the same drawings. In this case, the intra-subsystem address space limit signal 331 becomes "0". Accordingly, the bus priority request circuit 313 does not send the bus priority request signal 310r to the bus arbiter 201, so that the access is aborted. Further, there is no setting of the BCC storage device 375 for the bus extenders EX2 and EX3. The procedure that the bus extender EX1 receiving the access transfers the access to the main storage device MS1 is the same as in the case of (1). Description of the case where the instruction processor IP00 makes access to the main storage device MS1 is completed.

(3) Write Access to Main Storage Device on Inner Subsystem

Write access of the instruction processor IP00 to the main storage device MS0 will be described hereunder.

The instruction processor IP00 sends an access request to the bus arbiter 201. When the access request is accepted, write access is sent to the local bus RBUS0. With respect to the access, the main storage device MS0 and the bus extender EX0 respectively make a checking.

The operation of the main storage device MS0 is the same as that in the case of read access of (1), except that the memory circuit 250 performs memory writing, instead of memory reading, on the basis of the information in the address signal line 216, data signal line 217 and control signal line 218 but read data are not sent to the data bus DBUS0 though information related to the result transferring operation is sent to the control bus CBUS0.

The operation of the bus extender EX0 will be described hereunder.

The operation in which the reception control circuit 322 receives an access request on the local bus RBUS0 so that the access in the transmission control circuit is aborted is the same as the operation of (1).

On the other hand, the operation of the BCC storage control circuit EBCC0 is different from the operation of (1). When the combination circuit 379 in the BCC storage control circuit EBCC0 receives the control information signal line 324 among the access information received from the reception control signal 322 in the EBUS control circuit 320 and receives the information that the access assortment is write access and the extra-subsystem address signal line 332 is "0" (that is, when the input for informing that the access is write access with respect to the address space of the inner subsystem), the signal 383 is set to "1". The control circuit 374 receiving this signal sends a signal 386 to the selector 378 to select an address signal 324 from the EBUS control circuit 320 to thereby read a value from the intra-subsystem address space limit BCC storage device 376.

When this value is "1", it is indicated that the buffer storage device outside the inner subsystem has a copy of this address. Accordingly, "0" is written here and the canceling instruction signal 372 to the EBUS control circuit is set to "1". Then, writing on RBUS0 with respect to this address is operated to EBUS as write access for canceling (writing on RBUS is transferred onto EBUS). The information that there is no copy in the outer subsystem after the copy in the buffer in the outer subsystem with respect to this address is altered or voided is reflected on the BCC storage device by "0" (this corresponds to writing from IP in the inner subsystem to MS in the inner subsystem as shown in FIGS. 15 and 16).

Because this value "0" indicates that the buffer storage device outside the inner subsystem has no copy of this address, write access for canceling is not operated. The operation is closed here. The operation in the case where write access for canceling is operated is described here on the assumption that the instruction processor IP10 previously makes read access to the main storage device MS0.

Then, with respect to the access (write access for canceling) on the extension bus EBUS transmitted from the bus extender EX0, the bus extenders EX1 to EX3 in the subsystems K1 to K3 make a checking individually. With respect to the access request to the main storage device MS0, the bus extenders EX1 to EX3 fetch the access to transfer write access for canceling to the local busses when the BCC storage device is "1". It is now assumed that access is received when the BCC storage device for the bus extender EX1 is "1" and that the other bus extenders EX2 and EX3 abort the access. The bus extender EX replaced by a bus extender EX0 and the BCC storage control circuit EBCC1 replaced by a BCC storage control circuit EBCC0 are shown in FIGS. 19A and 19B.

When the reception control circuit 312 in the RBUS control circuit 310 receives the access on the extension bus EBUS, the address checking circuit 330 makes a checking as to whether the absolute address on the address signal line 314 is in a range assigned to the inner subsystem. At the same time, the transmission control circuit 311 receives access information from the reception control circuit 312. Because here is not access to a main storage device MS on the inner subsystem, the intra-subsystem address space limit signal 331 becomes "0".

When the combination circuit 379 in the BCC storage control circuit EBCC0 receives the control information signal line 316 among the access information received from the reception control circuit 312 in the EBUS control circuit 310 and receives the information that the access assortment is write access and the intra-subsystem address signal line 331 is "0" (that is, when the input for informing that the access is write access with respect to the address space outside the inner subsystem), the signal 381 is however set to "1".

The control circuit 373 receiving this signal sends a signal 385 to the selector 377 to select an address signal 314 from the RBUS control circuit 310 to thereby read a value from the extra-subsystem address space limit BCC storage device 375. When this value is "0", it is indicated that the buffer storage device outside the inner subsystem has no copy of this address. Accordingly, the operation is closed here because there is no necessity of operating the writing on EBUS with respect to this address to RBUS0 as write access for canceling.

Because the value is now "1" (that is, because it is indicated that the buffer storage device in the inner subsystem has a copy of this address), the write access for canceling on EBUS is transferred to RBUS (see writing in the outer subsystem on EBUS as shown in FIGS. 17 and 18). The control circuit 373 sends a write access issue instruction signal 371 for canceling to the RBUS control circuit and writes "0" in the extra-subsystem address space limit BCC storage device 375. As a result, the bus priority request circuit 313 issues a request to RBUS0, so that write access for canceling is issued. On the other hand, the extra-subsystem address space limit BCC storage device 375 of the address expressed by the address signal line 314 is set to "0". The information that there is no copy in the inner subsystem after the copy in the buffer in the inner subsystem with respect to this address is altered or voided is reflected on the BCC storage device by the value "0".

(4) Write Access to Main Storage Device on one of Outer Subsystems

Write access of an instruction processor IP00 to a main storage device MS1 will be described hereunder.

First the instruction processor IP00 sends a write access request to the local bus RBUS0. With respect to this access, the main storage device MS0 and the bus extender EX0 make a checking individually.

The operation of the main storage device MS is the same as the operation of (2).

The operation of the bus extender EX0 is the same as the operation of (2), except that the transmission control circuit 321 sends write data to the data bus DBUSe as well as it sends access information to the address bus ABUSe and the control bus CBUSe. However, the BCC storage control circuit EBCC0 is not operated.

With respect to the access on the extension bus EBUS, the bus extenders EX1 to EX3 in the subsystems K1 to K3 make a checking individually. In the case of the write access to the main storage device MS1, the bus extender EX1 receives the access but the other bus extenders EX2 and EX3 abort the access. When the extra-subsystem address space limit BCC storage device for the bus extenders EX2 and EX3 is "1", the bus extenders EX2 and EX3 however receive the access. This has been described in (3).

The operation of an IP or an IOP which makes access to a main storage device MS has been described through classifying the operation into four cases (1) to (4).

Although the aforementioned embodiment has shown the case where the buffer storage device operating according to the store-through algorithm is used, it is to be understood that the invention can be applied to the case where a buffer storage device operating according to the store-swap algorithm is used and that the coherency between memory and buffer can be kept by providing a BCC storage device in the bus extender as well as providing it in the buffer storage control circuit in this case.

In the aforementioned BCC storage method, data are registered in the buffer when access to a main storage device in an outer subsystem is made. Accordingly, there is no consideration that the record thereof is reserved so that the record in the BCC storage device can be reset when the address is evicted from the buffer storage device. If the record in the BCC storage device is reset when the address is evicted, unnecessary write access for canceling is prevented from issuing.

To achieve this method, not only bits must be increased by the number corresponding to the number of outer subsystems for each address in the intra-subsystem address space limit BCC storage device 376 but bits must be increased by the number corresponding to the number of devices having buffer storage devices in the inner subsystem for each address in the outer subsystem address space limit BCC storage device 375. Further, a reset request must be sent out to perform the resetting of the record in the BCC storage device when the address is evicted from the buffer storage device.

In the following, the case where the instruction processor IP00 reads the main storage device MS1 is described as an example. In the case where the address is evicted from the buffer storage device, the bit (IP00) expressing a device having a buffer storage device in the inner subsystem in the extra-address space limit BCC storage device 375 in the bus extender EX0 is reset by sending out a reset request from the instruction processor IP00. Further, in the case where all bits expressing devices are reset, a reset request is sent to the extension bus EBUS. The bits (EX0) expressing outer subsystems in the intra-subsystem address space limit BCC storage device 376 in the bus extender EX1 receiving the reset request are reset. In the case where all bits expressing outer subsystems are reset, there is no necessity of issuing write access for canceling even when the instruction processor IP10 makes write access to the main storage device MS1 with respect to this address in the subsystem 1. The setting of the intra-subsystem address space limit BCC storage device 376 and the extra-subsystem address space limit BCC storage device 375 is performed through corresponding bits at the time of reading.

THIRD EMBODIMENT

This embodiment is provided to adapt locked memory access for the system of the first embodiment. In this embodiment, a dead lock state arising in locked memory access can be avoided. Therefore, a lock state control circuit is provided in each of the main storage devices MS0 to MS3 in the first embodiment so that the bus arbiter in the main storage device can be controlled by the lock state control circuit.

The operation of locked access in the local bus will be described hereunder.

The lock state with respect to the locked access is controlled by the lock state control circuit in the local bus/extension bus.

First, the lock state of the local bus/extension bus will be described.

There is no discrimination of the lock state except the ON/OFF of the lock in the extension bus. Accordingly, the bus can be used only by the lock source.

The lock state on the local bus is classified into three lock-on states, namely, intra-subsystem lock state, extra-subsystem lock state and double lock state.

Figure 21:
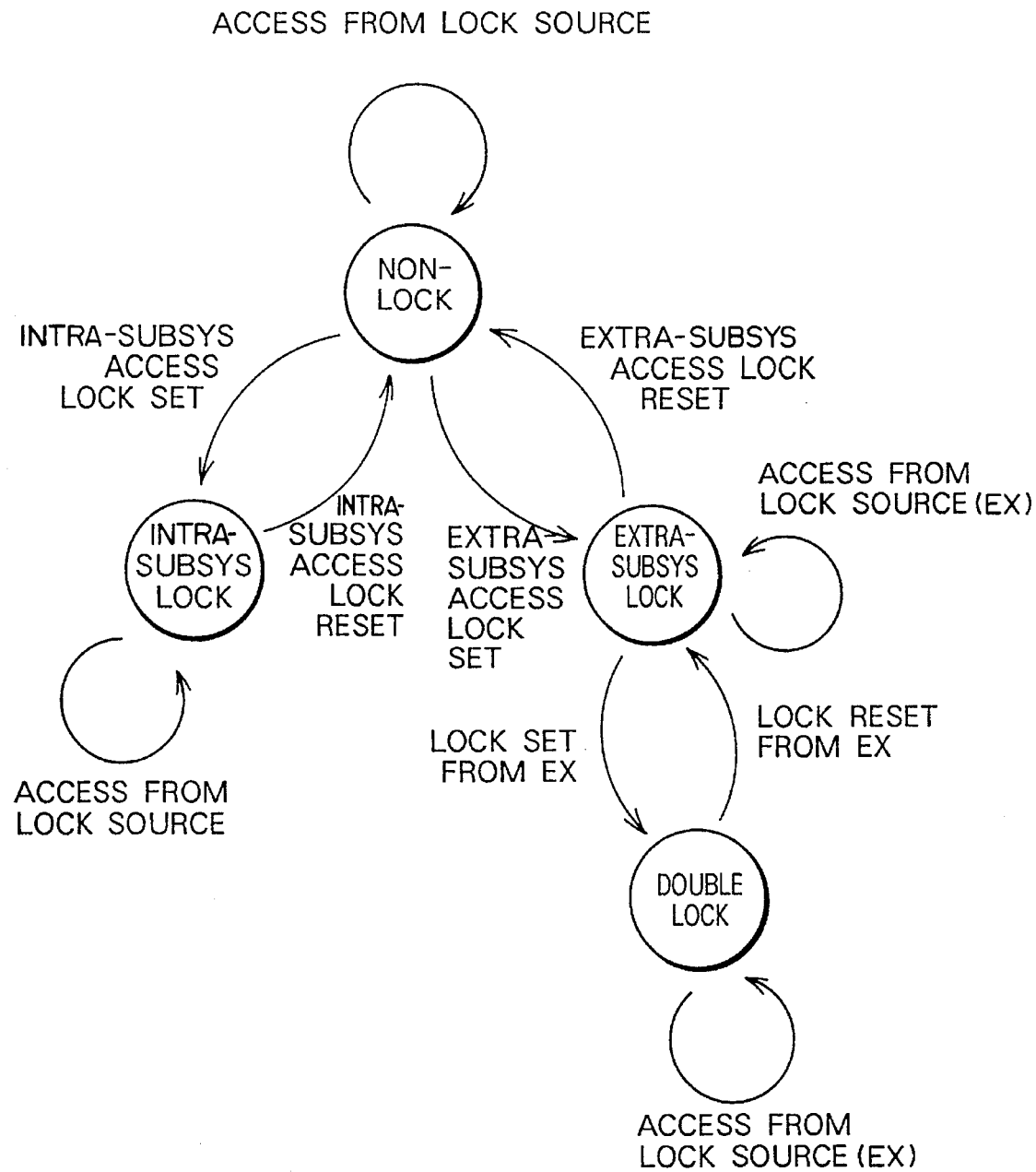
FIG. 21 is a view of state transition in a lock state of the local bus in the data processing system depicted in FIGS. 1A and 1B.

FIG. 21 is a view showing the state transition of the lock state of the local bus in the data processing system.

Figure 25A:
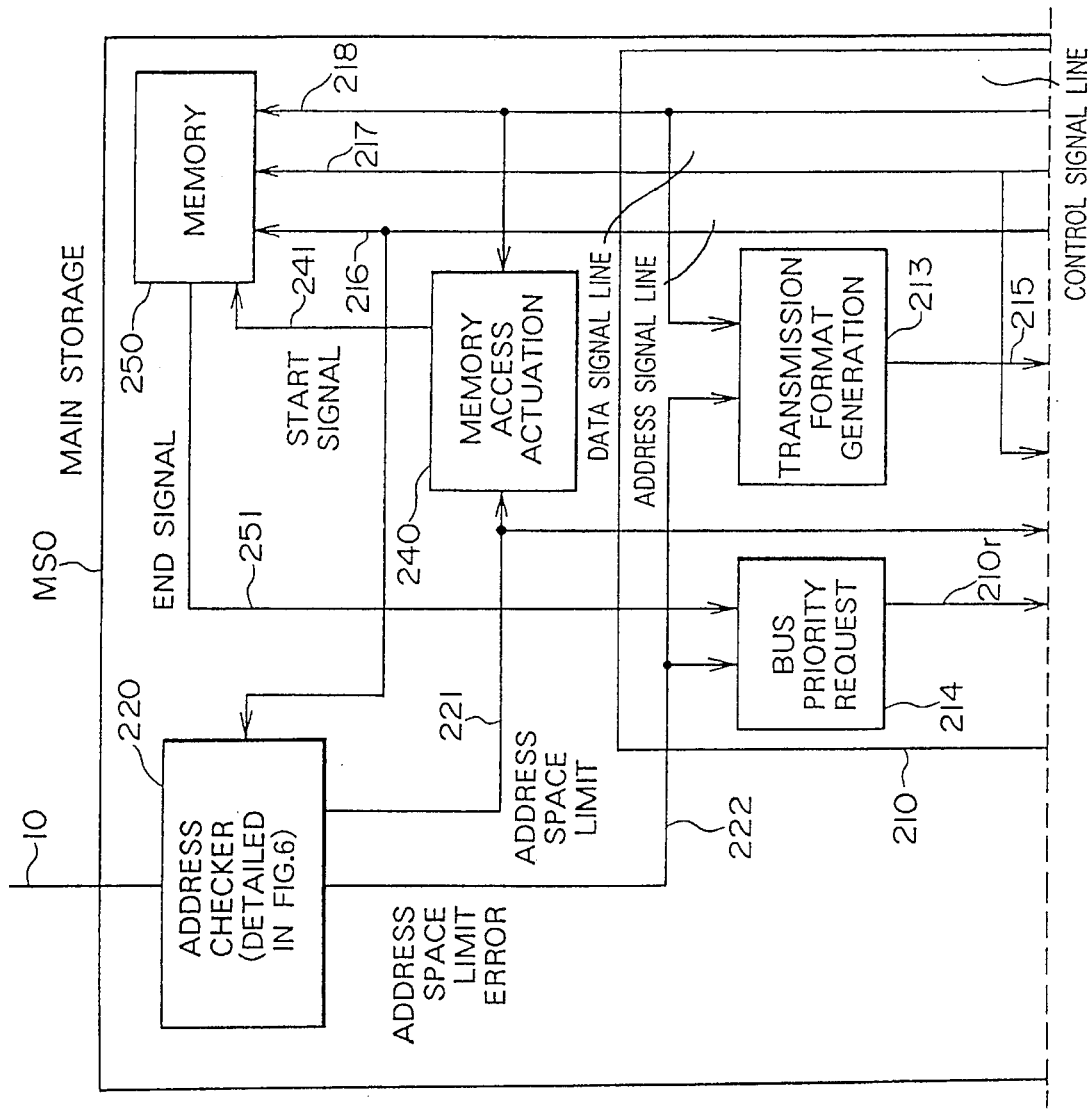
FIG. 25A is a block diagram showing a half of the main storage device having a lock state control circuit.

When locked access on the local bus, issued by an instruction processor or input-output device is accepted in the unlock state in which the local bus is not locked, the state is transited to the intra-subsystem lock state or extra-subsystem lock state correspondingly whether the access is intra-subsystem access (that is, access in the case where the address space limit signal 221 in FIG. 25A is "1") or whether the access is extra-subsystem access (that is, access in the case where the address space limit signal 221 in FIG. 25A is "0").

In the intra-subsystem lock state, acceptance of requests to use local busses expect the lock source is suppressed. In the outer subsystem lock state, acceptance of requests to use bus extenders and local busses except the lock source is suppressed. In the case where a bus extender in the inner subsystem sends locked memory access onto a local bus in the extra-subsystem lock state, lock state bits are set to the double lock state so that acceptance of requests to use local busses except the bus extender in the inner subsystem is suppressed.

Figure 22:
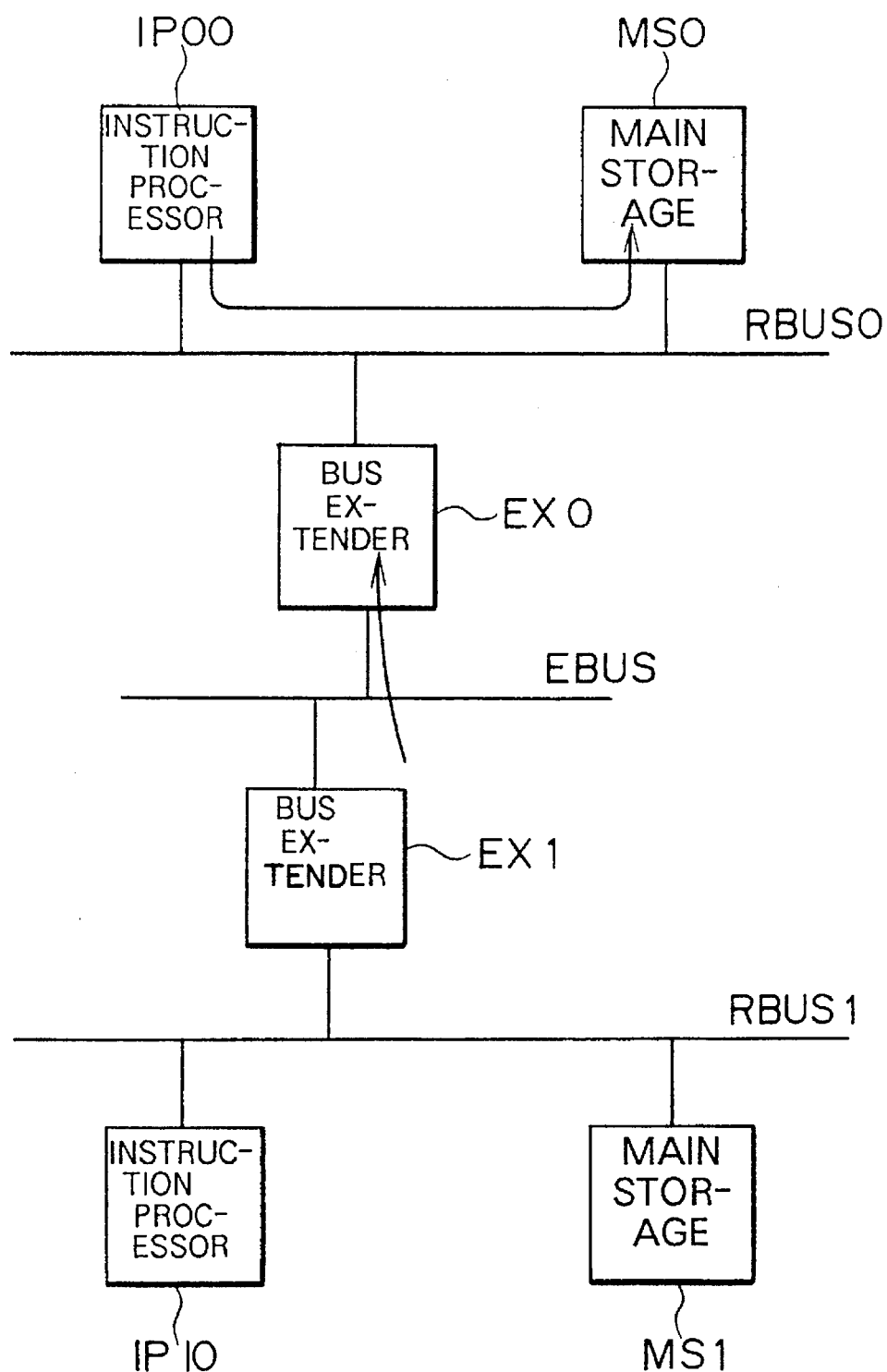
FIG. 22 is a block diagram showing an intra-subsystem lock state in the data processing system depicted in FIGS. 1A and 1B.
Figure 23:
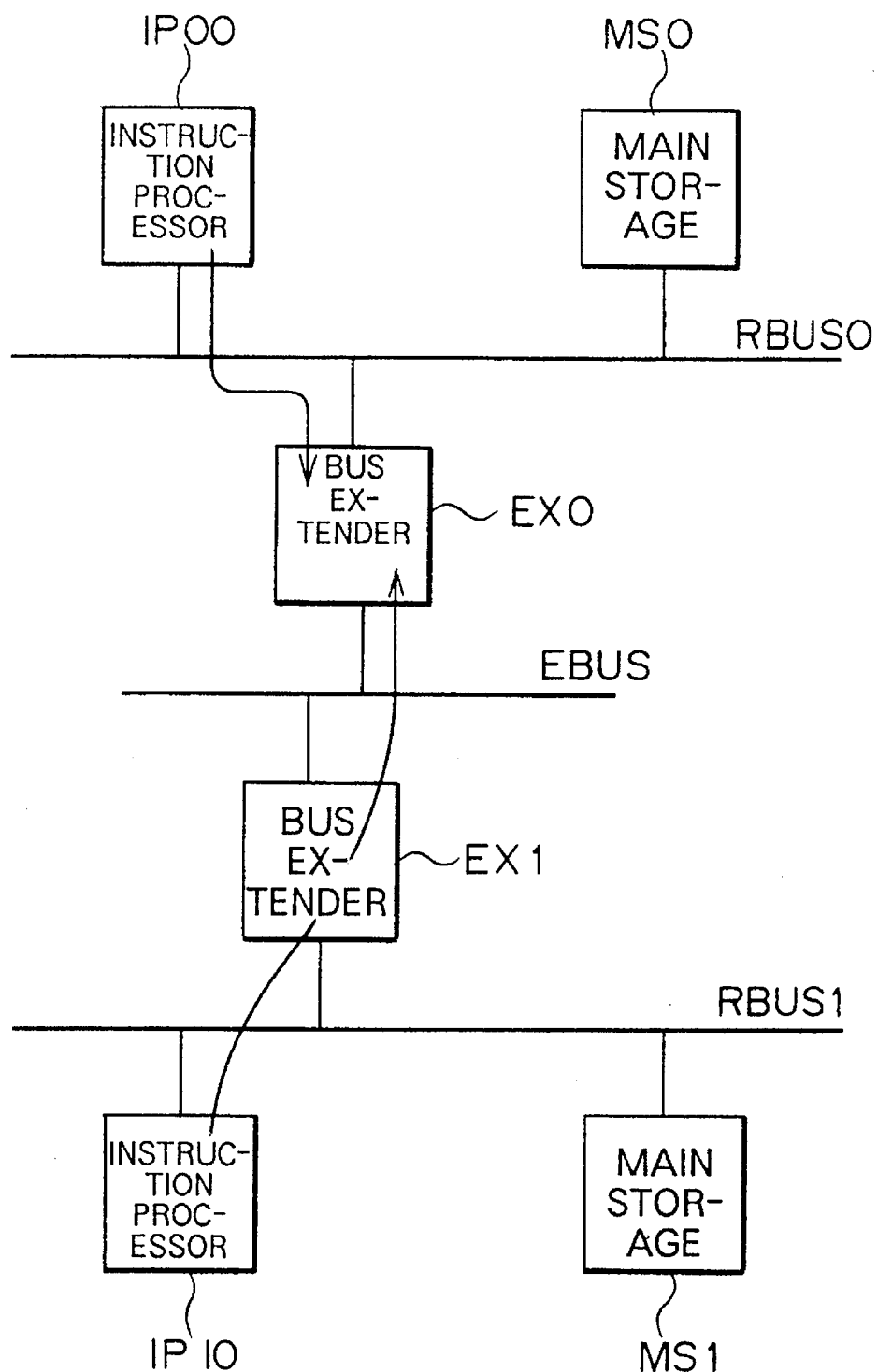
FIG. 23 is a block diagram showing an extra-subsystem lock state in the data processing system depicted in FIGS. 1A and 1B.
Figure 24:
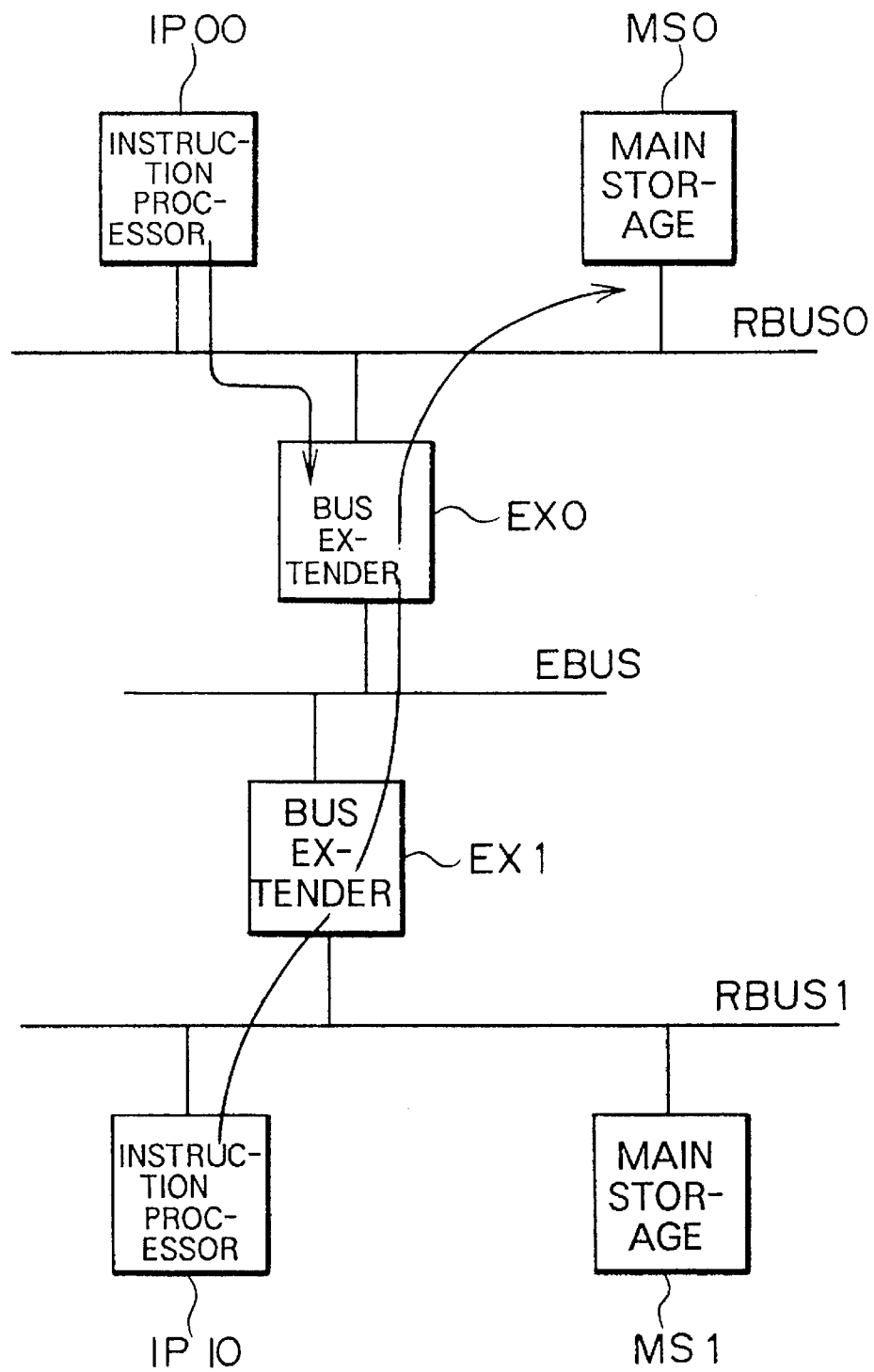
FIG. 24 is a block diagram showing a double lock state in the data processing system depicted in FIGS. 1A and 1B.

FIGS. 22, 23 and 24 are block diagrams of the data processing system, respectively showing the intra-subsystem lock state, the extra-subsystem lock state and the double lock state. In the intra-subsystem lock state in FIG. 22, the right of using the local bus RBUS0 is limited to the instruction processors IP00 and IP01, input-output devices IOP00 and IOP01 and bus extender EX0 as the lock source. As a result, access from another device on the local bus is waiting for the lock to be opened by completion of processing in the instruction processor IP00. After the lock is released, access can be made continuously.

In the extra-subsystem lock state in FIG. 23, the right of using the local bus RBUS0 can be given to the bus extender EX0 as well as the instruction processor IP00. As a result, when access to the local bus RBUS0 is made on the bus extender EX0, the bus extender EX0 can use the local bus RBUS0 without waiting for the lock to be opened by completion of processing in the instruction processor IP00.

When the bus extender EX0 issues locked access now, the state is transited to the double lock state in FIG. 24. In the double lock state, the right of using the local bus RBUS1, extension bus EBUS and local bus RBUS0 is limited to the instruction processor IP10 which has obtained the right of using the extension bus EBUS. As a result, processing instructed by the instruction processor IP10 progresses speedily. When the locked access from the instruction processor IP10 is released, access from the instruction processor IP00 is enabled. Accordingly, the dead lock state can be avoided.

The operation of the local bus/extension bus and the operation of locked access on the local bus have been described.

In the following, the operation of an IP or IOP making access to a main storage device MS is described through classifying it into (1) locked access to a main storage device MS included in an inner subsystem, (2) locked access to a main storage device MS on one of outer subsystems and (3) locked access from a bus extender after acceptance of locked access to a main storage device MS on one of outer subsystems.

(1) Locked Access to Main Storage Device on Inner Subsystem

Access of the instruction processor IP00 to the main storage device MS0 will be described hereunder.

The instruction processor IP00 sends an access request to the bus arbiter 201. When the access request is accepted, access is sent to the local bus RBUS0. With respect to the access, the main storage device MS0 and the bus extender EX0 respectively make a checking.

The operation of the main storage device MS0 will be described hereunder.

Figure 25B:
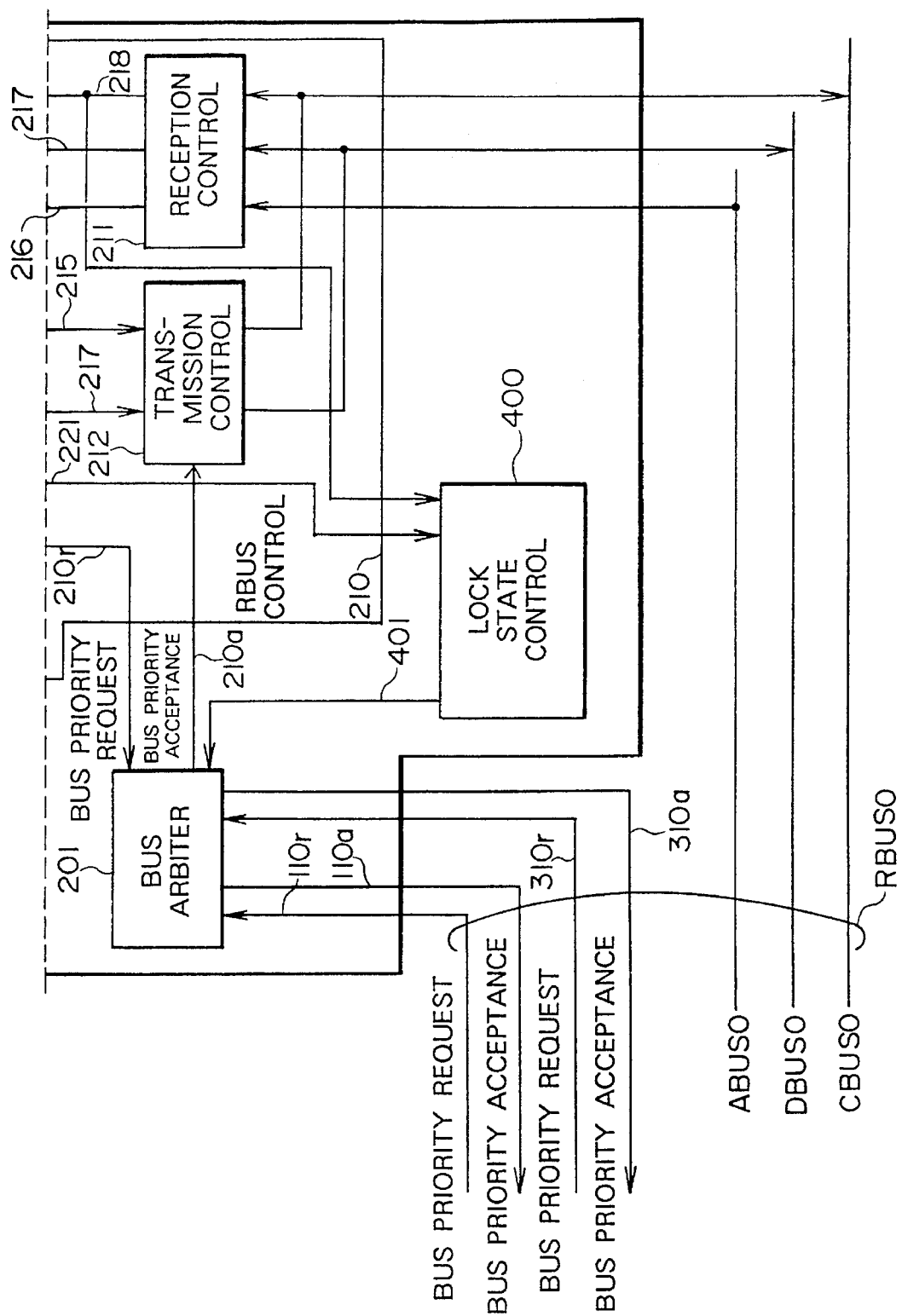
FIG. 25B is a block diagram showing the other half of the main storage device having a lock state control circuit.

The structure of the main storage device MS0 is shown in FIGS. 25A and 25B. The main storage device MS0 comprises a bus arbiter 201, an RBUS control circuit 210, an address checking circuit 220, a memory access actuating circuit 240 and a memory circuit 250. The RBUS control circuit 210 comprises a reception control circuit 211, a transmission control circuit 212, a bus priority request circuit 214 and a transmission format generating circuit 213.

When the reception control circuit 211 receives access on the respective RBUS0, the address checking circuit 220 judges whether the absolute address on the address signal line 216 is in a range assigned to the inner subsystem and whether the absolute address is in the address space of the system. Because access to a main storage device MS on the inner subsystem is described now, the address space limit signal 221 becomes "1" and the address space limit error signal 222 (which takes "1" when the address is out of the address space of the system and which takes "0" when the address is in the address space of the system) becomes "0". The memory access actuating circuit 240 receives both the FUNC field and the address space limit signal 221 on the control signal line 218 and sends a start signal 241 to the memory circuit 250. The memory circuit 250 receiving the start signal 241 performs memory reading/writing on the basis of information on the address signal line 216, the data signal line 217 and the control signal line 218.

Figure 26:
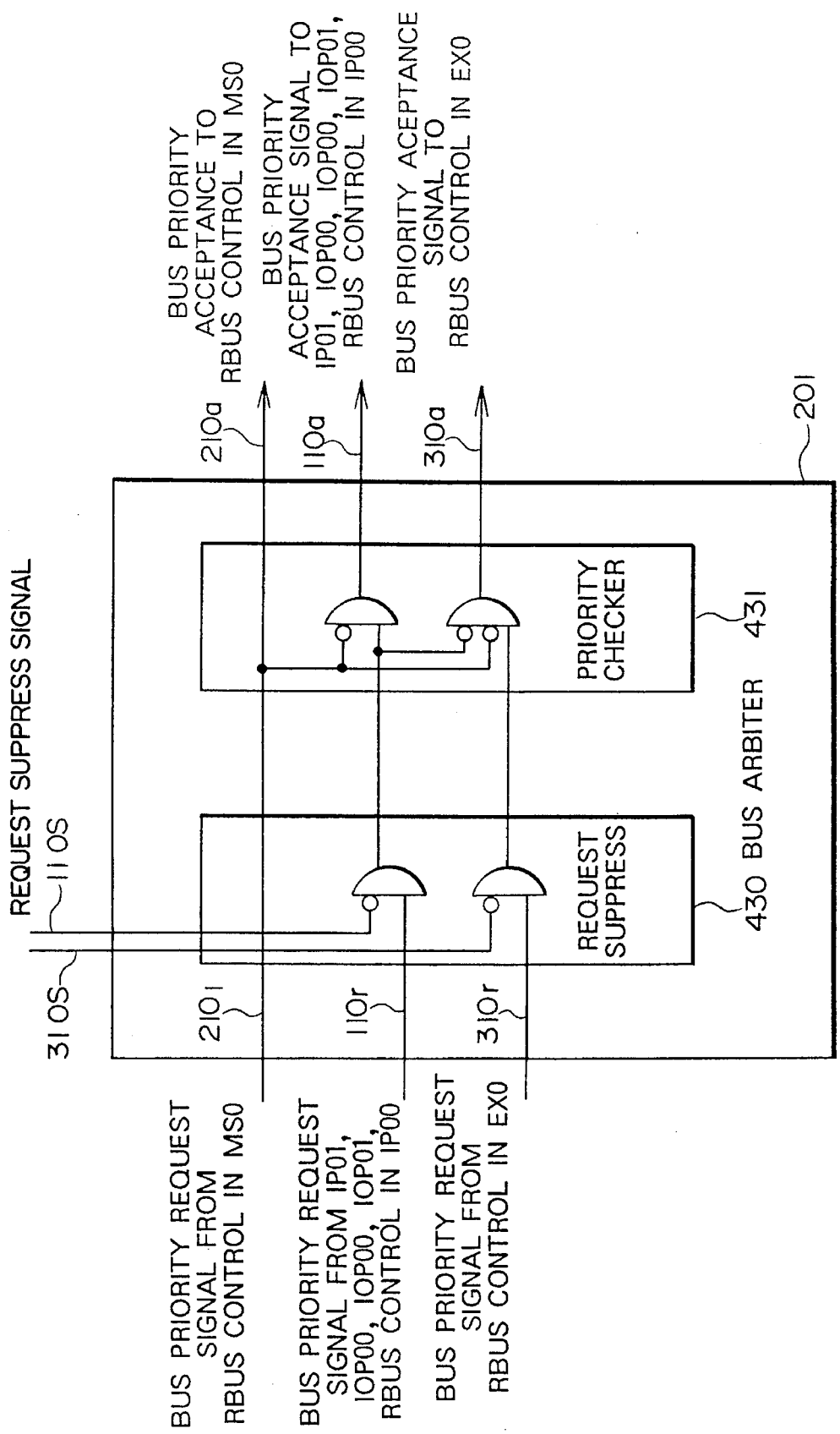
FIG. 26 is a block diagram of the bus arbiter in the main storage device.
Figure 27:
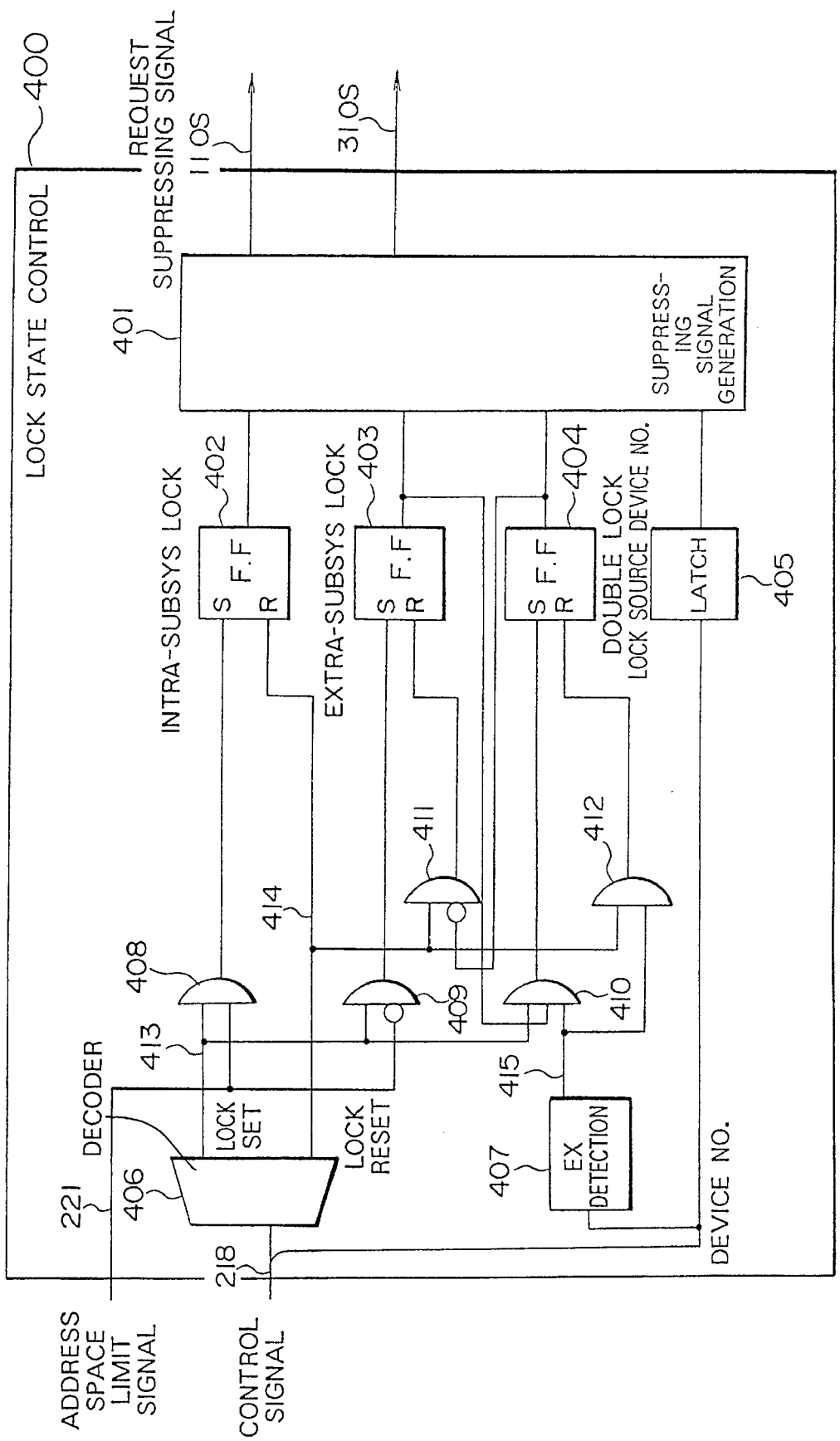
FIG. 27 is a block diagram of the lock state control circuit.

FIG. 26 is a block diagram of the bus arbiter in the main storage device, and FIG. 27 is a block diagram of the lock state control circuit for achieving the state transition view of FIG. 21.

The bus arbiter 201 in FIG. 26 has a request suppressing circuit 430 and a priority checking circuit 431. The request suppressing circuit 430 suppresses bus priority request signals 310r and 110r when the request suppressing signals 310s and 110s from the lock state control circuit 400 are "1", respectively. The priority checking circuit 431 successively sets bus priority acceptance signals to "1" in the order of higher priority among bus priority request signals not suppressed.

The lock state control circuit 400 in FIG. 27 has a flip-flop circuits 402 (expressing whether the state is an intra-subsystem lock state or not), 403 (expressing whether the state is an extra-subsystem lock state or not) and 404 (expressing whether the state is a double lock state or not), a latch 405 (expressing the device number of the lock source), a decoder 406, and an EX detecting circuit 407 for detecting EX0 on the basis of the number (expressed in the REN portion of the control bus CBUS) for discriminating EX0 from IP00, IP01, IOP00 and IOP01.

The control signal line 218 sent from the RBUS control 210 is decoded by the decoder 406. On the basis of information expressing the presence or absence of a lock state in the FUNC field of the control signal line 218, the lock set signal 413 becomes "1" when a request to set the lock is given and, on the contrary, the lock reset signal 414 becomes "1" when a request to reset the lock is given.

When the lock set signal 413 is "1", the flip-flop 402 expressing the intra-subsystem lock state or the flip-flop 403 expressing the extra-subsystem lock state is set correspondingly to whether the address space limit signal 221 is "1" or "0". Further, the latch 405 expressing the device number of the lock source is set.

In the case where the request accepted after the setting of the flip-flop 403 expressing the extra-subsystem lock state is a lock set request from EX0, the lock set signal 413 becomes "1" and the output signal 415 from the EX detecting circuit 407 becomes "1". As a result, the flip-flop 404 expressing the double lock state is set.

The resetting of the lock will be described hereunder. In the case where the flip-flop 404 expressing the double lock state is set, the lock is reset when the lock reset signal 414 and the output signal 415 from the EX detecting circuit 407 are all "1", that is, the lock is reset on the basis of the reset request from EX0.

In the case where the flip-flop 403 expressing the extra-subsystem lock state is set, the lock is reset when the flip-flop 404 expressing the double lock state is not set and the lock reset signal 414 is "1". In the case where the flip-flop 402 expressing the intra-subsystem lock state is set, the lock is reset when the lock reset signal 414 is "1".

The suppressing signal generating circuit 401 receives output signals from the flip-flop circuits 402, 403, 404 and 405 and generates suppressing signals. The suppressing signals are based on the following logic.

Request suppressing signal 310s
= (intra-subsystem lock) · (lock source device
   number ≠ EX)

Request suppressing signal 110s
= (intra-subsystem lock) · (lock source device
   number ≠ IP00)
+ (extra-subsystem lock) · (lock source device
   number ≠ (IP00 + EX0))
+ double lock In the above expressions, the symbole '·' represents "AND", and the symbol '+' represents OR.

There is no suppressing signal for the bus priority request signal 210r. Suppressing signals except the request suppressing signal 110s are of the request suppressing signal 310s type.

In the case of locked access to an Ms on the inner subsystem, the FUNC field on the control signal line 218, expressing locked access and the address space limit signal 221 (having the value "1") are received, so that the flip-flop 402 expressing the intra-subsystem lock state and the flip-flop 405 expressing the lock source device number are set. In the intra-subsystem lock state, the suppressing signal generating circuit 401 suppresses acceptance of the request of using the local busses except the lock source according to the aforementioned logic. Accordingly, the bus priority acceptance signal in the priority checking circuit 431 (FIG. 27) is limited to the lock source.

In FIGS. 25A and 25B, the transmission format generating circuit 213 generates a command format for CBUS on the basis of the information in the FUNC and REN fields on the control signal line 218 and the address space limit error signal 222 and sends the command format to the transmission control circuit 212 by the signal line 215. Here, the information in the FUNC field is converted into a code expressing the transfer of results.

When the reading is completed, an end signal 251 is transmitted. The bus priority request circuit 214 receiving this signal sends a bus priority request signal 210r to the bus arbiter 201. The bus arbiter 201 judges whether the bus priority is acceptable or not. When the bus priority is accepted, the bus arbiter 201 sends a bus priority acceptance signal 210a to the transmission control circuit 212. The transmission control circuit 212 receiving this signal sends information related to the result transferring operation to the control bus CBUS0 and sends read data to the data bus DBUS0.

The structure of the bus extender EX0 is the same as described above in the first embodiment with reference to FIGS. 5A and 5B and the structure thereof is the same as described above in the first embodiment. Detailed description of the operation of the bus extender EX0 is omitted.

The transfer of access results has been described above with the description of the operation of the local bus.

(2) Locked Access to Main Storage Device on Outer Subsystem

Read access of an instruction processor IP00 to a main storage device MS1 will be described hereunder.

First the instruction processor IP00 sends read access to the local bus RBUS0. With respect to this access, the main storage device MS0 and the bus extender EX0 make a checking individually.

When the reception control circuit 211 receives the access request on the local bus RBUS0, the address checking circuit 220 in the main storage device MS0 makes a checking as to whether the absolute address on the address signal line 216 is in a range assigned to the inner subsystem and whether the absolute address is in the address space of the system. Because access to a main storage device MS on one of outer subsystems is described now, the address space limit signal 221 becomes "0" and the address space limit error signal 222 also becomes "0". Accordingly, the memory access actuating circuit 240 does not send the start signal 241 to the memory circuit 250, so that the access in the reception control circuit 211 is aborted.

In the case of locked access to an Ms on one of outer subsystems, the FUNC field on the control signal line 218, expressing locked access and the address space limit signal 221 (having the value "0") are received, so that the flip-flop 403 expressing the extra-subsystem lock state and the flip-flop 405 expressing the lock source device number are set. In the extra-subsystem lock state, the suppressing signal generating circuit 401 suppresses acceptance of the request of using the local busses except the lock source according to the aforementioned logic. Accordingly, the bus priority acceptance signal in the priority checking circuit 431 (FIG. 26) is limited to the lock source or the bus extender EX0.

The structure of the bus extender EX0 is the same as described above in the first embodiment with reference to FIGS. 5A and 5B and the structure thereof is the same as described above in the first embodiment. Detailed description of the operation of the bus extender EX0 is omitted.

With respect to the access on the extension bus EBUS, transmitted from the bus extender EX0, the bus extenders EX1 to EX3 in the subsystems K1 to K3 make a checking individually. In the case of the access request to the main storage device MS1, the bus extender EX1 receives the access and the other bus extenders EX2 and EX3 abort the access.

The operation of the bus extender EX1 is the same as the operation described above with reference to FIGS. 5A and 5B through replacing the bus extender EX1 by the bus extender EX0. Detailed description thereof is omitted.

The procedure in which the bus extender EX1 receiving the access transfers locked access to the main storage device MS1 is the same as in the case of (1). Description of access of the instruction processor IP00 to the main storage device MS1 is completed here.

(3) Locked Access from Bus Connector after Acceptance of Locked Access to Main Storage Device on one of Outer Subsystems The case where locked access from the bus extender is given after locked access to a main storage device MS on one of outer subsystems is accepted by the instruction processor IP00 will be described hereunder.

At this time, among the lock state flip-flop circuits 402, 403, 404 and 405 in the lock state control circuit 400, the flip-flop 403 expressing the extra-subsystem lock state and the flip-flop 405 expressing the lock source device number are set. As described above, the bus priority acceptance signal from the bus arbiter 201 is limited to the lock source or the bus extender EX0. In the case where the access accepted from the bus extender EX0 is locked access, the lock state control circuit 400 receives the FUNC field on the control signal line 218, expressing locked access, the REN field expressing the information that the request source is the bus extender EX0 and the address space limit signal 221 (having the value "1"), so that the flip-flop 404 expressing the double lock state is set. There is no change of the lock source device number. In the double lock state, acceptance of the request of using local busses except the bus extender EX is suppressed according to the aforementioned logic. Accordingly, the bus priority acceptance signal in the priority checking circuit 431 is limited to the bus extender EX0. The operation of an IP or IOP making locked access to a main storage device MS has been described through classifying it into three cases (1) to (3).

FOURTH EMBODIMENT

In this embodiment, a work storage control circuit is provided in each of the bus extenders in the system of the first embodiment. In the case where an IP or IOP as the access source makes read access to an address of a main storage device on one of outer subsystems, the bus extender transfers information corresponding to the address to the access source by reference to the work storage control circuit without access to a main storage device on one of outer subsystems when the information exists in the work storage device. Other structures and the like are the same as those in the first embodiment.

This embodiment will be described hereunder with reference to the drawings.

Figure 28A:
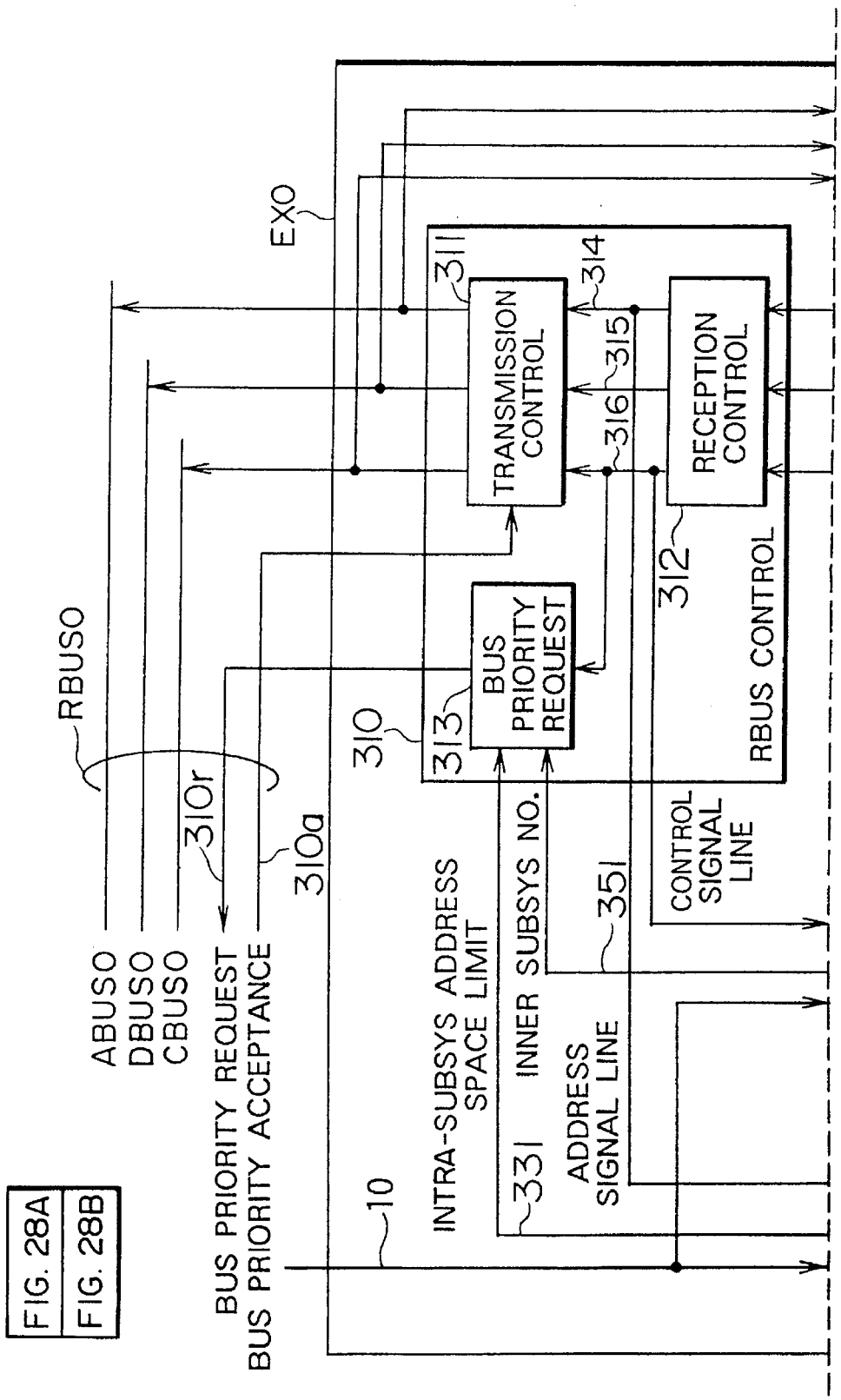
FIG. 28A is a block diagram showing a half of the bus extender having a work storage control circuit.
Figure 28B:
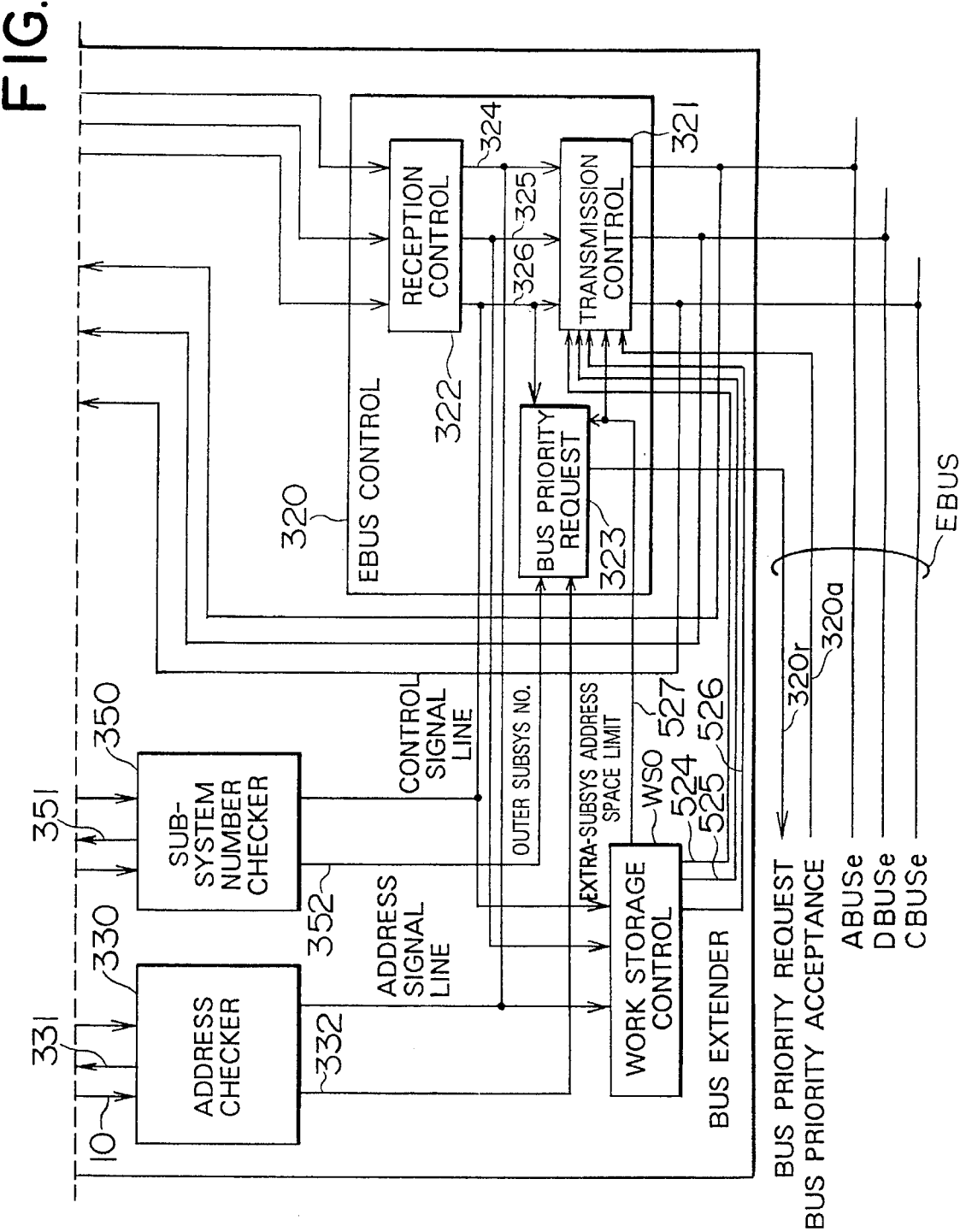
FIG. 28B is a block diagram showing the other half of the bus extender having a work storage control circuit.

FIGS. 28A and 28B are block diagrams showing this embodiment in which a work storage control circuit WS0 is provided in the bus extender in the first embodiment (EX0 to EX3 are equivalent to each other in structure).

The bus extender EX0 comprises an RBUS control circuit 310, an EBUS control circuit 320, an address checking circuit 330, a subsystem identification number checking circuit 350, and a work storage control circuit WS0.

Figure 29:
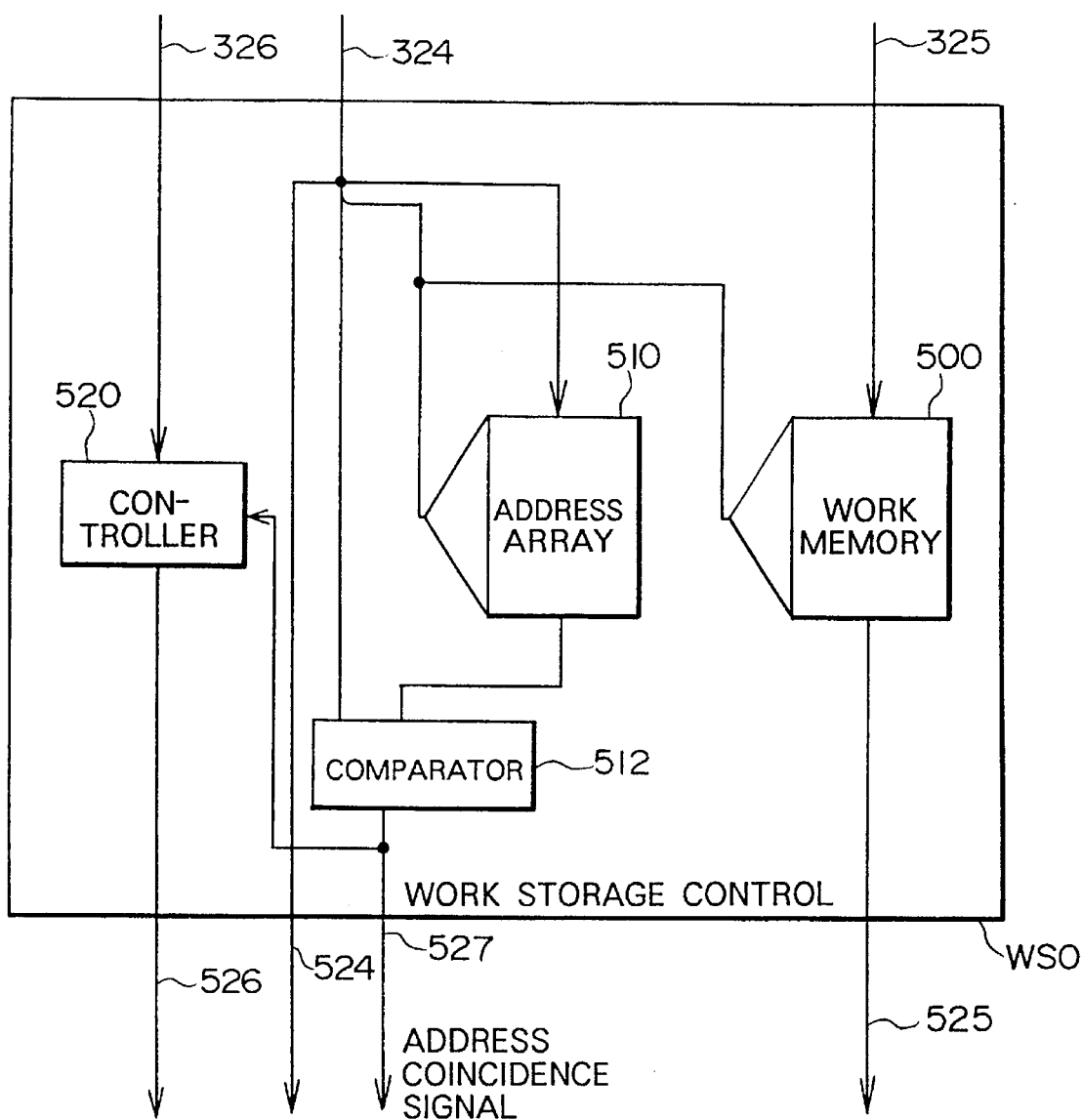
FIG. 29 is a block diagram of the work storage control circuit.

FIG. 29 is a block diagram showing the structure of the work storage control circuit WS0. The work storage control circuit WS0 has a work memory 500 for storing a part of the main storage device in an outer subsystem, an address array 510 for reserving an address on the main storage device in the outer subsystem, an address comparing circuit 512, and a control circuit 520.

The control line 326 of the bus extender EX0 is connected to the control circuit 520. The address line 324 thereof is connected to the address array 510, address comparing circuit 512 and work memory 500 and also connected to the transmission control circuit 321 by the line 524. The data line 325 thereof is connected to the work memory 500.

The output 526 from the control circuit 520 and the output 525 from the work memory 500 are connected to the transmission control circuit 321.

The address coincidence signal 527 from the address comparing circuit 512 is connected to the control circuit 520 and also connected to the bus priority request circuit 323 and the transmission control circuit 321.

The operation of main storage devices MS0 and MS1 and bus extenders EX0 and EX1 in the case where an IP or IOP makes access to a main storage device will be described hereunder through classifying it into the following four cases:
1. Read Access to Main Storage on one of Outer Subsystems
2. Write Access to Main Storage on one of Outer Subsystems
3. Read Access to Main Storage on Inner Subsystem
4. Write Access to Main Storage on Inner Subsystem 1. Read Access to Main Storage on one of Outer Subsystem When a read access request sent from the instruction processor IP00 to the bus arbiter of the main storage device MS0 is accepted by the bus arbiter, the instruction processor IP00 sends read access to the local bus RBUS0. The command format used in the access is the same as described in the first embodiment.

With respect to this access, the main storage device MS0 and the bus extender EX0 make a checking individually. Because read access to a main storage device on one of outer subsystems is described now, the bus extender EX0 receives this access.

The read access sent out to the local bus RBUS0 is received by the reception control circuit 322 in the EBUS control circuit 320 in the bus extender EX0, so that the address checking circuit 330 makes a checking on the address on the address signal line 324. Because access to the outer subsystem is described now, the extra-subsystem address space limit signal 332 becomes "1". The address on the address signal line 324 is also sent to the work memory control circuit WS0 and compared with the address in the address array 510 in WS0. At the same time, access to the work memory 500 in WS0 is made to read data from the work memory 500. The read data are sent to the transmission control circuit 321.

If there is any address coincidence, the address coincidence signal 527 in the comparator 512 in WS0 becomes "1" to deal with the data as valid data. The data is sent to the transmission control circuit 321. The control circuit 520 in WS0 receives the control signal on the control line 326, converts the FUNC portion expressing the transmission of the request in the control signal into a signal expressing the return of results and sends the signal to the transmission control circuit 321.

Because the address array signal 527 is "1", the transmission control circuit 321 sends the received control signal 526 to the control bus CBUSe and also sends read data 525 to the data bus DBUSe. As a result, the reception control 312 in the RBUS control circuit 310 in EX0 receives the read data. The read data are returned to the request source IP00 through RBUS0.

If there is no address coincidence, the address coincidence signal 527 becomes "0" to register the address in the address array 510. The bus priority request signal 323 generates a bus priority request 320r when the address coincidence signal 527 is "0" and the extra-subsystem address space limit signal is "1".

Because the address coincidence signal is "0" and the extra-subsystem address space limit signal is "1", the transmission control circuit sends the control signal to the control bus CBUS after adding replay stag to the error information portion of the control signal and also sends the request address to ABUSe. The replay stag is added to the request in the case where there is no address coincidence, so that the replay stag is used for collation when the read data from the main storage device are stored in the work memory.

The operation of the bus extender EX1 and the operation of the main storage device MS1 are the same as those in the first embodiment.

When the read access to the main storage device MS1 in the subsystem K1 is completed, as described above, the reception control circuit in the EBUS control circuit in EX1 receives the read data, transfers the data to EX0 and returns the data to the request source IP00.

2. Write Access to Main Storage on One of Outer Subsystem

The operation of the bus extenders EX0 and EX1 and the basic operation of the main storage devices MS0 and MS1 are the same as those in the case 1 of read access to a main storage device in an outer subsystem. If any address coinciding with the address of the write access exists in the address array, a writing operation is made upon the work memory.

In the case of write access, the write access is continuously transferred to the bus extender EX1 to perform writing in the main storage device MS1 in the outer subsystem K1 regardless of the coincidence between the address in the address array and the address in the write access. The writing operation upon the main storage device MS1 in the outer subsystem K1 can be made in the same manner as the read access to the main storage device in the subsystem K1, except that read access is replaced by write access.

3. Read Access to Main Storage on Inner Subsystem

The operation of the main storage device MS0 is the same as that in the case of ordinary read access.

The operation of the bus extender EX0 is as follows. The read access sent out to the local bus RBUS0 is received by the reception control circuit in the EBUS control circuit 320. With respect to the address signal line 324, the address checking circuit judges whether there is access to an outer subsystem. Because access to the inner subsystem K0 is described now, the extra-address space limit signal becomes "0". In this case, the access is not hit to the work memory, so that the address coincidence signal becomes "0".

The transmission control circuit aborts the request because the address coincidence signal 527 is "0" and the extra-subsystem address space limit signal 332 is "0".

4. Write Access to Main Storage on Inner Subsystem

The operation of the main storage device MS0 is the same as that in the case of ordinary write access.

The operation of the bus extender EX0 is as follows. The write access sent out to the local bus RBUS0 is received by the reception control circuit in the RBUS control circuit 310. With respect to the address signal line 324-0, the address checking circuit judges whether the target of access is K0 or K1. Because access to the inner subsystem K0 is described now, the extra-address space limit signal becomes "0". In this case, the access is not hit to the work memory, so that the address coincidence signal becomes "0".

The transmission control circuit aborts the request because the address coincidence signal 527 is "0" and the extra-subsystem address space limit signal 332 is "0".

The third embodiment can be adapted to the second and fourth embodiments.

Although the embodiments of the invention have shown the case where main storage devices MS and bus extenders EX are connected to local busses in respective subsystems and the bus extenders EX in the respective subsystems are connected by extension busses, it is to be understood that the invention can be applied to the case where main storage devices MS each having constituent elements of the bus extender EX and connection ports to extension busses may be provided so that the main storage devices MS in the respective subsystems can be connected by the extension busses without connection of the bus extenders to the local busses. The invention is not limited to the structure in which the main storage devices MS are connected by the bus extenders EX.

Finally, the embodiments have shown the case where the number of subsystems is 4, but the invention is not limited to the case of four subsystems.

Because the invention is constructed as described above, the following effects can be attained.

According to the invention, an IP or IOP in a bus-connection type data processing system extended by connecting a plurality of local busses by extension busses can make access to a main storage device MS having an address space limit including the absolute address of access on the basis of the absolute address of access without consciousness of subsystems. Accordingly, there arises an effect that the system configuration can be extended flexibly while keeping the continuity in bus specification regardless of the number of subsystems.

Further, the service processor SVP calculating the set values of the address space limit indicating registers in the MS and the EX in each of the subsystems on the basis of the MS capacity in each of the subsystems is provided with a path for setting the calculated values in the address space limit indicating registers as a part of the initializing procedure at the time of the starting-up of the system. Accordingly, there arises an excellent effect that the procedure of setting system parameters can be simplified to prevent setting error.

Further, according to the invention, there arises an effect that the occurrence of unnecessary throughput necking can be prevented by transferring write access between subsystems while checking in order to improve throughput of access to the MS as long as a copy of the access address in the main storage device MS in the inner subsystem exists in the buffer storage device in the outer subsystem.

Further, according to the invention, there arises an effect that such a dead lock state as is produced easily in the conventional lock control method can be avoided in the case where access requests from instruction processors or input-output processors in a plurality of subsystems priority access struggle for bus priority in the extension bus.

Further, according to the invention, access (reading) to the main storage device MS in the outer subsystem can be made so speedily that the response time of the system as the whole can be improved.

What is claimed is:

1. A data processing system, comprising:

a plurality of subsystems; and an extension bus provided in common to and connected to the subsystems;

each subsystem includes:

(a) a local bus, (b) one or more devices connected to the local bus among a plurality of instruction processors to be included in the system and one connected to the local bus among a plurality of main memory devices which form a main memory of the system, (c) each of the main memory devices being assigned with a corresponding one of plural partial address spaces within a system address space assigned to the main memory of the system, and (d) a bus extender connected to the local bus and the extension bus for transfer of requests therebetween, said bus extender includes:

an address check circuit responsive to a first memory access request provided on the local bus from one of the one or more devices, checking whether a first memory address included in the first memory access request is assigned to one of the main memory devices included in another of the subsystems, and responsive to a second memory access request provided on the extension bus from the bus extender included in another of the subsystems, checking whether a second memory address included in the second memory access request is assigned to the each subsystem, and a transfer control connected to the address check circuit, controlling transfer of the first memory access request to the extension bus and transfer of the second memory access to the local bus, in response to two kinds of results of the checking for the first and second memory addresses, respectively;

wherein the address check circuit of the bus extender in each subsystem includes:

a first address check circuit connected to the local bus in the each subsystem, checking whether another of the subsystems includes one of the main memory devices which is assigned with a partial address space which includes the first memory address provided on the local bus, and a second address check circuit connected to the extension bus, checking whether the each subsystem includes one of the main memory devices which is assigned with a partial address space which includes the second memory address provided on the extension bus;

wherein the first address check circuit of the bus extender of each subsystem includes:

means responsive to the first memory address provided on the local bus of the each subsystem, for determining a first one of the subsystems which includes a first one of the main memory devices which is assigned with a partial address space which includes the first memory address, and means for determining whether the first subsystem coincides with the each subsystem;

wherein the second address check circuit of the bus extender of the each subsystem includes:

means responsive to the second memory address provided on the extension bus for determining a second one of the subsystems which includes one of the main memory devices which is assigned with a partial address space which includes the second memory address, and means for determining whether the second subsystem coincides with the each subsystem;

wherein the determining means of each subsystem within the first address check circuit includes:

a first table holding subsystem numbers assigned to the subsystem and responsive to the first memory address provided on the local bus of the each subsystem, providing one of the subsystem numbers for one of a plurality of intra-subsystem address space limits which includes the first memory address, and a comparator comparing the subsystem number of the each subsystem and the one subsystem number provided from the first table, and the determining means of the one subsystem within the second address check circuit includes:

a second table holding subsystem numbers assigned to the subsystem and responsive to the second memory address provided on the extension bus of the each subsystem, providing one of the subsystem numbers for one of the intra-subsystems, address space limits which includes the second memory address, and a second comparator comparing the subsystem number of the each subsystem and the one subsystem number provided from the table.

2. A data processing system according to claim 1, wherein the first and second memory addresses are absolute addresses of the system address space.

3. A data processing system according to claim 1, wherein the bus extender of each subsystem further includes:

a register holding an intra-subsystem address space limit; and wherein the first address check circuit of the bus extender of the each subsystem comprises a comparator connected to the register, comparing contents of the register and the first memory address provided on the local bus of the each subsystem;

wherein the second address check circuit of the bus extender of the each subsystem comprises a comparator connected to the register comparing contents of the register and the second memory address provided on the extension bus.

4. A data processing system according to claim 1, wherein each of the main memory devices includes:

an access control connected to said local bus within one of the subsystem which includes the each main memory device, responsive to a memory address included in a memory access request provided on the local bus, controlling whether the memory access request is to be executed to the each main memory device.

5. A data processing system according to claim 4, wherein each main memory device further includes:

a register holding a system address limit;

a comparator connected to the register and comparing contents of the register with a memory address provided on the local bus within one of the subsystems which includes the each main memory device and reporting a result of the comparison.

6. A data processing system according to claim 1, wherein each of the main memory devices includes:

a third address check circuit connected to the local bus included in one of the subsystems to which the each main memory device belongs, checking whether the each main memory device is assigned with a partial address space which includes a memory address included in a memory access request provided on the local bus; and a control connected to said third address check circuit, controlling execution of the memory access request on the local bus, depending upon whether the result of the checking by the third address check circuit is affirmative.

7. A data processing system according to claim 6, wherein the third address check circuit within each main memory device includes:

a register holding an intra-subsystem address limit; and a comparator connected to the register and comparing contents of the register with a memory address provided on the local bus within one of the subsystems which includes the each main memory device.

8. A data processing system according to claim 6, wherein the third address check circuit of each main memory device includes:

means responsive to a memory address provided on the local bus of one of the subsystems which includes the each main memory device, for determining one of the subsystems which includes one of the main memory devices which is assigned with a partial address space which includes the memory address; and means for determining whether the one subsystem coincides with the each subsystem.

9. A data processing system according to claim 8, wherein the determining means of the one subsystem within the third address check circuit includes:

a table holding subsystem numbers assigned to the subsystems and intra-subsystem address space limits for the subsystems and responsive to the memory address provided on the local bus, providing one of the subsystem numbers to which is assigned one of the intra-subsystem address space limits which includes the memory address; and a comparator comparing the subsystem number of the each subsystem and the one subsystem number provided from the table.

10. A data processing system according to claim 1, wherein each of the instruction processor and the input/output device includes means for sending to the local bus included in one of the subsystems to which the each of the instruction processor and the input/output device belongs, a subsystem number of the one subsystem together with a memory access request;

wherein each of the main memory devices includes means responsive to a memory access request for readout of data and a subsystem number both provided from the local bus connected to the each main memory device, for transferring an access result to the local bus, the result including both data requested by the access request and the provided subsystem number; and wherein the bus extender of each subsystem includes:

means connected to the extension bus and the local bus within the each subsystem and responsive to a first subsystem number assigned to another of the subsystems and included in a first access result provided on the local bus from one of the main memory devices included in the each subsystem, for transferring the first access result to the extension bus and responsive to a second subsystem number assigned to the each subsystem and included in a second access result provided on the extension bus from another of the subsystems, for transferring the second access result to the local bus.

11. A data processing system according to claim 1 wherein each subsystem includes one of the main memory devices and one instruction processor.

12. A data processing system according to claim 11, wherein each of the plural ones of the subsystems further includes one input/output device.

13. A data processing system according to claim 11, wherein another subsystem other than the plural ones of the subsystems includes one of the memory devices but does not include either an instruction processor or an input/output device.

14. A data processing system according to claim 1, further comprising:

an inter-subsystem transfer line connecting the subsystems, comprising a plurality of separate lines each having connected thereto different combinations of the subsystems;

wherein said transfer control connected to the address check circuit, transfers the first memory access request to the another subsystem via the inter-subsystem transfer line, and transfers to the local bus, a second memory access request provided from another of the subsystems via the inter-subsystem transfer line, the second memory access request including a second memory address assigned to one of the main memory devices included in the each subsystem.

15. A data processing system according to claim 14, wherein each of the main memory devices including;

an access control connected to said local bus within one of the subsystems which includes the each main memory device, responsive to a memory address included in a memory access request provided on the local bus, controlling whether the memory access request is to be executed to the each main memory device.

16. A data processing system according to claim 15, wherein the access control provided in each of the main memory devices includes:

a second address check circuit connected to the local bus included in one of the subsystem to which the each main memory device belongs, checking whether the each main memory device is assigned with a partial address space which includes a memory address included in a memory access request provided on the local bus; and a control connected to said second address check circuit, controlling execution of the memory access request on the local bus, depending upon whether the result of the checking by said second address check circuit is affirmative.

17. A data processing system according to claim 14, wherein each subsystem includes at least one instruction processor and one of the main memory device.

18. A data processing system, comprising:

a plurality of subsystems: and an extension bus provided in common to and connecting the subsystems;

at least two of the subsystem includes:

(a) a local bus, (b) an instruction processor connected to the local bus, (c) a main memory device connected to the local bus, and (d) a bus extender connected to the local bus and the extension bus for transfer of requests therebetween, said bus extender includes:

a work memory holding a plurality of data each assigned to and held by another main memory device included in another subsystem; and a work memory control connected to the local bus and responsive to a first memory read request provided on the local bus from the instruction processor within each subsystem, checking whether first data of a first memory address included in the first memory read request is held in the work memory, and supplying the first data from the work memory to the local bus, in case the first data is held in the work memory.

19. A data processing system according to claim 18, wherein the work memory control includes:

an address array holding addresses for the plurality of data held in the work memory; and a check circuit connected to the address array, checking whether the first data requested by the first memory read request is held in the work memory, based upon the first memory address included in the first memory read request and the addresses held in the address array.

20. A data processing system according to claim 18, wherein the bus extender in the each subsystem further includes:

transfer control connected to the work memory control and the extension bus, transferring the first memory read request to the extension bus, in case the first data is not held in the work memory.

21. A data processing system according to claim 20, wherein the extender in each subsystem further includes:

means connected to the extension bus and responsive to a return request provided on the extension bus from another of the subsystems for the first memory read request, the return data including the first data read from another main memory device in another subsystem and the first memory address, for storing the first data in the work memory.

22. A data processing system according to claim 21, wherein the work memory control includes:

an address array holding addresses for the plurality of data held in the work memory; and a check circuit connected to the address array, checking whether the first data requested by the first memory read request is held in the work memory, based upon the first memory address included in the first memory read request and the addresses held in the address array, wherein the bus extender in the each subsystem further includes;

means responsive to the return request for storing the first memory address included in the return request in the address array.

23. A data processing system according to claim 21, wherein the bus extender in the each subsystem further includes:

means responsive to a second memory read request provided on the extension bus for checking whether the second memory read request is for second data held in the one main memory device provided in the each subsystem, means connected to the checking means for transferring the second memory read request to the local bus, means connected to the local bus for transferring to the extension bus, a return request provided from the one main memory device for the second memory read request, the return data including the second data read from the one main memory device and the second memory address.

24. A data processing system according to claim 18, wherein each main memory device is assigned with a corresponding one of partial address spaces within a system address space assigned to the main memory of system.

25. A data processing system according to claim 22, wherein each main memory device is assigned with a corresponding one of partial address spaces within a system address space assigned to the main memory of system;

wherein the bus extender of each subsystem further includes:

a check circuit connected to the extension bus responsive to the return request provided on the extension bus for the first memory read request for detecting whether the first memory address included in the return request is assigned to the one main memory device included in the each subsystem, so as to controlling the storing means of the first data into the work memory and the storing means of the first address into the address array.

26. A data processing system according to claim 18, wherein each of the instruction processors including a buffer for holding data fetched from the main memory devices.

27. A data processing system, comprising:

a plurality of subsystems; and an extension bus provided in common to and connected to the subsystems;

each subsystem includes:

(a) a local bus, (b) one or more devices connected to the local bus and each selected from a group of devices to be included in the system, the group of devices including one or plural instruction processors, one or plural input/output devices and a plurality of main memory devices which form a main storage of the system, (c) each of the main memory devices being assigned with a corresponding one of plural partial address spaces within a system address space assigned to the main memory of the system, and (d) a bus extender connected to the local bus and the extension bus for transfer of requests therebetween, said bus extender includes:

an address check circuit responsive to a first memory access request provided on the local bus from one of the one or more devices, checking whether a first memory address included in the first memory access request is assigned to one of the main memory devices included in another of the subsystems, and responsive to a second memory access request provided on the extension bus from the bus extender included in another of the subsystems, checking whether a second memory address included in the second memory access request is assigned to the each subsystem, and a transfer control connected to the address check circuit, controlling transfer of the first memory access request to the extension bus and transfer of the second memory access to the local bus, in response to results of the checking for the first and second memory addresses, respectively;

wherein the address check circuit of the bus extender in each subsystem includes:

a first address check circuit connected to the local bus in the each subsystem, checking whether another of the subsystems includes one of the main memory devices which is assigned with a partial address space which includes the first memory address provided on the local bus, and a second address check circuit connected to the extension bus, checking whether the each subsystem includes one of the main memory devices which is assigned with a partial address space which includes the second memory address provided on the extension bus;

wherein the first address check circuit of the bus extender of each subsystem includes:

means responsive to the first memory address provided on the local bus of the each subsystem, for determining one of the subsystems which includes a first one of the main memory devices which is assigned with a partial address space which includes the first memory address, and means for determining whether the first subsystem coincides with the each subsystem;

wherein the second address check circuit of the bus extender of the each subsystem includes:

means responsive to the second memory address provided on the extension bus for determining a second one of the subsystems which includes one of the main memory devices which is assigned with a partial address space which includes the second memory address, and means for determining whether the second subsystem coincides with the each subsystem;

wherein the determining means of the one subsystem within the second address check circuit includes:

a table holding subsystem numbers assigned to the subsystem and intra-subsystem address space limits for the subsystems and responsive to the second memory address provided on the local bus of the each subsystem, providing one of the subsystem numbers for one of the intra-subsystem address space limits which includes the second memory address, and a comparator comparing the subsystem number of the each subsystem and the one subsystem number provided from the table;

wherein the first and second memory addresses are absolute addresses of the system address space.

28. A data processing system, comprising:

a plurality of subsystems; and an extension bus provided in common to and connected to the subsystems;

each subsystem includes:

(a) a local bus, (b) one or more devices connected to the local bus and each selected from a group of devices to be included in the system, the group of devices including one or plural instruction processors, one or plural input/output devices and a plurality of main memory devices which form a main storage of the system, (c) each of the main memory devices being assigned with a corresponding one of plural partial address spaces within a system address space assigned to the main memory of the system, and (d) a bus extender connected to the local bus and the extension bus for transfer of requests therebetween, said bus extender includes:

an address check circuit responsive to a first memory access request provided on the local bus from one of the one or more devices, checking whether a first memory address included in the first memory access request is assigned to one of the main memory devices included in another of the subsystems, and responsive to a second memory access request provided on the extension bus from the bus extender included in another of the subsystems, checking whether a second memory address included in the second memory access request is assigned to the each subsystem, and a transfer control connected to the address check circuit, controlling transfer of the first memory access request to the extension bus and transfer of the second memory access to the local bus, in response to results of the checking for the first and second memory addresses, respectively;

wherein the address check circuit of the bus extender in each subsystem includes:

a first address check circuit connected to the local bus in the each subsystem, checking whether another of the subsystems includes one of the main memory devices which is assigned with a partial address space which includes the first memory address provided on the local bus, and a second address check circuit connected to the extension bus, checking whether the each subsystem includes one of the main memory devices which is assigned with a partial address space which includes the second memory address provided on the extension bus;

wherein the first address check circuit of the bus extender of each subsystem includes:

means responsive to the first memory address provided on the local bus of the each subsystem, for determining one of the subsystems which includes a first one of the main memory devices which is assigned with a partial address space which includes the first memory address, and means for determining whether the first subsystem coincides with the each subsystem;

wherein the second address check circuit of the bus extender of the each subsystem includes:

means responsive to the second memory address provided on the extension bus for determining a second one of the subsystems which includes one of the main memory devices which is assigned with a partial address space which includes the second memory address, and means for determining whether the second subsystem coincides with the each subsystem;

wherein the determining means of the one subsystem within the second address check circuit includes:

a table holding subsystem numbers assigned to the subsystem and intra-subsystem address space limits for the subsystems and responsive to the second memory address provided on the local bus of the each subsystem, providing one of the subsystem numbers for one of the intra-subsystem address space limits which includes the second memory address, and a comparator comparing the subsystem number of the each subsystem and the one subsystem number provided from the table;

wherein the bus extender of each subsystem further includes:

a register holding an inter-subsystem address space limit; and wherein the first address check circuit of the bus extender of the each subsystem comprises a comparator connected to the register, comparing contents of the register and the first memory address provided on the local bus of the each subsystem;

wherein the second address check circuit of the bus extender of the each subsystem comprises a comparator connected to the register comparing contents of the register and the second memory address provided on the extension bus.

29. A data processing system comprising:

a plurality of subsystems each including an instruction processor, a bus extender and an internal bus connecting the instruction processor and the bus extender;

an external bus connecting between bus extenders of said plurality of subsystems; and main memory devices which are accessed from said instruction processors;

at least one of said plurality of subsystems comprising:

(a) a buffer memory circuit provided within said instruction processor and holding a copy of at least a part of address spaces of said main memory devices;

(b) a buffer coherency check memory control circuit provided within said bus extender and storing information indicating which address space in said main memory devices content of a copy held in said buffer memory circuit belongs to;

(c) an address determining circuit provided within said bus extender and determining whether or not a relevant buffer memory circuit within a subsystem to which said bus extender belongs has a copy of an address space of a relevant main memory device which address space has been changed, in response to receipt of information informing that the content of said main memory device has been changed, through said external bus;

wherein when the buffer memory circuit within the subsystem to which said bus extender belongs has the copy of address space of said changed main memory device, a signal for one of changing and erasing the content of buffer memory circuit is transferred to said instruction processor from the bus extender through said internal bus.

30. A data processing system comprising:

a plurality of subsystems each including an instruction processor, a bus extender and an internal bus connecting the instruction processor and the bus extender;

an external bus connecting between bus extenders of said plurality of subsystems; and main memory devices which are accessed from said instruction processors;

at least one of said plurality of subsystems comprising:

(a) a buffer memory circuit provided within said instruction processor and holding a copy of at least a part of an address space of said main memory devices;

(b) a memory control circuit provided within said bus extender and storing which of address spaces in said main memory devices the content of a copy held in said buffer memory circuit belongs to;

(c) an address determining circuit provided within said bus extender and determining whether or not a relevant buffer memory circuit within a subsystem to which said relevant bus extender belongs has a copy of an address space of a relevant main memory device which address space has been changed, in response to receipt of information informing that the content of said main memory device has been changed, through said internal bus;

wherein when the buffer memory circuit within the subsystem to which the relevant bus extender belongs has not the copy of address space of said changed main memory device, a signal for one of changing and erasing the content of buffer memory circuit is transferred to said instruction processors of subsystems other than said subsystem to which said relevant bus extender belongs, from said relevant bus extender, through said external bus.

* * * * *